US012167100B2

(12) United States Patent
Lin et al.

(10) Patent No.: US 12,167,100 B2
(45) Date of Patent: Dec. 10, 2024

(54) METHOD, APPARATUS, DEVICE AND MEDIUM FOR GENERATING CAPTIONING INFORMATION OF MULTIMEDIA DATA

(71) Applicant: SAMSUNG ELECTRONICS CO., LTD., Suwon-si (KR)

(72) Inventors: Ke Lin, Beijing (CN); Zhuoxin Gan, Beijing (CN); Yingying Jiang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 17/292,627

(22) PCT Filed: Mar. 23, 2020

(86) PCT No.: PCT/KR2020/003972
§ 371 (c)(1),
(2) Date: May 10, 2021

(87) PCT Pub. No.: WO2020/190112
PCT Pub. Date: Sep. 24, 2020

(65) Prior Publication Data
US 2022/0014807 A1    Jan. 13, 2022

(30) Foreign Application Priority Data

Mar. 21, 2019 (CN) .......................... 201910219009.4
Apr. 4, 2019 (CN) .......................... 201910270450.5
(Continued)

(51) Int. Cl.
*H04N 21/488* (2011.01)
*G06N 3/04* (2023.01)
(Continued)

(52) U.S. Cl.
CPC .......... *H04N 21/4884* (2013.01); *G06N 3/04* (2013.01); *G06V 10/454* (2022.01);
(Continued)

(58) Field of Classification Search
None
See application file for complete search history.

(56) References Cited

U.S. PATENT DOCUMENTS 10,198,671 B1   2/2019 Yang et al.
10,299,008 B1 * 5/2019 Catalano ................. G06F 18/22
(Continued)

FOREIGN PATENT DOCUMENTS

KR    10-1855597 B1    5/2018

OTHER PUBLICATIONS

Office Action dated Jan. 27, 2023, issued by Korean Intellectual Property Office for Korean Application No. 10-2021-7028919.
(Continued)

*Primary Examiner* — Omar S Parra
(74) *Attorney, Agent, or Firm* — Sughrue Mion, PLLC

(57) ABSTRACT

Embodiments of the present disclosure provide a method, an apparatus, a device, and a medium for generating captioning information of multimedia data. The method includes extracting characteristic information of multimedia data to be processed, wherein the multimedia data comprises a video or an image; and generating a text caption of the multimedia data based on the extracted characteristic information. According to the method provided in the embodiments of the present disclosure, the accuracy of the generated text caption of the multimedia data can be effectively improved.

14 Claims, 35 Drawing Sheets

(30) Foreign Application Priority Data

Nov. 14, 2019 (CN) .......................... 201911115147.4
Mar. 6, 2020 (CN) .......................... 202010152713.5

(51) Int. Cl.
    *G06V 10/44*     (2022.01)
    *G06V 10/764*     (2022.01)
    *G06V 10/82*     (2022.01)
    *G06V 20/40*     (2022.01)
    *G06V 20/62*     (2022.01)
    *H04N 21/2343*     (2011.01)

(52) U.S. Cl.
    CPC ............ *G06V 10/764* (2022.01); *G06V 10/82* (2022.01); *G06V 20/41* (2022.01); *G06V 20/635* (2022.01); *H04N 21/234336* (2013.01)

(56) References Cited

U.S. PATENT DOCUMENTS

| | | | |
|---|---|---|---|
| 10,467,274 | B1 | 11/2019 | Ren et al. |
| 10,542,270 | B2 | 1/2020 | Zhou et al. |
| 2004/0125877 | A1 | 7/2004 | Chang et al. |
| 2017/0127016 | A1 | 5/2017 | Yu et al. |
| 2017/0150235 | A1* | 5/2017 | Mei .................. G06N 3/044 |
| 2018/0121734 | A1 | 5/2018 | Min et al. |
| 2018/0260698 | A1 | 9/2018 | Lin et al. |
| 2018/0329892 | A1* | 11/2018 | Lubbers .............. G06N 3/044 |
| 2019/0095540 | A1* | 3/2019 | Antao ................ G06F 16/972 |

OTHER PUBLICATIONS

Vinyals, O. et al., "Show and Tell: A Neural Image Caption Generator", arXiv:1411.4555v2 [cs.CV] Apr. 20, 2015, 9 pages.

Liu, A.-A., et al., "A Fine-Grained Spatial-Temporal Attention Model for Video Captioning", Special Section on Big Data Learning and Discovery, IEEE Access, vol. 6, Nov. 5, 2018, pp. 68463-68471.

International Search Report and Written Opinion (PCT/ISA210 & PCT/ISA/237) dated Jul. 2, 2020 issued by the International Searching Authority in International Application No. PCT/KR2020/003972.

Communication dated Jun. 3, 2022 issued by the European Patent Office in counterpart European Application No. 20774058.0.

Li Ren et al., "Improved Image Description via Embedded Object Structure Graph and Semantic Feature Matching", 2018 IEEE International Symposium on Multimedia (ISM), DOI 10.1109/ISM.2018.00021, Dec. 10, 2018, XP033494074, 8 pages total.

Kai Xu et al., "Data-Driven Shape Analysis and Processing", Computer Graphics Forum, arxiv.org, Feb. 24, 2015, XP080803980, 27 pages total.

Communication dated Jul. 19, 2023, issued by the Korean Intellectual Property Office in Korean Patent Application No. 10-2021-7028919.

Communication issued Jun. 7, 2024 by the European Patent Office in the European Patent Application No. 20774058.0.

* cited by examiner

[Figure 1]
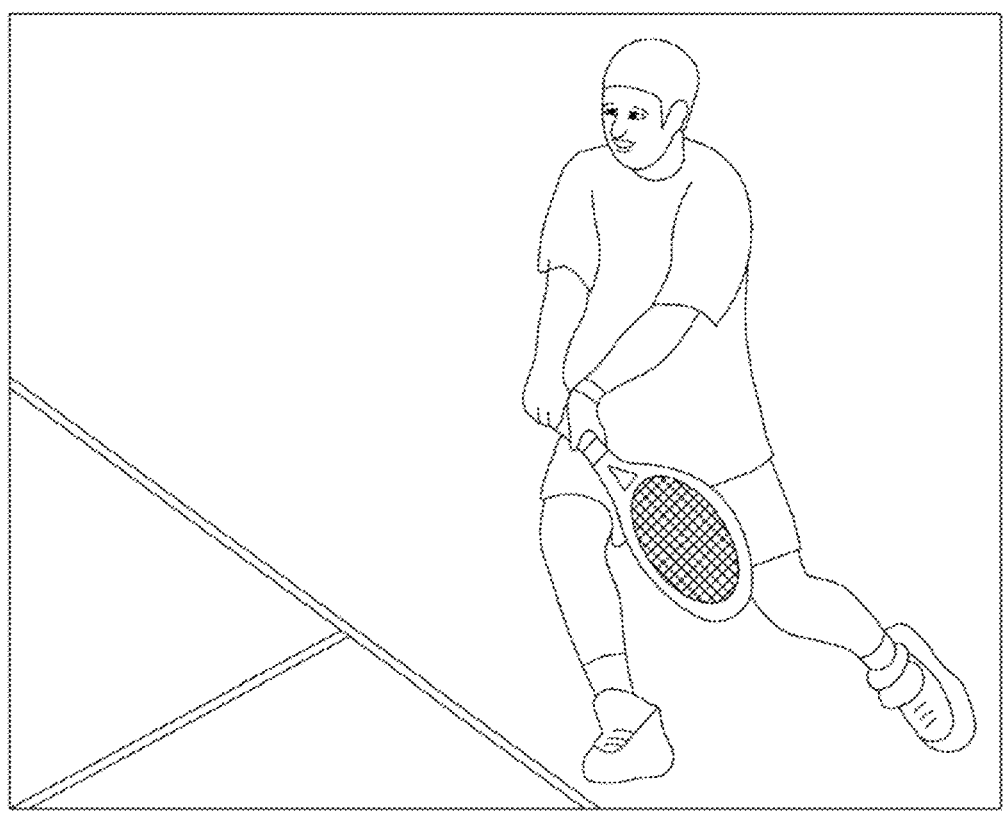

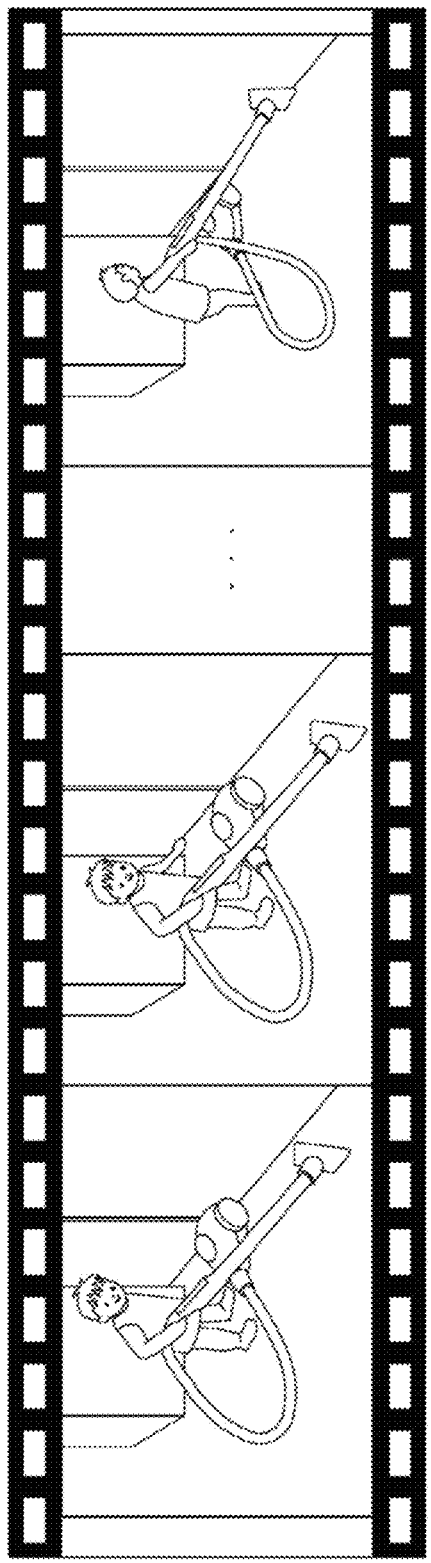
[Figure 2]

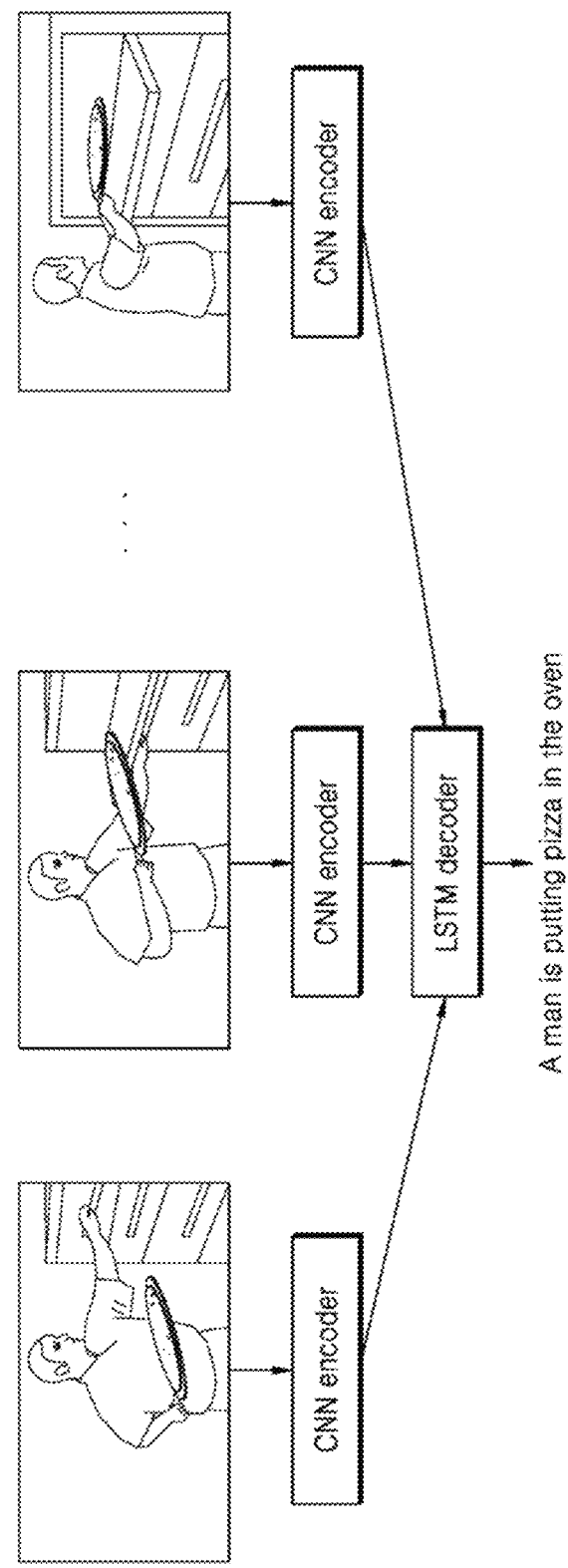
[Figure 3]

[Figure 4]
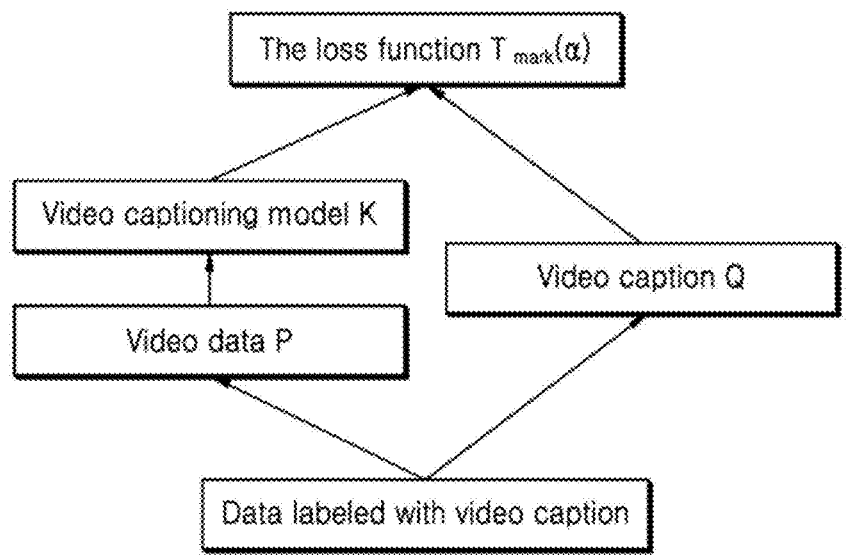
[Figure 5]
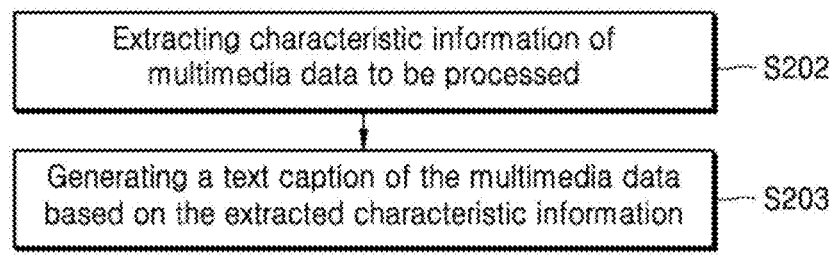

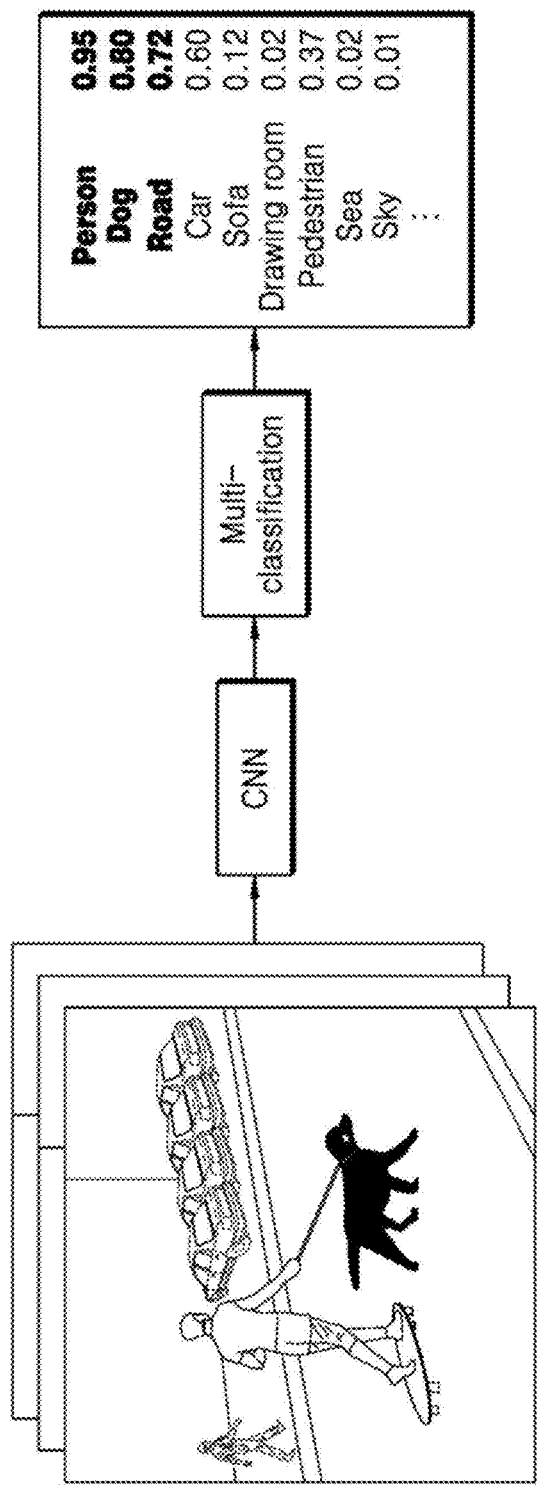
[Figure 6]

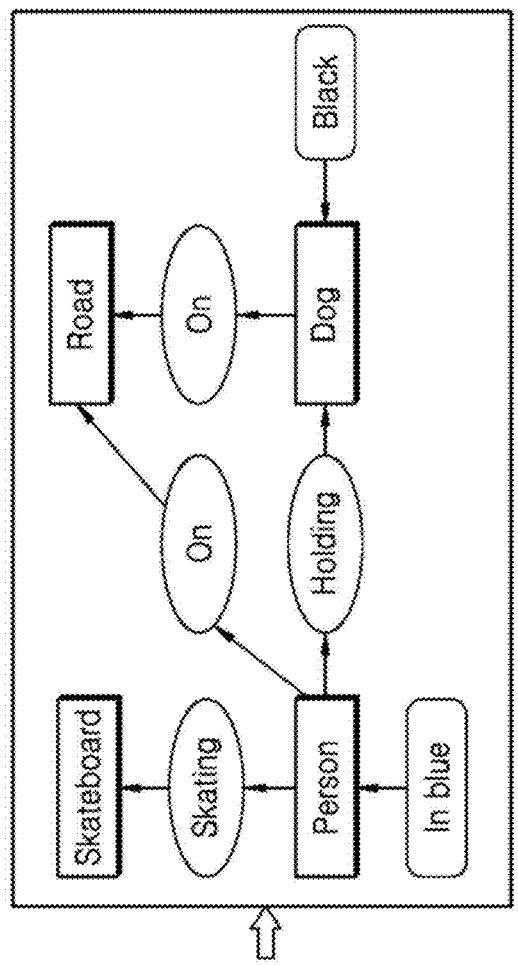
[Figure 7a]

[Figure 7b]
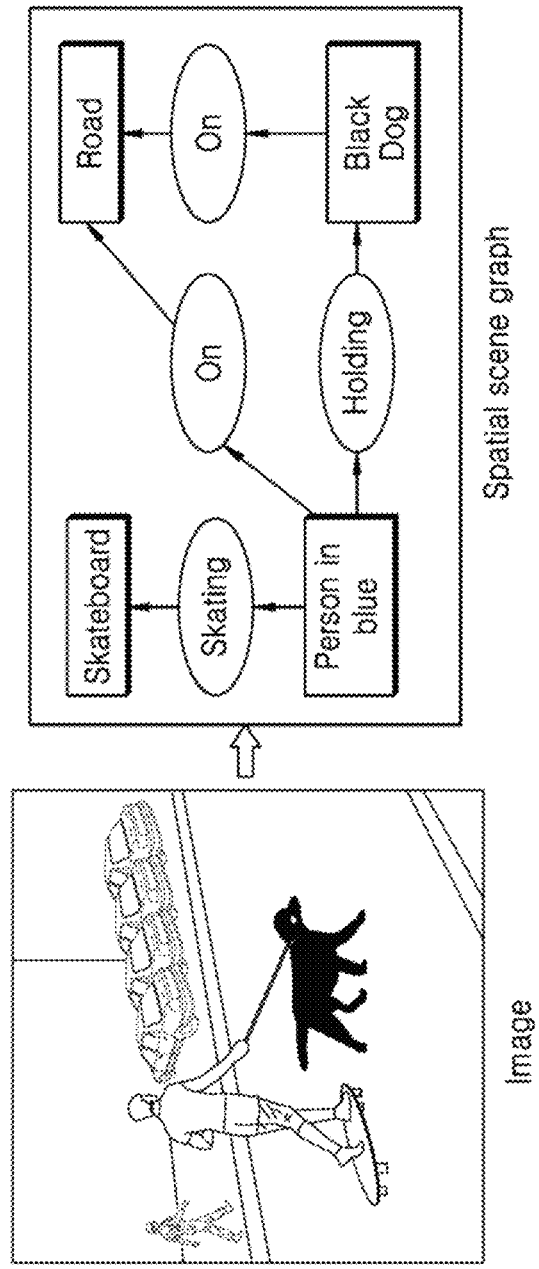

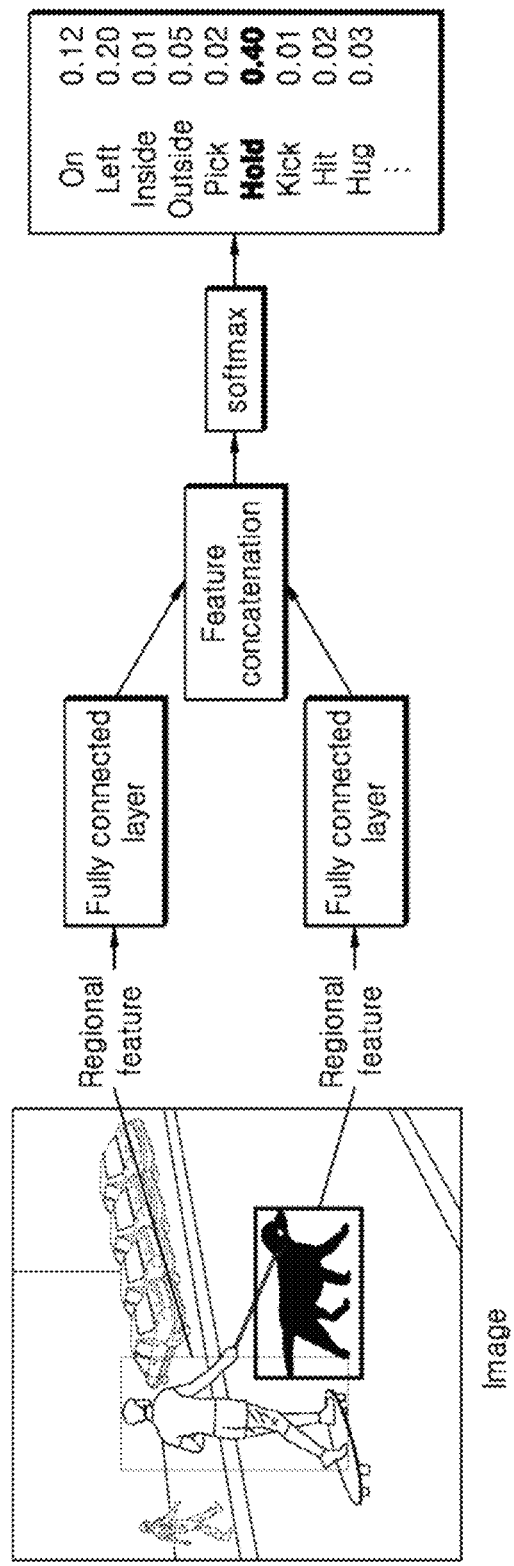
[Figure 8]

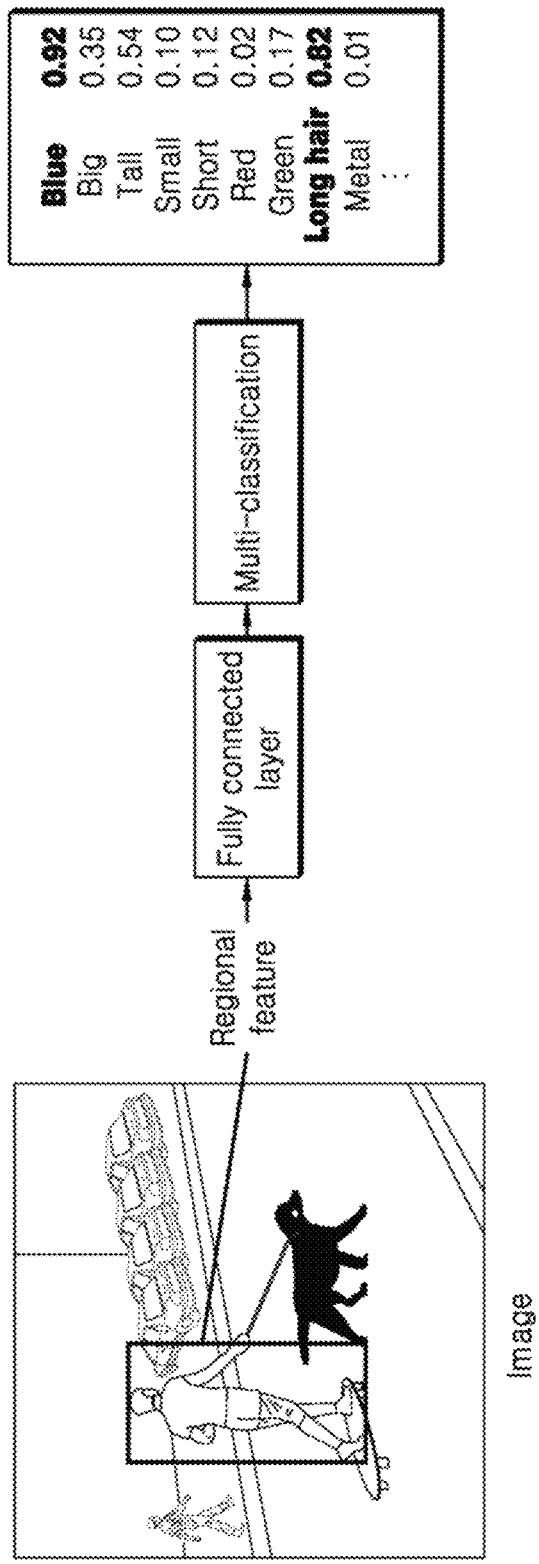
[Figure 9]

[Figure 10]
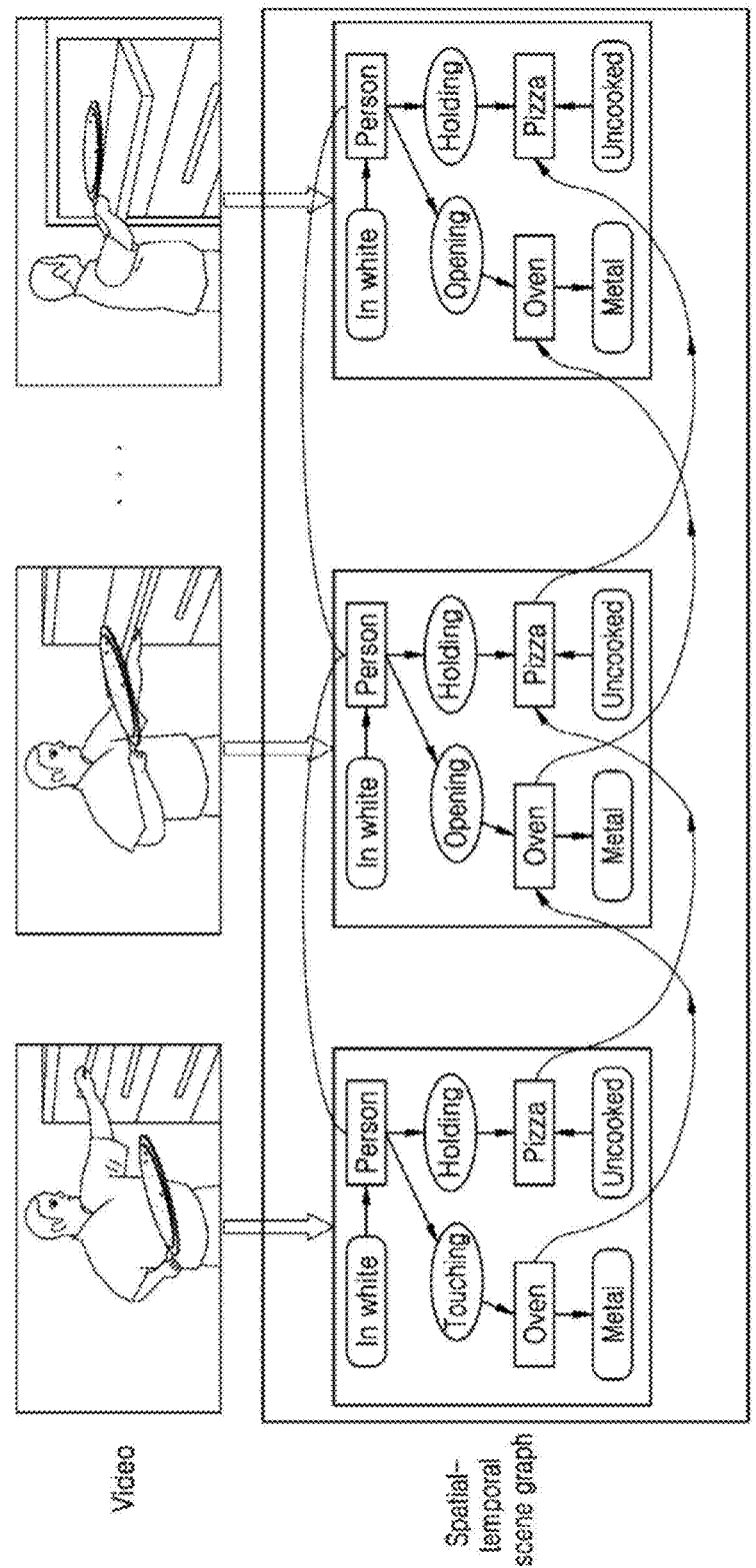

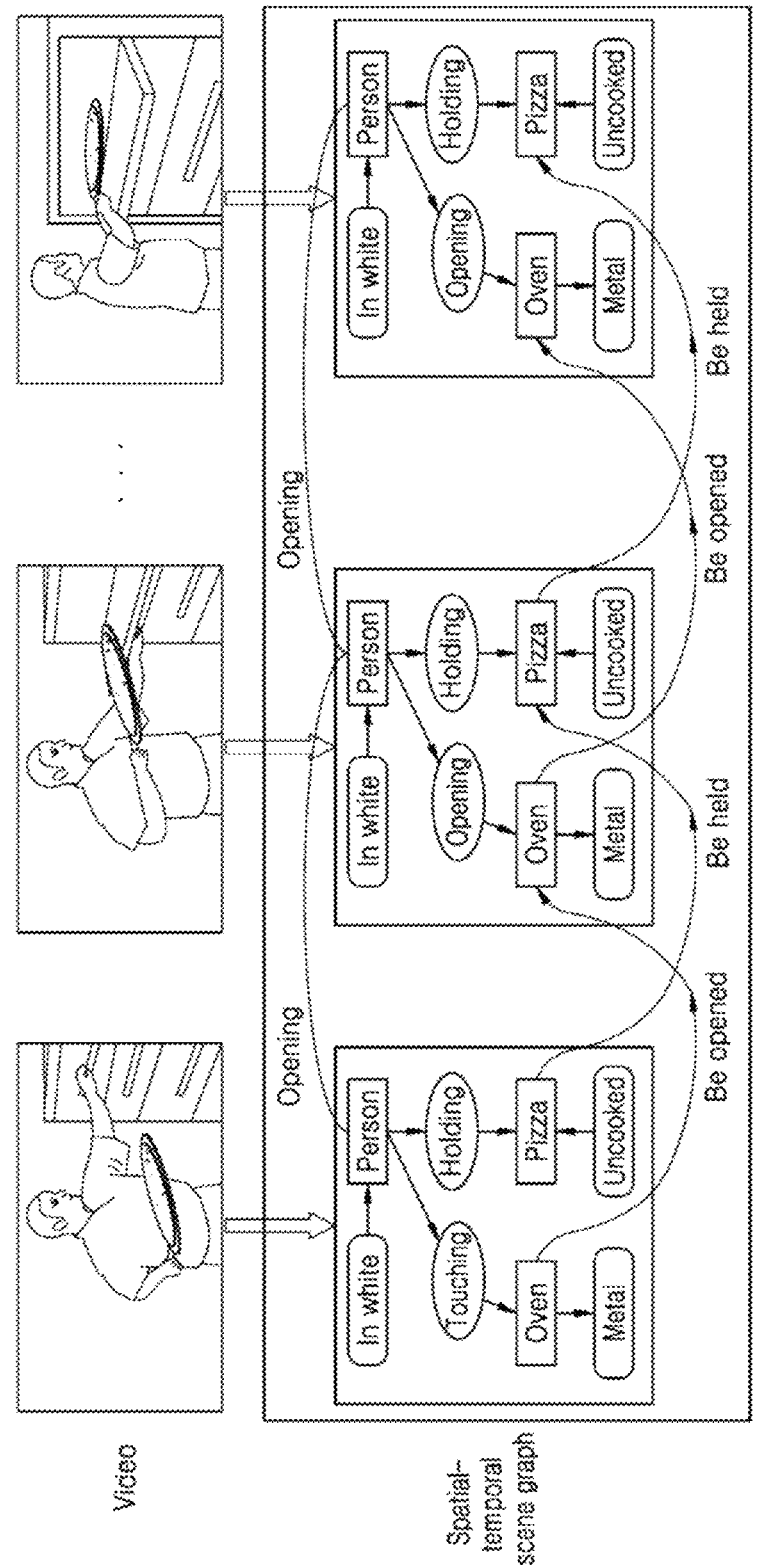
[Figure 11]

[Figure 12]
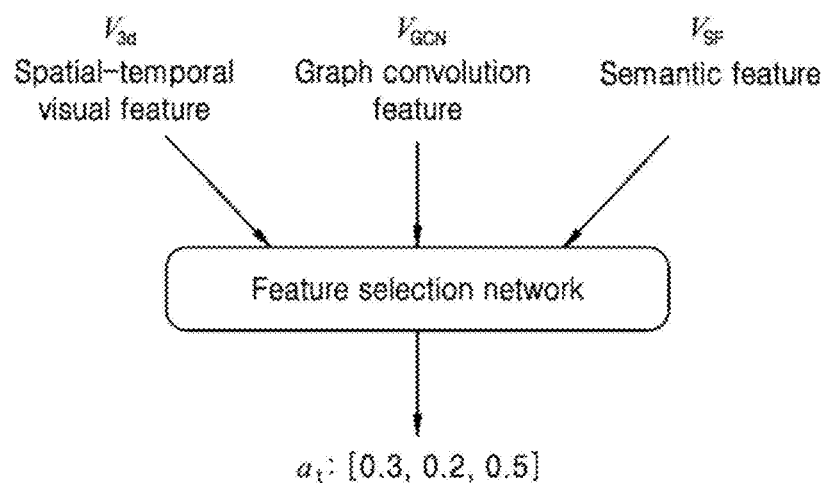

[Figure 13a]
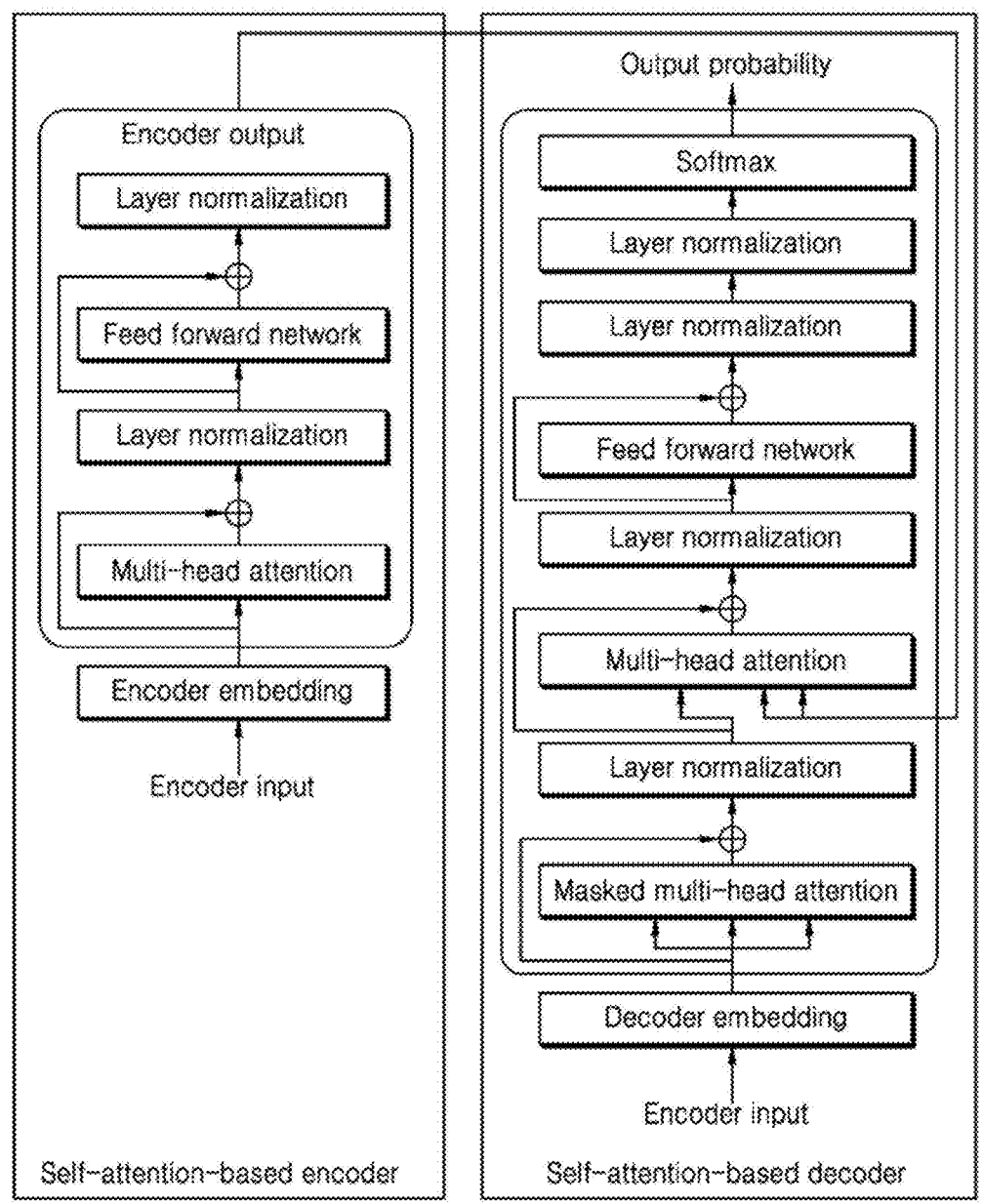

【Figure 13b】
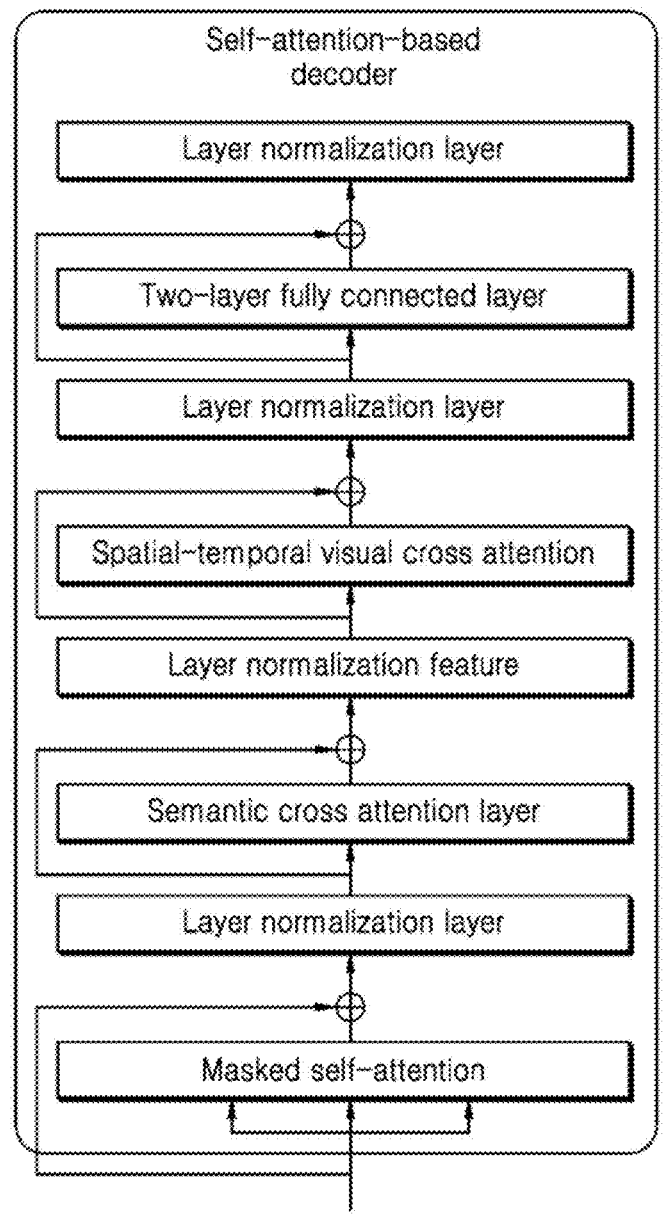

【Figure 14】
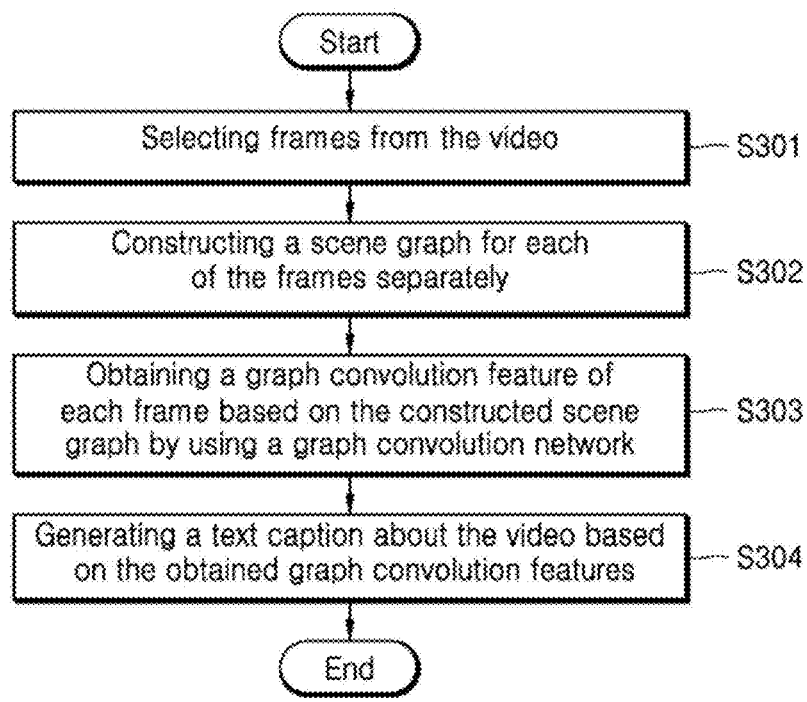

[Figure 15]
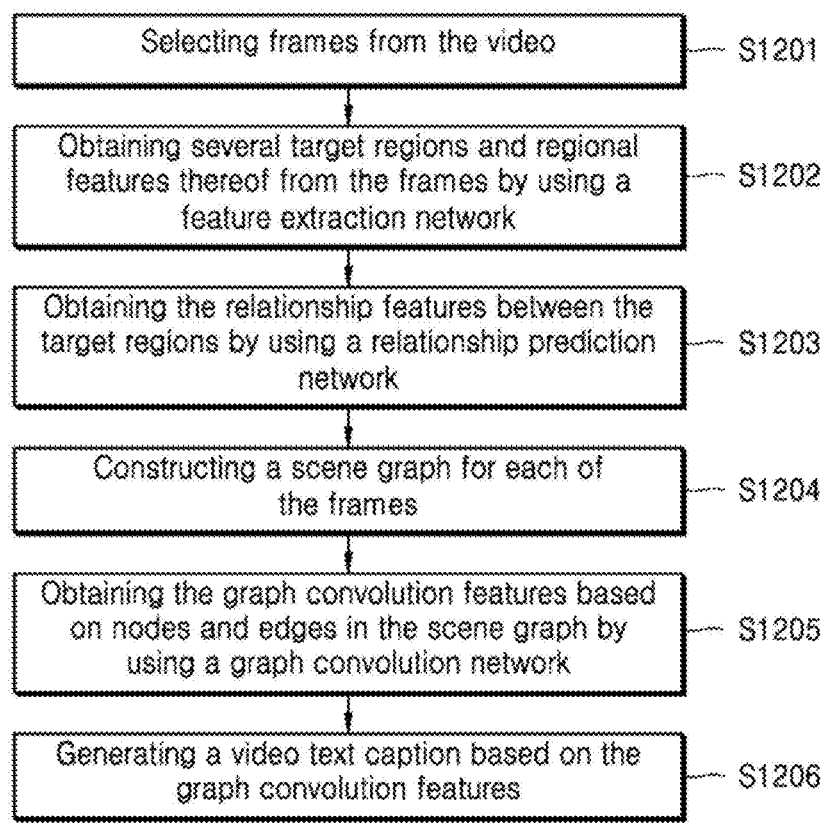

[Figure 16]
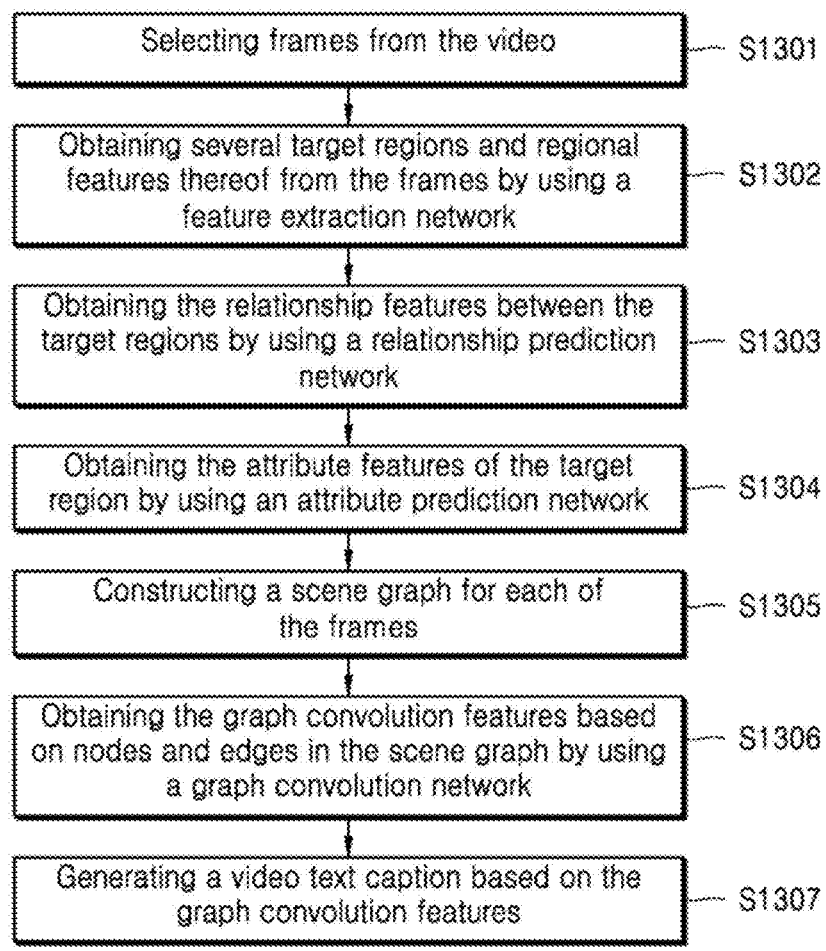

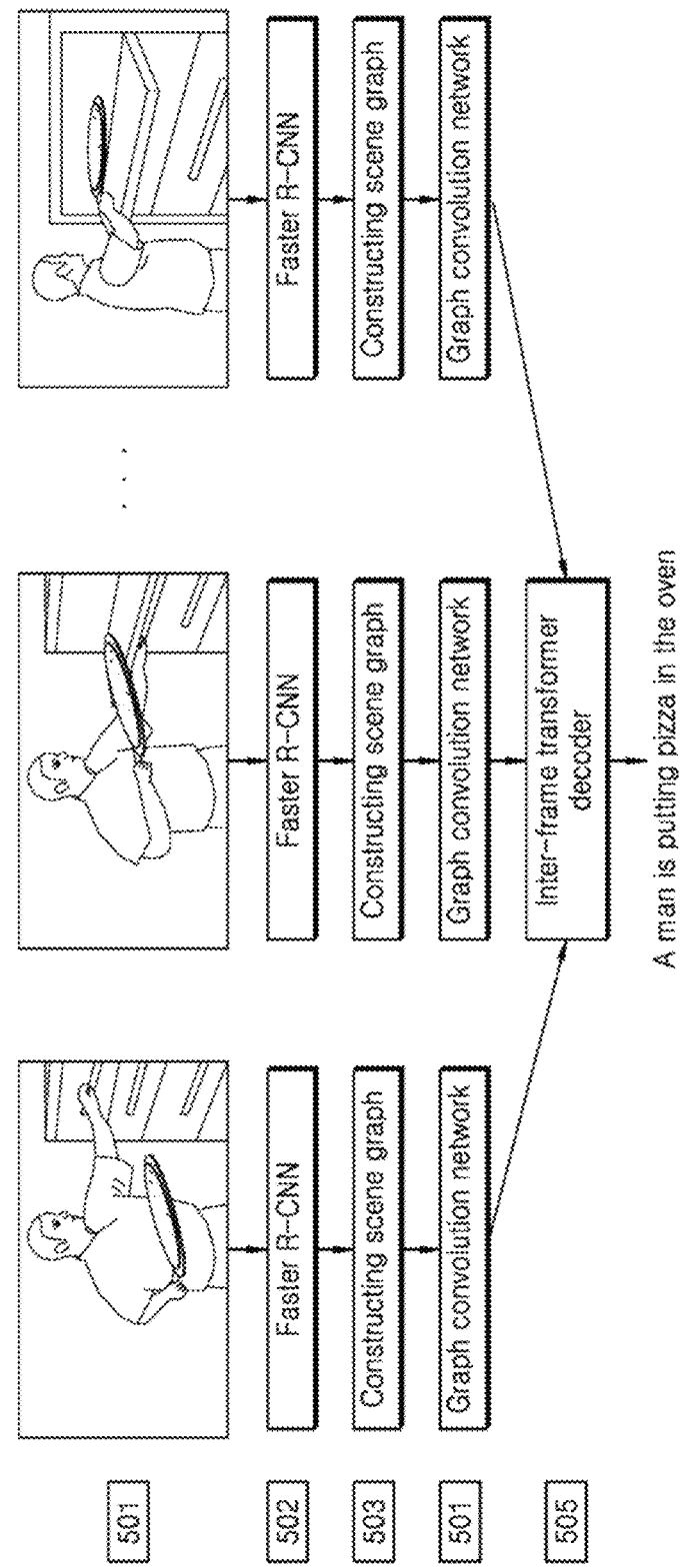

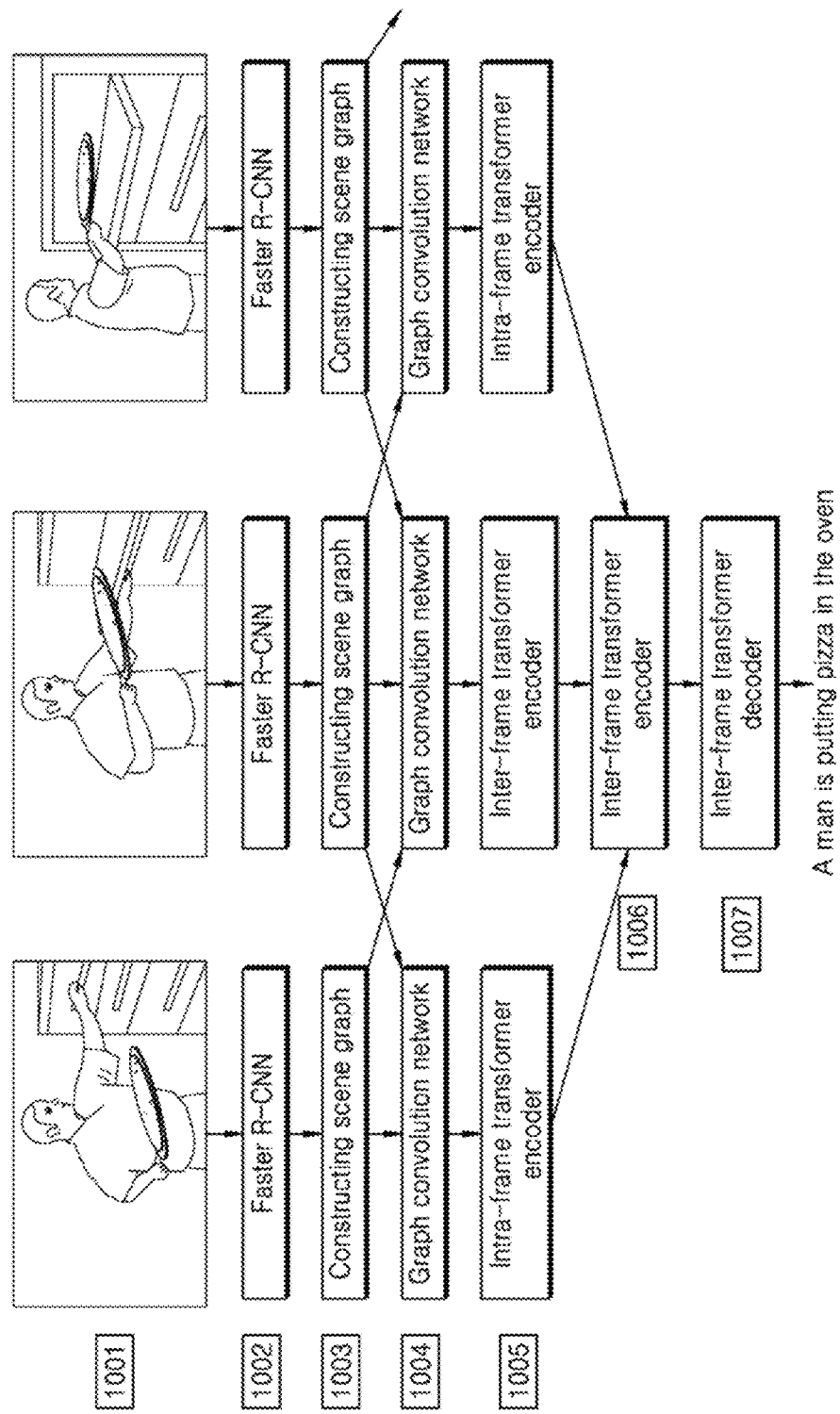
[Figure 17b]

[Figure 18]
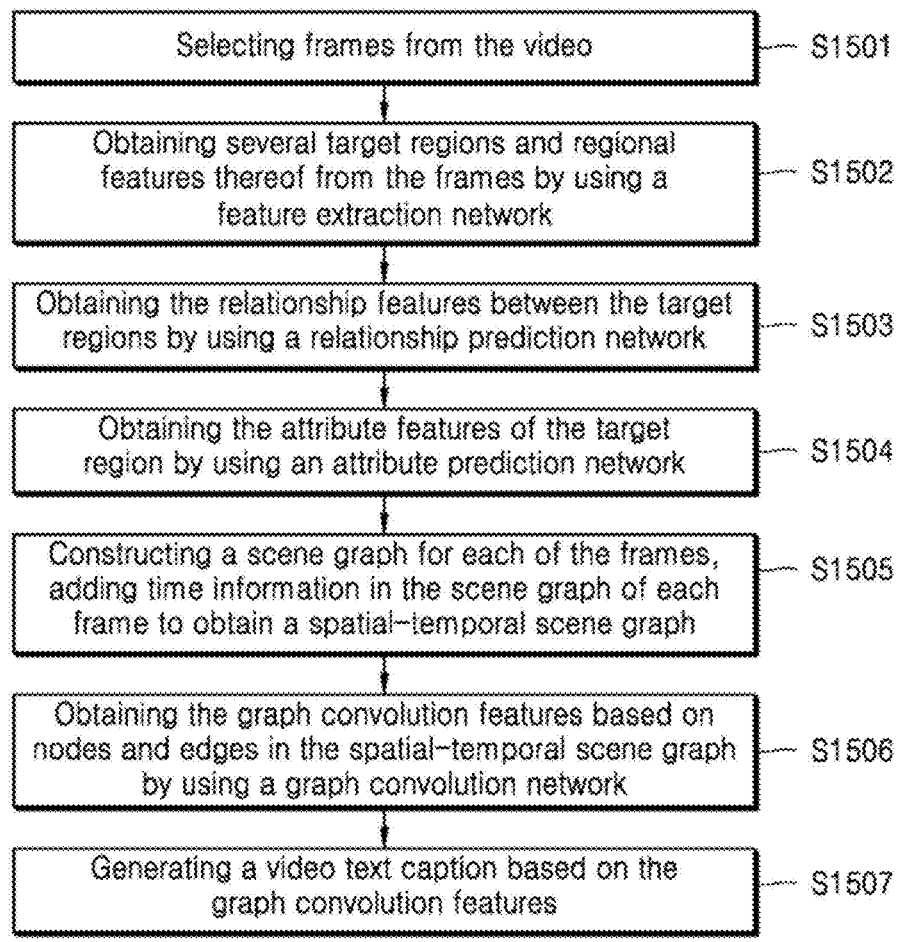

[Figure 19]
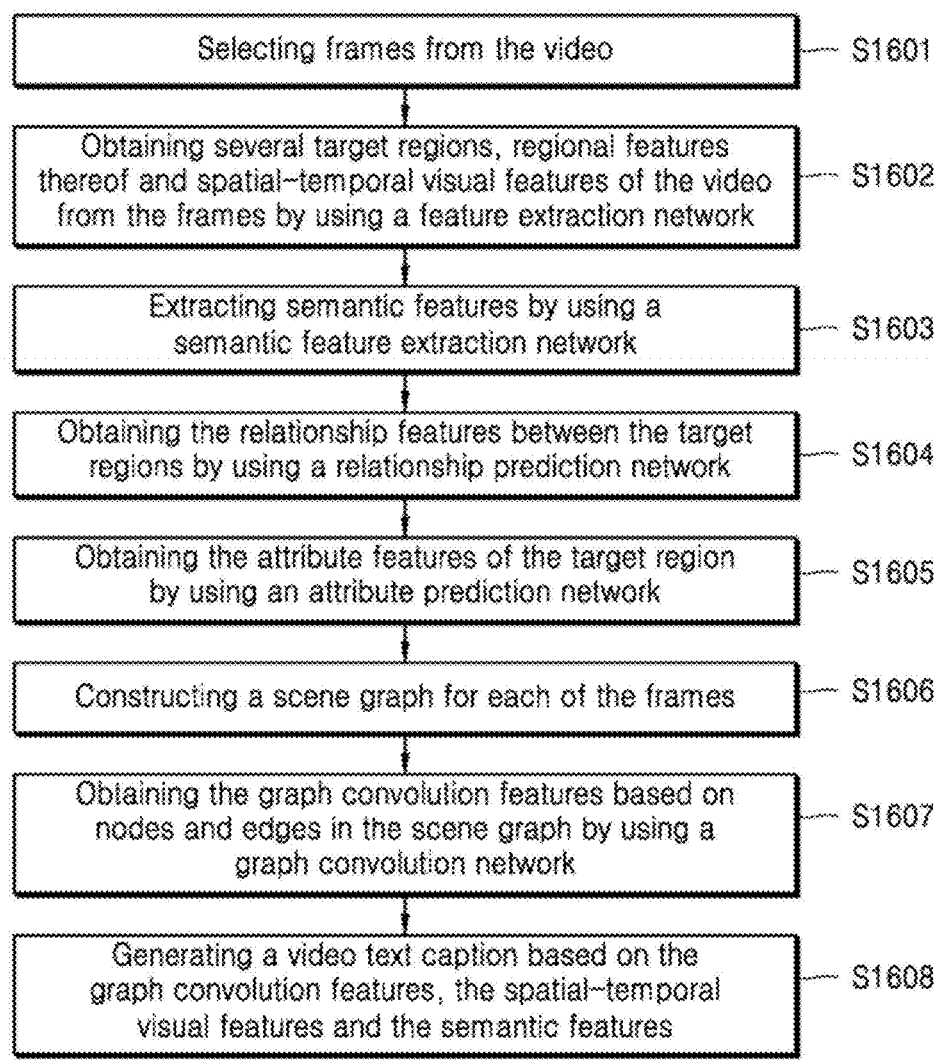

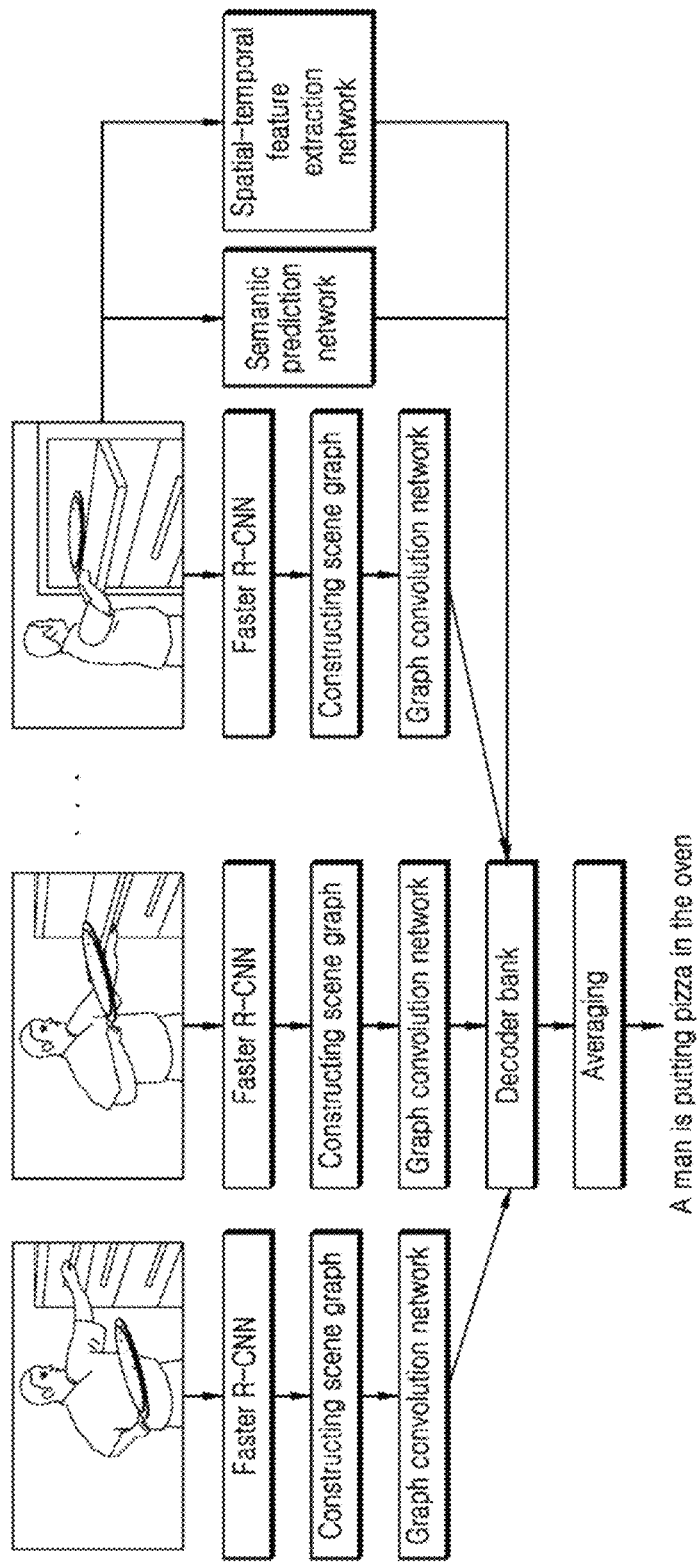
[Figure 20]

[Figure 21]
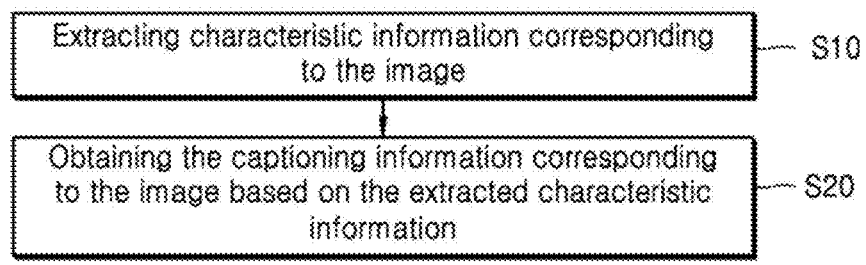

[Figure 22]
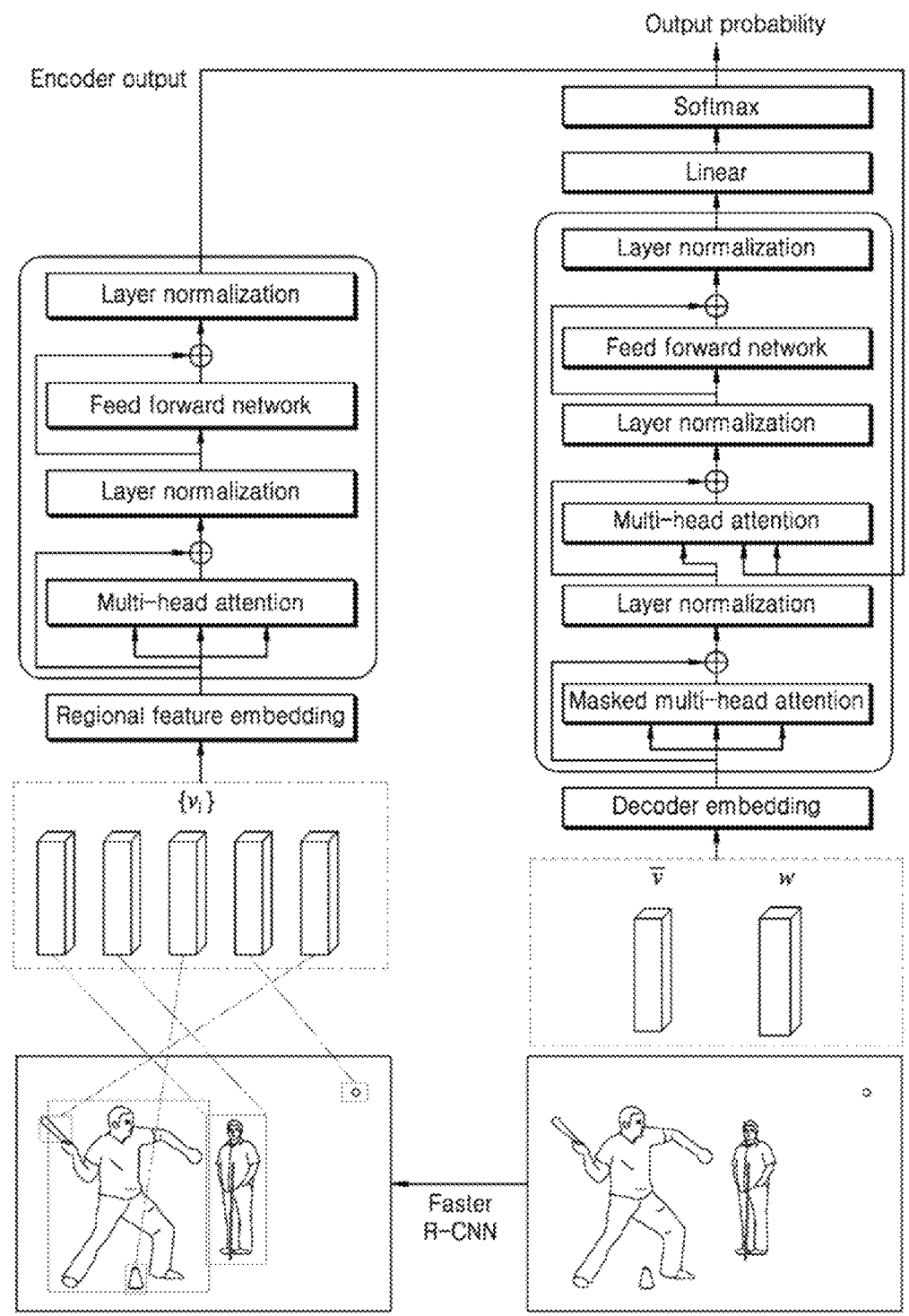

[Figure 23]
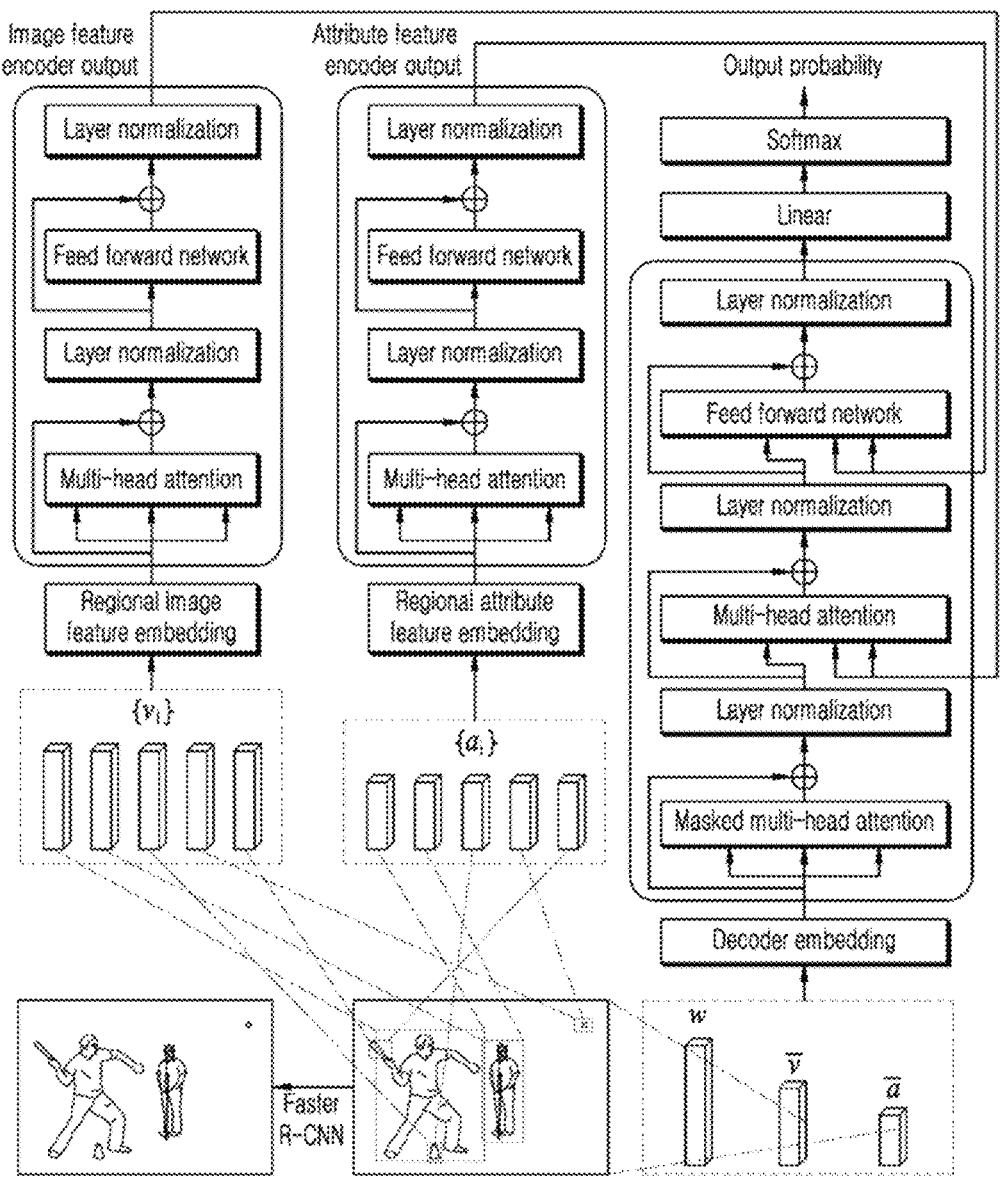

[Figure 24]
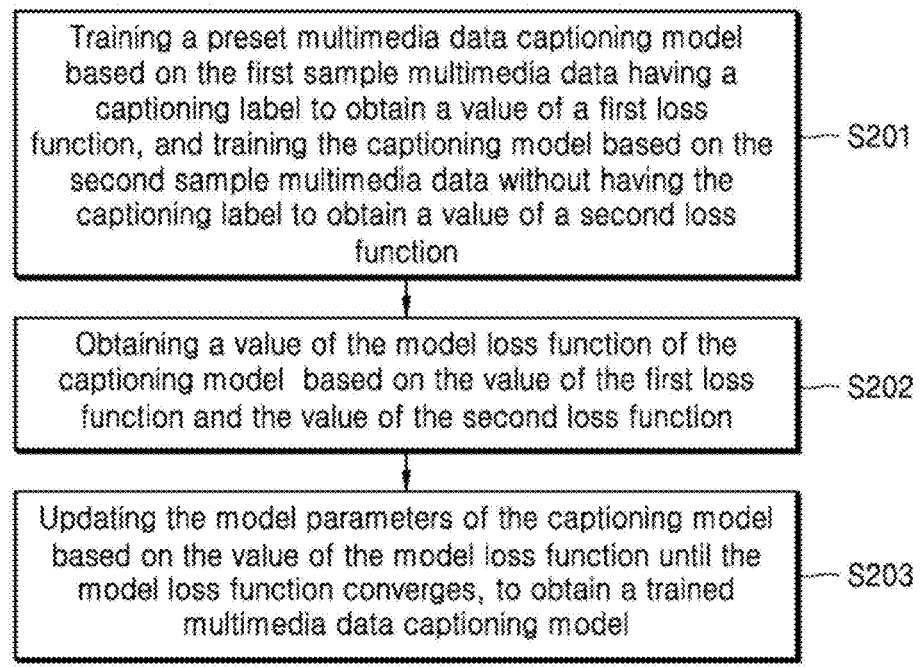

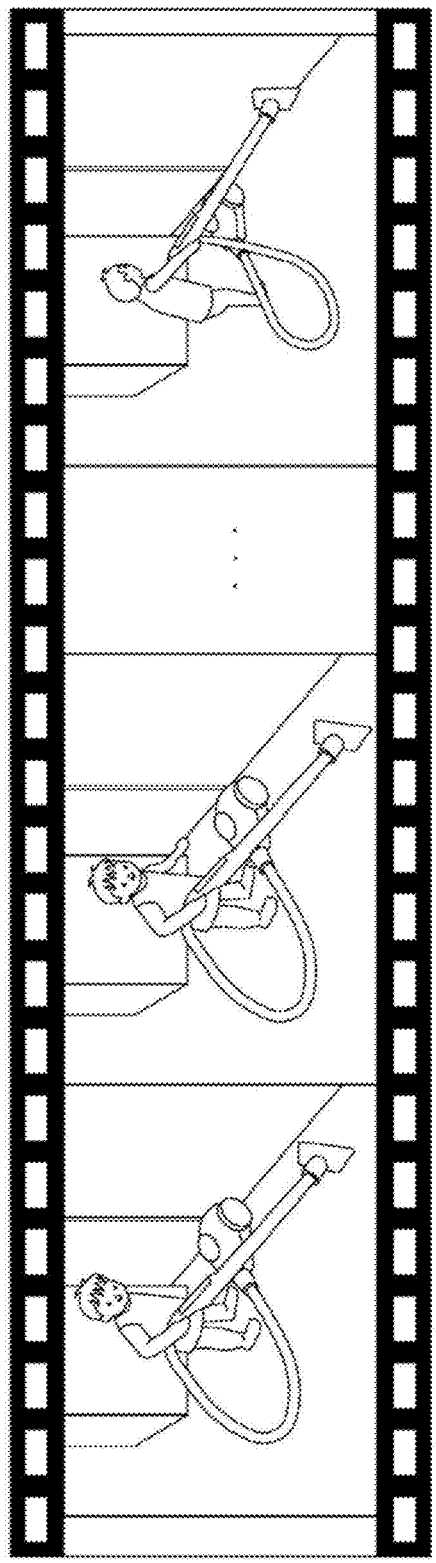
[Figure 25]

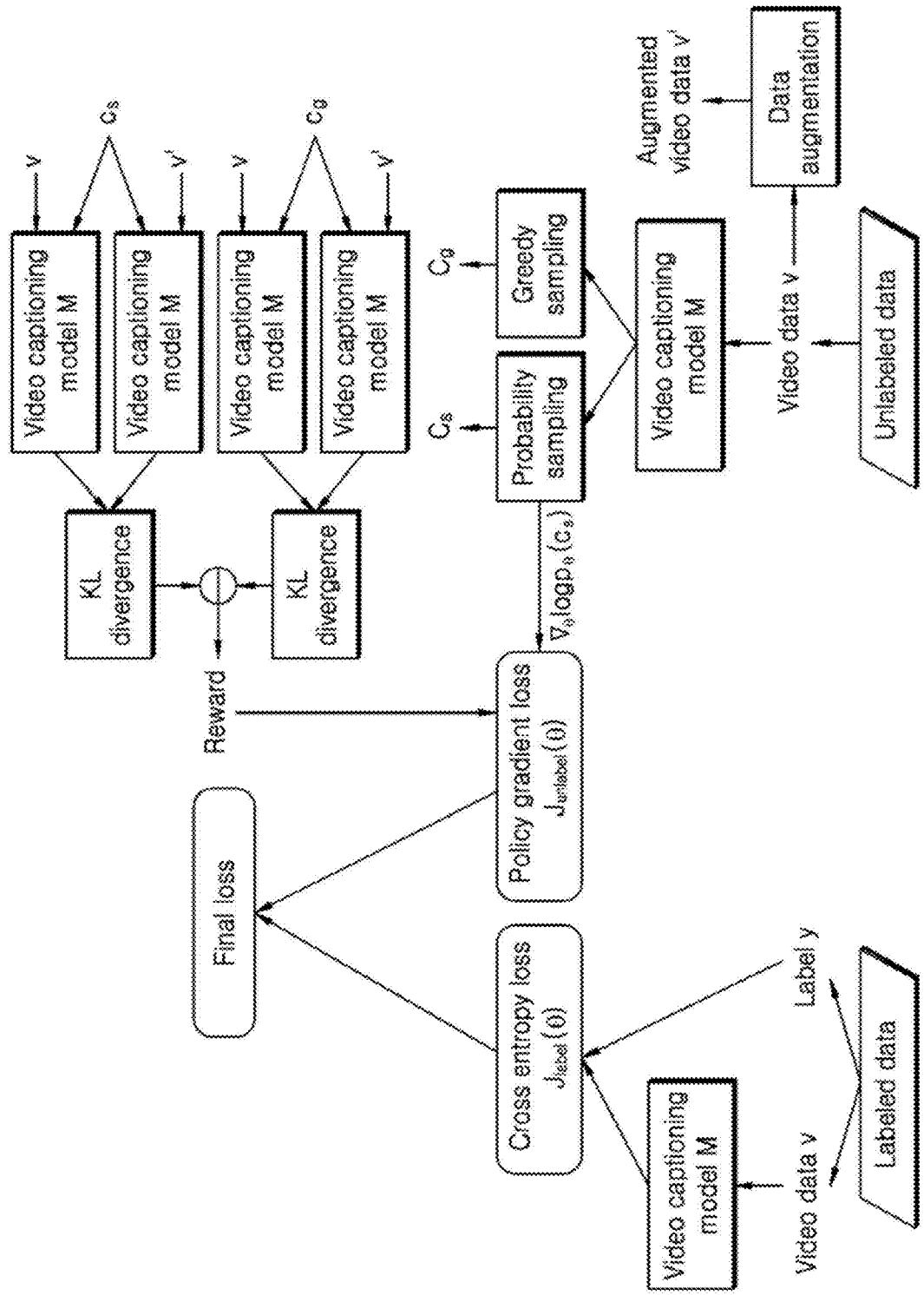
[Figure 26]

[Figure 27]
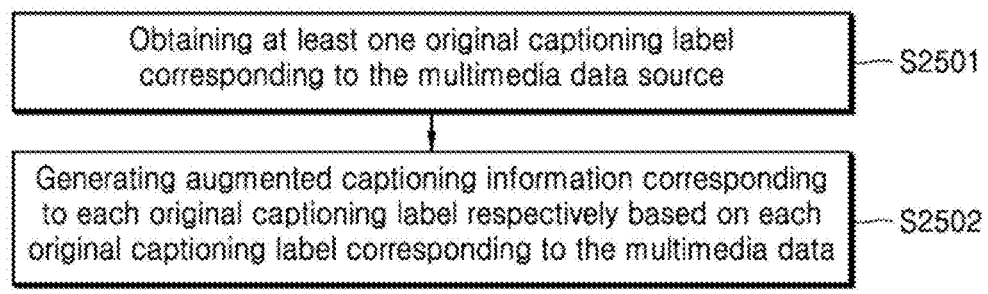

[Figure 28a]
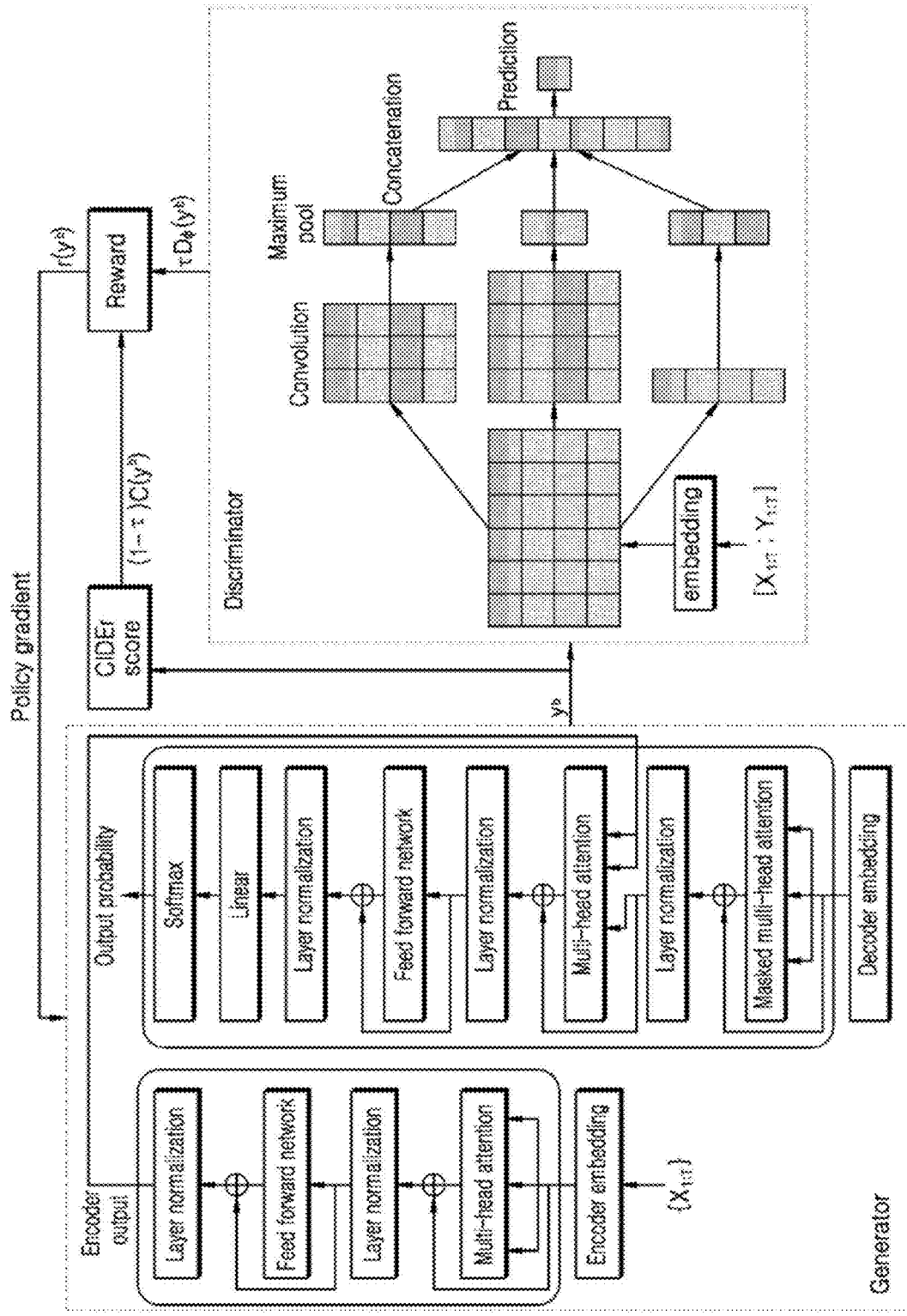

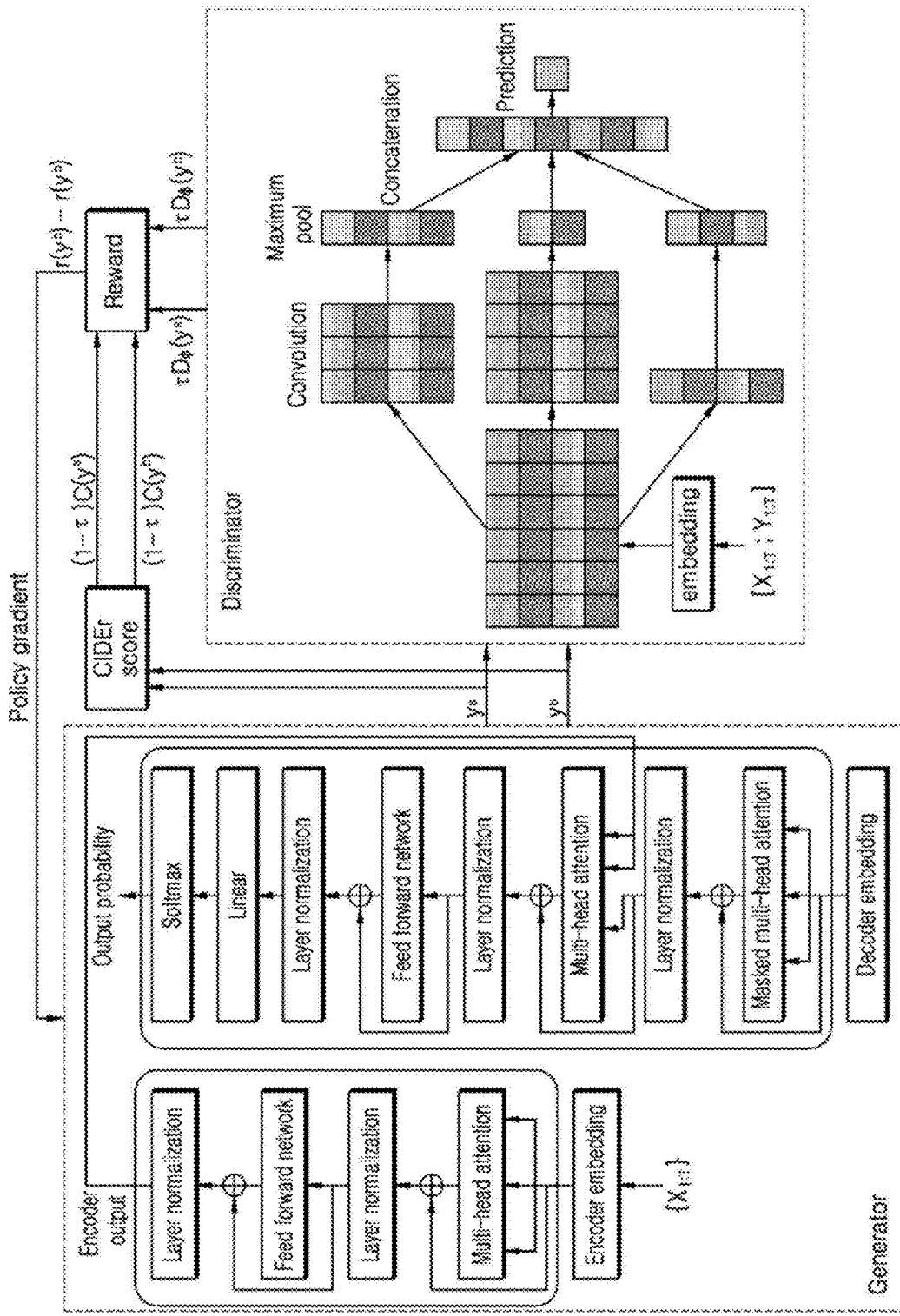
[Figure 28b]

[Figure 29]
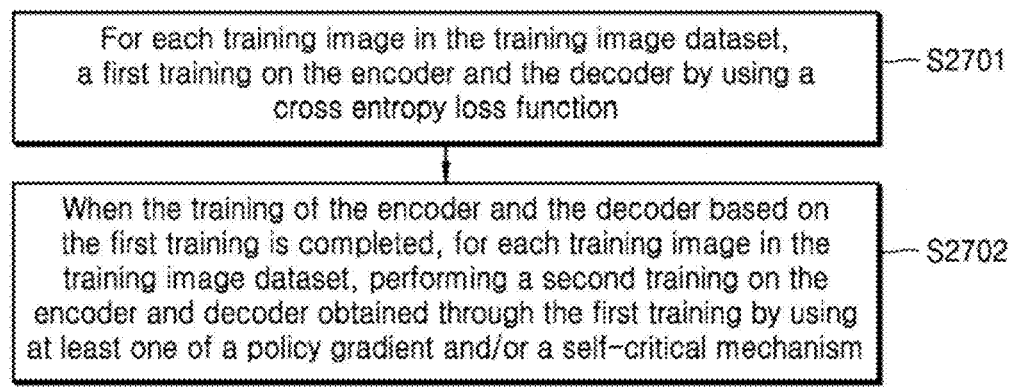

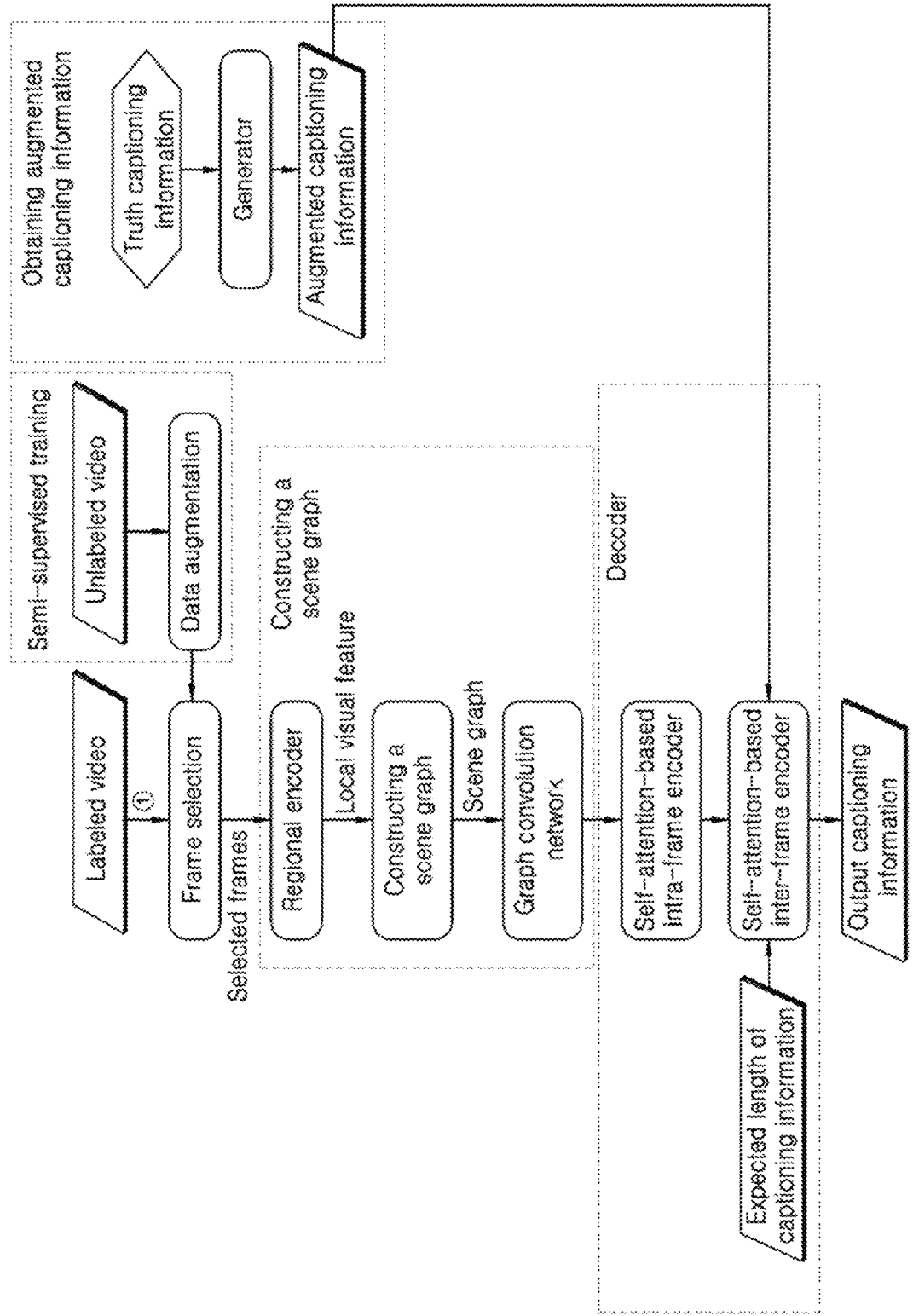
[Figure 30]

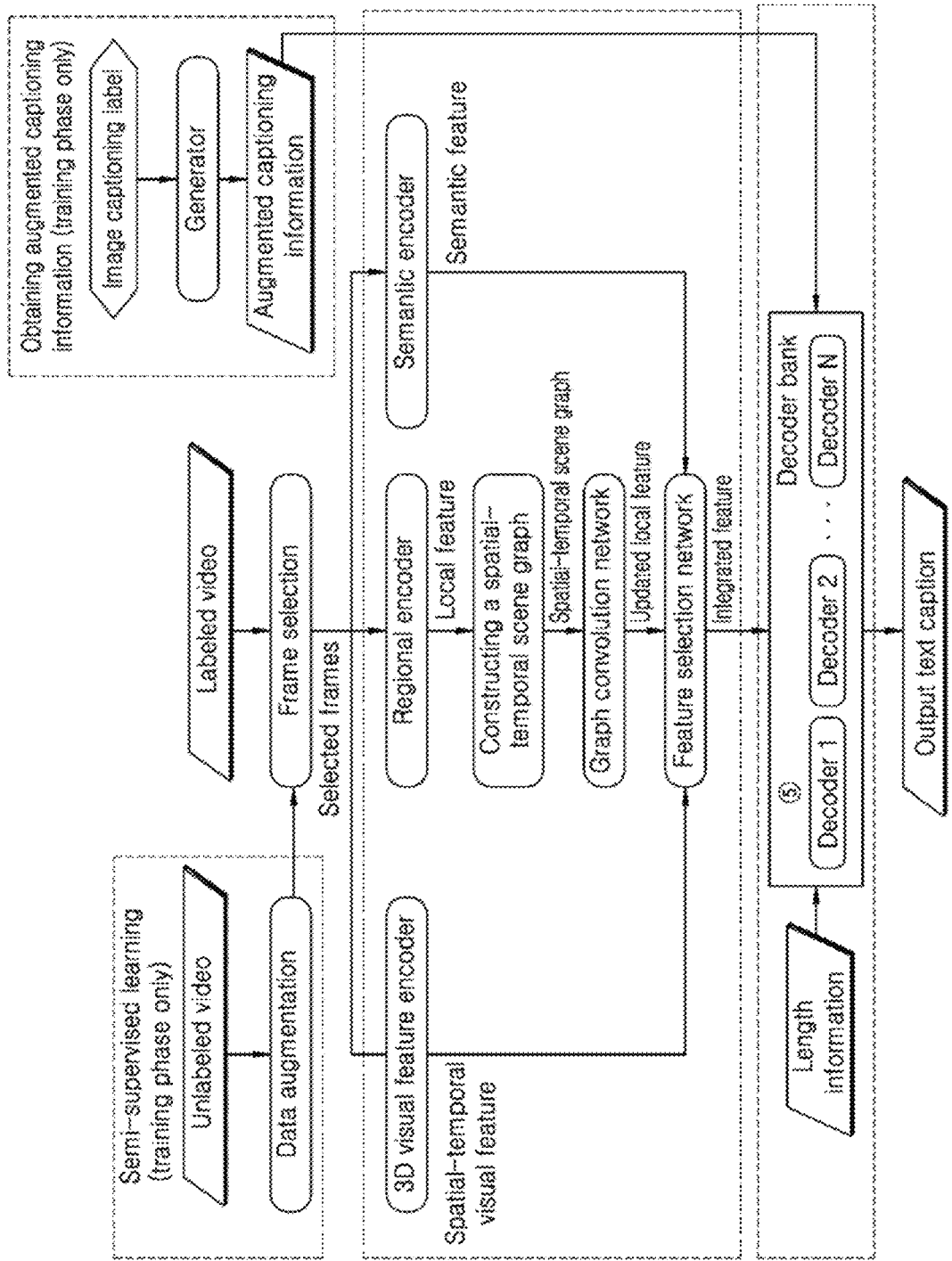
[Figure 31]

[Figure 32]
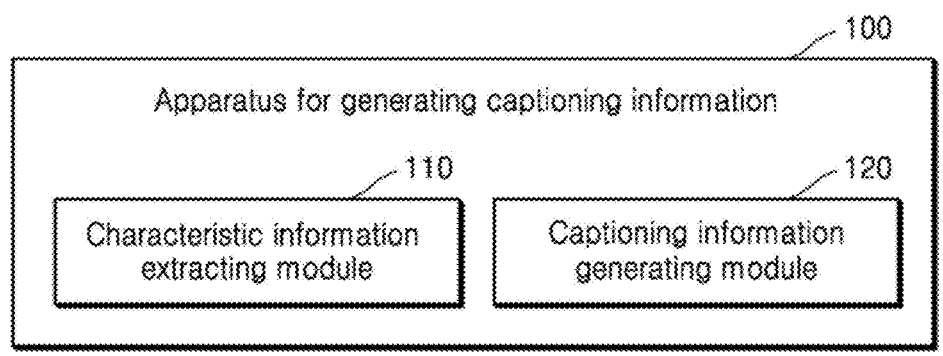
[Figure 33]
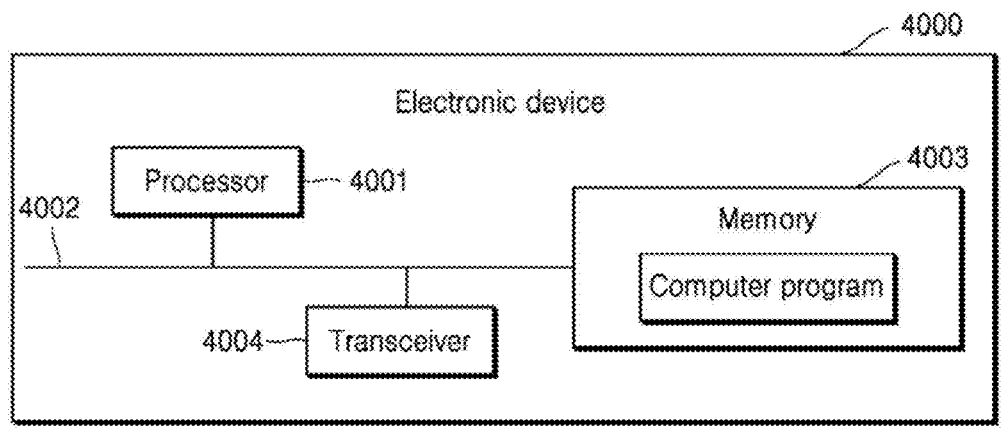

METHOD, APPARATUS, DEVICE AND MEDIUM FOR GENERATING CAPTIONING INFORMATION OF MULTIMEDIA DATA

TECHNICAL FIELD

The present disclosure relates to a field of computer technology, and in particular, the present disclosure relates to a method, an apparatus, an electronic device, and a storage medium for generating captioning information of multimedia data.

BACKGROUND ART

In computer vision technology, Video Captioning or Image Captioning refers to output a text caption for a given video or image. For example, for a video in which a child is cleaning the ground, the video captioning can automatically output a text caption of the video "A child is cleaning the ground". The video captioning is the intersection of computer vision and natural language processing.

The existing method for video captioning generally selects frames from the video, extracts the full-graph features from the selected frames, and then use these features to perform decoding and generate a text caption of the video based on the maximum likelihood probability. The image captioning has a similar principle. It can be seen from the above that the existing video captioning model usually adopts the encoder-decoder structure. The encoder takes charge of extracting the features of the video frames, and the decoder takes charge of decoding the features of the video frames and generating a text caption. Although there are many manners of generating video captioning information, the accuracy of the generated video captioning information still needs to be optimized.

DISCLOSURE

Technical Solution

Embodiments of the present disclosure provide a method, an apparatus, an electronic device, and a storage medium for generating video captioning information, so as to improve the accuracy of the generated video captioning information.

DESCRIPTION OF DRAWINGS

In order to explain the technical solutions in the embodiments of the present disclosure more clearly, the drawings used in the description of the embodiments of the present disclosure will be briefly illustrated below.

FIG. 1 is a schematic diagram of an example image captioning;

FIG. 2 is a schematic diagram of an example video captioning;

FIG. 3 is a schematic diagram of an existing video captioning algorithm;

FIG. 4 is a schematic diagram of a training process of an existing video captioning algorithm based on supervised learning;

FIG. 5 is a schematic flowchart of a method for generating captioning information of multimedia data according to an embodiment of the present disclosure;

FIG. 6 is a schematic diagram of obtaining semantic features through a semantic prediction network according to an embodiment of the present disclosure;

FIG. 7a is a schematic diagram of a spatial scene graph according to an embodiment of the present disclosure;

FIG. 7b is a schematic diagram of a spatial scene graph according to another embodiment of the present disclosure;

FIG. 8 is a principle diagram of obtaining relationship features through a relationship prediction network according to an embodiment of the present disclosure;

FIG. 9 is a principle diagram of obtaining attribute features through an attribute predict ion network according to an embodiment of the present disclosure;

FIG. 10 is a schematic diagram of a spatial-temporal scene graph according to an embodiment of the present disclosure;

FIG. 11 is a schematic diagram of a spatial-temporal scene graph according to another embodiment of the present disclosure;

FIG. 12 is a schematic diagram of a feature selection network according to an embodiment of the present disclosure;

FIG. 13a is a schematic structural diagram of a self-attention-based codec according to an embodiment of the present disclosure;

FIG. 13b is a schematic structural diagram of a self-attention-based codec according to an embodiment of the present disclosure;

FIGS. 14, 15 and 16 are schematic diagrams of a method for generating video captioning information according to three embodiments of the present disclosure, respectively;

FIGS. 17a and 17b are principle diagrams of obtaining video captioning information according to two alternative embodiments of the present disclosure;

FIGS. 18 and 19 are schematic flowcharts of a method for generating video captioning information according to another two alternative embodiments of the present disclosure;

FIG. 20 is a principle diagram of obtaining video captioning information according to an embodiment of the present disclosure;

FIG. 21 is a schematic flowchart of a method for generating image captioning information according to an embodiment of the present disclosure;

FIGS. 22 and 23 are schematic structural diagrams of a codec according to two alternative embodiments of the present disclosure;

FIG. 24 is a schematic flowchart of a method for training a multimedia data captioning model according to an embodiment of the present disclosure;

FIG. 25 is a schematic diagram of a sample video with video captioning label (that is, original captioning label) according to an embodiment of the present disclosure;

FIG. 26 is a principle diagram of a method for training a video captioning model according to an embodiment of the present disclosure;

FIG. 27 is a schematic flowchart of a method for obtaining augmentation multimedia data captioning information according to an embodiment of the present disclosure;

FIGS. 28a and 28b are schematic structural diagrams of two codecs according to two alternative embodiments of the present disclosure;

FIG. 29 is a schematic flowchart of a method for training an image captioning model according to an embodiment of the present disclosure;

FIGS. 30 and 31 are principle diagrams of a method for generating video captioning information according to two embodiments of the present disclosure;

FIG. 32 is a schematic structural diagram of an apparatus for generating captioning information of multimedia data according to an embodiment of the present disclosure; and FIG. 33 is a schematic structural diagram of an electronic device applicable to an embodiment of the present disclosure.

BEST MODE

The embodiments of the present disclosure aim to provide a method, an apparatus, an electronic device, and a storage medium for generating video captioning information, so as to improve the accuracy of the generated video captioning information. The solutions provided in the embodiments of the present disclosure are as follows.

According to a first aspect of the present disclosure, a method for generating captioning information of multimedia data is provided, and the method includes: extracting characteristic information of multimedia data to be processed, wherein the multimedia data includes a video or an image; and generating a text caption of the multimedia data based on the extracted characteristic information.

According to a second aspect of the present disclosure, a device for generating captioning information of multimedia data is provided, and the device includes: a characteristic information extracting module configured to extract characteristic information of multimedia data to be processed, wherein the multimedia data includes a video or an image; and a captioning information generating module configured to generate a text caption of the multimedia data based on the extracted characteristic information.

According to a third aspect of the present disclosure, an electronic device is provided, and the electronic device includes a memory and a processor, where the memory stores a computer program, and the processor is configured to execute the computer program to perform the methods provided by the embodiments of the present disclosure.

According to a fourth aspect of the present disclosure, a computer-readable storage medium is provided, and the storage medium stores a computer program that, when executed by a processor, performs the method provided by the embodiments of the present disclosure.

The beneficial effects achieved by the technical solutions according to the embodiments of the present disclosure will be described in detail in the following description of the specific implementation manner in combination with various alternative embodiments, which are not described here.

MODE FOR INVENTION

The embodiments of the present disclosure are described in detail below. The embodiments described below with reference to the drawings are exemplary and are only used to explain the present disclosure for assisting a comprehensive understanding of the embodiments of the disclosure defined by the claims and their equivalents. It includes various specific details to assist understanding, but these examples and details are only considered as exemplary, and should not be construed as limiting the disclosure. Accordingly, those of ordinary skill in the art would recognize that changes and modifications may be made to the embodiments described without departing from the scope and spirit of the disclosure. In addition, for clarity and brevity, some descriptions of well-known functions and structures may be omitted in the description below.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

First of all, it should be noted that the method for generating captioning information of multimedia data provided in the embodiments of the present disclosure may be used to generate captioning information of a video including multi-frame images, and may also be used to generate captioning information of an image. The source of the image is not limited in the embodiment of the present disclosure. For example, it may be an image which is acquired, downloaded, or received, or an image in a video, such as a key frame image or a specified frame image. That is, the generating method in the embodiment of the present disclosure may be a method for generating captioning information of a video, or a method for generating captioning information of an image.

In order to better understand and explain the solutions of the embodiments of the present disclosure, some technologies involved in the embodiments of the present disclosure are briefly described below.

In computer vision technology, the video/image caption refers to output a text caption for a given video or image, and it is the intersection of computer vision and natural language processing. Compared with other computer vision tasks such as object detection, image segmentation, the video/image captioning is a more challenging task. It not only needs a more comprehensive understanding of the video or image, but also expresses the content of the video or image in the form of natural language. As shown in FIG. 1, when the image shown in FIG. 1 is given, a text caption "a boy is playing tennis" of the image may be automatically output. As shown in FIG. 2, when a video including multi-frame images shown in FIG. 2 is given, a text caption of the video "a child is cleaning the ground" may be automatically output.

Currently, the existing image captioning models usually adopt an encoder-decoder structure. The encoder is usually designed based on Convolutional Neural Networks (CNN), which takes charge of extracting the features of the image, and the decoder is usually designed based on Recurrent Neural Network (RNN), which takes charge of decoding the features of the image to generate a text caption.

Similarly, the existing video captioning models generally select frames from the video, extract the full-graph features of the selected frames by using the CNN, and then decode the features of all frames by using the RNN and generate a text caption of the video based on the maximum likelihood probability. It can be seen that the existing video captioning algorithms usually use the encoder-decoder structure. The CNN is used to encode video frames and takes charge of extracting the features of the video frames, so it can also be referred to as an encoder or a CNN encoder. The RNN decodes video frames and takes charge of decoding the features of the video frames and generating the text caption, so it can also be referred to as a decoder or RNN decoder. The RNN can use a Long Short-Term Memory (LSTM), which can be referred to as an LSTM decoder at this time.

As an example, a schematic diagram of an existing video captioning model is shown in FIG. 3. As shown in FIG. 3, frames shown in FIG. 3 are selected from the video (the ellipsis in the figure indicates frames which are omitted and not shown), each frame is separately processed by the CNN encoder to extract the features of each selected video frame, and the extracted features are decoded by the LSTM decoder to generate the corresponding text caption "A man is putting pizza in the oven".

Although the prior art has been able to generate a text caption of a video or an image, there are at least the following technical problems in the prior art.

(1) Existing decoders, such as RNN, which is a cyclic structure, need to be trained step by step during training. Therefore, the existing decoders have the problems of slow training speed and low training efficiency, and it is difficult to learn long-range dependency, resulting in problems such as insufficient decoding ability.

(2) At present, in the datasets commonly used in the video/image captioning field, the training sample (i.e., sample video or sample image) has less captioning information. For example, there are usually only 5 captioning labels for the sample image. It is often difficult to fully express the information in the image by only using 5 captioning labels, and because of the diversity of natural language, the same semantics can be expressed in multiple ways. Therefore, the poor diversity of the captioning information of the training samples is also a problem of hindering the further development of the field.

(3) For the video containing multi-frame images, the prior art does not consider intra-frame information. However, this information is of great significance for generating a more accurate video caption. Therefore, it needs to solve the problem of how to make full use of intra-frame information.

(4) The prior art does not take into account the semantic information of the video or image, which is of great significance for generating more accurate video caption.

(5) Existing video or image captioning models are generally based on supervised learning methods. For example, for video captioning algorithms, each training video corresponds to one or more labeled video caption. As shown in FIG. 4, for the data labeled with video caption, the video data P in the data is input to the video captioning model K, so that the video captioning model K analyzes and processes the video data P to generate the corresponding video caption, and then calculate the value of the loss function Tmark($\alpha$) based on the video caption Q in the labeled data and the generated video caption, and the learning of the video captioning model K is guided by the loss function Tmark($\alpha$). However, labeling videos with captions requires a lot of labor and time costs, which causes the number of samples in existing video captioning datasets be limited, thereby leads that the video captioning model trained based on the video captioning dataset has poor accuracy and precision.

(6) In the existing methods of generating video captioning information or image captioning information, the length of the generated captioning information is uncontrollable and cannot meet the user's application requirements for different lengths of captioning information in different application scenarios. For example, when the user posts images or videos, long captioning information is required in order to share more detailed information. For example, when the user drives a car, short captioning information is required. However the existing technology cannot meet above demands.

In order to solve at least one of the foregoing technical problems in the prior art, embodiments of the present disclosure provide a method, an apparatus, an electronic device, and a storage medium for generating captioning information of multimedia data, where the multimedia data may be a video or an image.

In order to make the purpose, technical solution, and advantages of the present disclosure clearer, each of the alternative implement at ion manners of the present disclosure and the technical solutions of the embodiments of the present disclosure will be described in detail with reference to specific embodiments and drawings. The following specific embodiments may be combined with each other, and the same or similar concepts or processes may not be repeated in some embodiments. The embodiments of the present disclosure will be described below with reference to the drawings.

FIG. 5 is a schematic flowchart of a method for generating captioning information of multimedia data according to an embodiment of the present disclosure. As shown in the figure, the method may mainly include the following steps.

Step S101: characteristic information of multimedia data to be processed is extracted.

Step S102: a text caption of the multimedia data is generated based on the extracted characteristic information.

In the embodiment of the present disclosure, the multimedia data includes a video or an image. Based on the method provided in the embodiment of the present disclosure, video captioning information or image captioning information can be generated.

In an alternative embodiment of the present disclosure, the extracting characteristic information of multimedia data to be processed includes at least one of the following: extracting local visual features of targets contained in respective target regions of each image in the multimedia data; extracting semantic features of the multimedia data; extracting spatial-temporal visual features of the multimedia data when the multimedia data is a video; extracting global visual features of the multimedia data; extracting attribute features of the targets contained in respective target regions of each image in the multimedia data; and extracting global attribute features of each image in the multimedia data.

That is, the characteristic information of the multimedia data may include one or more of local visual feature, semantic feature, spatial-temporal visual feature, global visual feature, local attribute feature (i.e., the attribute feature of the target), and global attribute feature. The local visual feature is a visual feature of a target region in the image, that is, the target region is local relative to an image to which the target region belongs.

For an image, it may be the above-mentioned each image in the multimedia data. For a video, each image in the multimedia data may be each frame in the video, or several frames selected from the video. For example, for a given video, it may select frames from a given video at equal intervals, or several image frames (that is, key frames) from a given video by using a key frame algorithm, where the frames may be selected through a neural network. In the following description, for a video, each image of the multimedia data will be described by taking each frame selected from the video as an example.

The visual feature is a feature that can reflect the pixel information in the image, and the attribute feature is a feature that can reflect the attribute information of each target in the image. Therefore, the visual feature and the attribute feature can be used to generate the captioning information of the video or image, and the local visual feature can more accurately and granularly reflect the information of respective target regions in each image. Therefore, the local visual feature make full use of the intra-frame information of each image, which can generate more accurate text caption of videos or images.

In actual applications, in addition to the visual features and attribute features of the image, some other features are also helpful for the captioning of multimedia data. For example, the spatial-temporal visual features of a video can effectively reflect dynamic changes in spatial and temporal of a video, and the semantic features of a video or image reflect the semantic information of the content contained in a video or image. Therefore, when generating a text caption of a video or image, it may also extract the spatial-temporal visual features of the video, semantic features of the video or image and so on through a neural network, and incorporate more diverse features into the generation of video captioning information to enhance the expressiveness of the generated video caption and improve the accuracy of the captioning information.

Alternatively, for each image, a feature extraction network can be used to obtain several target regions and the regional features of respective target regions (that is, the above local visual features, which can also be referred to as target features). For the attribute features, it may be obtained through an attribute prediction network. For example, a Fast Region-Convolutional Neural Network (Faster R-CNN) can be applied to each image to extract several target regions and local visual features (i.e., local features/regional features) of respective target regions. Faster R-CNN can be pre-trained through sample datasets (such as ImageNet or Visual Genome datasets).

It should be noted that the method of extracting target regions and the local features of respective target regions by Faster Region-CNN is exemplary, and the disclosure is not limited thereto, and the feature extraction network may also be implemented by any other available neural network.

For the spatial-temporal visual features of video, they may be obtained by using the spatial-temporal feature extraction network. For example, the spatial-temporal visual features of the video may be extracted by using 3D visual feature extract ion model such as Efficient Convolutional network for Online video understanding (ECO) model or 3D-CNN. Of course, other spatial-temporal visual feature extraction networks can also be used. For the semantic features, they can be extracted through the semantic prediction network.

Specifically, the trained semantic prediction network can be used to obtain the semantic features of the entire video or image. As an example, a structure diagram of a semantic prediction network is shown in FIG. 6. As shown in the figure, the semantic prediction network may include a CNN and a multi-classification structure (multi-classification shown in the figure). Taking the video shown in FIG. 6 as an example, when using this network, frames of the selected video are input to the semantic prediction network, the video features are extracted from each frame by using CNN, and a multi-classification operation is performed on the extracted video features through a multi-classification structure to obtain the probabilities corresponding to multiple predefined semantic features of the video, and finally output one or more predefined semantic features among the multiple predefined semantic features according to the probabilities. As shown in FIG. 6, based on the input frames (the images including person and dogs shown in the figure), the probabilities corresponding to various semantic features, such as person, dogs and roads, can be obtained through the semantic prediction network, for example, as shown in figure, the probability of including person is 0.95, and the probability of including dog is 0.8. Based on the predicted probabilities and the pre-configured semantic feature filtering rules, the semantic features with probabilities being greater than a set threshold can be output, or the set number of semantic features with higher probability are output.

In an alternative embodiment of the present disclosure, the characteristic information of the multimedia data includes local visual features of the target included in respective target regions in each image of the multimedia data. Based on the extracted characteristic information, generating a text caption of the multimedia data includes: obtaining relationship features between the targets based on the local visual features of each target in the image; constructing a scene graph of the image based on the local visual features and the relationship features between the targets; obtaining graph convolution features of the image based on the scene graph of the image; and generating the text caption of the multimedia data based on the graph convolution features of each image of the multimedia data.

The scene graph refers to a graph structure in which local visual features, attribute features (which will be described in detail hereinafter), and relationship features of respective target regions in the image are represented in a graph manner. The scene graph may include multiple nodes and multiple edges, where each node of the multiple nodes specifically represents the target feature (i.e., the above local visual feature) or the attribute feature of the target (i.e., the object) contained in the target region, each edge of the multiple edges represents the relationship feature between nodes.

As an example, FIG. 7a shows a scene graph corresponding to a frame of image. As shown in FIG. 7a, some nodes in the scene graph represent local visual features of each target in the frame image, for example, a node "person", a node "dog", and a node "skateboard" shown in FIG. 7a represent the feature vector of "person", the feature vector of "dog", and the feature vector of "skateboard"; some nodes represent the attribute features of the target, for example, a node "in blue" represents the attribute feature of the target "person", "black" represents the attribute feature of "dog"; the edges between the nodes in the scene graph represent the relationship between two connected nodes, that is, represent the relationship between two targets. For example, the relationship between the node "person" and the node "dog" is "holding", and the relationship between "person" and "skateboard" is "skating" and so on. It can be seen from FIG. 7a that the scene graph can reflect the spatial relationship between the targets in an image, so it can also be referred to as a spatial scene graph.

In practical applications, for each image, a feature extract ion network can be specifically used to obtain several target regions and the regional features of respective target regions (that is, the above local visual features). A relationship prediction network can be used to obtain the relationship features between targets. In particular, after the local features of respective target regions of the image are obtained through the feature extraction network, a pre-trained relationship prediction network can be used to obtain the relationship features between the target regions from the extracted target regional features, and the regional features of respective target regions and their relationship features are represented in a graph manner to obtain a scene graph for each frame.

The relationship prediction network is a classification network used to predict the association relationship between target regions. The specific network structure of the relationship prediction network can be selected according to actual needs. As an alternative solution, the relationship predict ion network may include a fully connected layer, a feature concatenation layer, and a softmax layer. The fully connected layer can not only be used to extract the local visual features of the target region, but also be used to reduce dimensions of features for adapting to be processed in the subsequent feature concatenation layer and softmax layer. The relationship prediction network can be trained based on the sample dataset. For example, the relationship prediction network can be trained based on Visual Genome. The Visual Genome dataset is a commonly used relationship and attribute learning dataset, which has a large number of object attributes and relationship labels. Therefore, it may use the Visual Genome dataset to train a relationship prediction network.

In particular, when the relationship features between the target regions are obtained through the above relationship prediction network, for the regional features of at least two target regions in respective target regions, a fully connected layer can be used for extracting features, and the extracted features corresponding to respective target regions extracted by the fully connected layer are input to the feature concatenation layer for concatenating features and then input to the softmax layer. According to the probability corresponding to each relationship output by the softmax layer, the relationship features between at least two target regions are obtained.

As an example, FIG. 8 illustrates a schematic diagram of predicting relationship features by using a relationship prediction network. As shown in FIG. 8, regional features of a target person and a dog in an image frame are respectively input to the fully connected layer of the relationship prediction network. The features output from the fully connected layer are performed feature concatenating, and then input to the softmax layer, to obtain the corresponding probabilities of various predefined relationship features between person and dogs. Finally, one predefined relationship feature is output according to the probabilities. For example, the probability of the relationship feature "on" is 0.12, the probability of the relationship feature "left" is 0.20, the probability of the relationship feature "holding" is 0.40, or the like, then based on the probability of each relationship feature, the final output relationship feature is "holding" which has the highest probability. Of course, in practical applications, for at least two target regions, the corresponding relationship feature may be one, as in the above example, the relationship feature corresponding to the maximum probability may be selected.

In the method provided in the embodiment of the present disclosure, when obtaining a text caption of a video or an image, it is implemented based on a local visual feature (also simply referred to as a regional feature, a local feature) of respective target regions (also referred to as a target candidate region) of each image. Since the local visual features of respective target regions can more accurately and granularly reflect the information of local regions in each image, the method in the embodiment of the disclosure makes full use of the intra-frame information of each image, thereby being able to generate more accurate text caption of videos or images Further, the method in the embodiment of the present disclosure can determine the relationship features between the target regions based on the local features, and construct a spatial scene graph of each image (for the image, which is a graph) based on the relationship features. The graph convolution features of each image can be obtained based on the spatial scene graph, so that the text caption of the video or image can be obtained based on the graph convolution features of each image. Since the spatial scene graph can well reflect the targets in the image and the relationship between the targets, and the relationship between the targets is very helpful for understanding and describing the image content, therefore, the spatial scene graph-based graph convolution feature can further improve the accuracy of text caption of videos or images.

For the convenience of description, hereinafter for a target region, the node corresponding to the local visual feature of the target region may be referred to as the target node, and the local visual feature represented by the target node may also be referred to as the target feature, the node of the attribute feature of the target region is referred to as an attribute node.

In an alternative embodiment of the present disclosure, the characteristic information of the multimedia data may include the attribute features of the targets contained in respective target regions of each image in the multimedia data; where the constructing the scene graph of the image based on the local visual features of each target and the relationship features between targets may include: constructing the scene graph of the image based on the local visual features of each target, the relationship features between the targets, and the attribute features of each target, where one node in the scene graph represents the local visual features or attribute features of one target corresponding to the target region.

In this alternative solution, the local visual features, attribute features, and relationship features corresponding to respective target regions are used to construct a scene graph in a graph manner, that is, the scene graph may include target nodes and attribute nodes. At this time, the nodes in the scene graph represent the local visual features or attribute features of respective target regions, that is, it represents the target features and the attributes of the targets contained in respective target regions. The corresponding edges can include edges which represent the relationship between the targets (e.g., the edge between "person" and "dog" in the spatial scene graph shown in FIG. 7*a*), and edges which represent the relationship between the target and attributes (e.g., the edge between "person" and "in blue" in the spatial scene graph shown in FIG. 7*a*).

In practical applications, in order to reduce connection redundancy, attribute nodes and target nodes in the same target region can also be combined, that is, for a target region, the nodes representing local visual features and the nodes representing attribute features of the target region can be the same nodes. For example, for the scene graph shown in FIG. 7*a*, target nodes and attribute nodes of the same target are combined to obtain the scene graph shown in FIG. 7*b*, such as "person" and "in blue" in FIG. 7*a* respectively represent the target features and attribute features of the person in the image, so they can be combined into a node of "person in blue" as shown in FIG. 7*b*, which simultaneously reflects the target features and attribute features of the person in the corresponding target region. Similarly, "dog" and "black" in FIG. 7*a* represent the target features and attribute features of the dog in the image, respectively, so they can also be combined into a node of "black dog" as shown in FIG. 7*b*.

The attribute features may be obtained based on the local visual features of the target region. This alternative solution also considers the attribute features of respective target regions in the image when constructing the scene graph. Since the attributes of each target in the image are also very helpful for describing the image content, the scene graph incorporating attribute features can describe video more accurately.

Alternatively, the attribute features corresponding to respective target regions may be obtained from the extracted local visual features using an attribute prediction network. The attribute prediction network is a multi-classification network. The attribute prediction network can be trained based on sample datasets (such as the Visual Genome dataset). In practical applications, the specific network structure of the attribute prediction network can be selected according to actual needs.

In an alternative embodiment of the present disclosure, the attribute prediction network may include multiple attribute classifiers, where each classifier corresponds to one type of attribute prediction.

The specific division of the attribute type can be configured according to actual needs. As an alternative method, the attribute type can specifically refer to the part of speech corresponding to the attribute. For example, the part of speech corresponding to the attribute can include nouns, verbs, adjectives, and other relatively rare types of attributes, and so on. Prediction of attribute features is performed by using a classifier containing a plurality of attribute types.

In the traditional way of constructing the spatial scene graph, the attributes of objects (i.e., targets) are not distinguished, and various attributes are classified by a classifier, so the accuracy of the obtained attributes is low. However, when the spatial scene graph is constructed based on the attribute features predicted by this scheme, it can obtain more specific target attribute information, including noun attributes (such as clothes, glasses, etc.), verb attributes (such as standing, walking, etc.), adjective attributes (such as tall, fat, etc.), and relatively rare attributes (such as blue whale, pony, etc.). In addition, different classifiers can be respectively used to obtain the different types of attributes. As such, the obtained attributes are more accurate and the attributes are more diversified, thereby generating more accurate captioning information based on the predicted attribute features. In addition, in order to reduce redundancy, attribute nodes and target nodes can also be combined to improve data processing efficiency.

As an alternative solution, the structure of the attribute prediction network may include a fully connected layer and a multi-classification layer. The fully connected layer can be used not only to extract the attribute features of the target region, but also to reduce the dimensions of the features for adapting to be processed in subsequent multi-classification layer. Alternatively, the multi-classification layer can be implemented by multiple Sigmoids. When the attribute prediction network is used to obtain the attribute features between various target regions, the input of the network is the local visual features of a target region, and the output is one or more attribute features of several predefined attribute features.

As an example, FIG. 9 illustrates a principle diagram for predicting attribute features of a target region by using an attribute prediction network. As shown in FIG. 9, the local visual features (local features shown in the figure) of the target "person" in an image frame are input to the fully connected layer of the attribute prediction network, and the features output from the fully connected layer are input to the multi-classification layer for performing multi-classification operations to obtain the respective corresponding probabilities of various predefined attribute features of the person, and finally outputs some of the predefined attribute features among the various predefined attribute features according to the probabilities. For example, the attribute feature "blue" with probability of 0.92 and the attribute feature "tall" with probability of 0.54 are output. Specifically, in a practical application, for a target region, it may have one or more attribute features. For example, the attribute feature with the maximum probability can be output as the attribute feature of the target region; alternatively, the attribute feature of which a probability is higher than the set threshold or the set number of attribute features with the maximum output probability can be output as the attribute feature of the target region.

It should be noted that, as an alternative solution of the present disclosure, the above steps of obtaining the attribute features corresponding to respective target regions may be used or may be omitted. That is, when constructing a scene graph, it can use local visual features, relationship features, and attribute features. Alternatively, it can also be constructed based on local visual features and relationship features without using attribute features. When the step of obtaining the attribute feature is omitted, the nodes in the constructed scene graph represent the target features corresponding to the target region, that is, the local attribute features. When constructing a scene graph based on relationship features and attribute features, each node in the scene graph represents target features and/or attributes corresponding to the target region, and each edge represents the relationship between the targets corresponding to the nodes.

Taking the FIG. 7a as an example for illustration, as shown in FIG. 7a, after extracting the target features, attribute features, and relationship features about person and dogs from the image, a scene graph for the image may be constructed in a graph manner. In the scene graph shown in FIG. 7a, each block represents the target feature or attribute feature of the target region, and the line between the blocks representing the target features represents the relationship between the targets, i.e., the corresponding relationship feature. The ellipse block shows the features of the relationship between the target regions, and the arrow (that is, the direction of the edge) is the relationship between the subject and the object. As shown in the scene graph in FIG. 7, in the relationship between "person" and "dog", the direction of the edge between "person" and "dog" represents that "person" is the subject, "dog" is the object. The line between the node representing the target feature and the node representing the attribute feature represents attribution relationship between them. As shown in FIG. 7a, in the relationship between "person" and "in blue", "in blue" is an attribute of person, and the direction of the arrow represents the attribution relationship, that is, this attribute of "in blue" belongs to person. The scene graph shown in FIG. 7a can clearly indicate each target included in the figure, the relative positions, attributes, and behavioral relationships of the targets.

In an alternative embodiment of the present disclosure, if the multimedia data is a video, the images of the multimedia data are a plurality of frames selected from the video, and when the target regions of two adjacent frames comprise the same targets, the scene graphs of the two adjacent frames have temporal edges between the nodes corresponding to the same target (target nodes), that is, the plurality of edges include temporal edges.

In order to make better use of the time information, this alternative solution further considers the time information between two adjacent frames among the selected frames for the video, and the time information is added to the scene graph corresponding to each frame so as to obtain a spatial-temporal scene graph. Specifically, if the targets corresponding to the target regions between two adjacent frames are the same, then temporal edges are added between the target nodes of the target regions containing the same target in the scene graphs of the two adjacent frames, and the scene graphs that have been added temporal edges can reflect both the spatial relationship between the targets and the temporal relationship thereof, so it can be referred to as spatial-temporal scene graphs.

As an example, FIG. 10 illustrates a schematic diagram of a spatial-temporal scene graph. Temporal edges are added to the scene graph corresponding to each frame. In the scene graphs corresponding to the two adjacent frames, if the target classes of target regions belonging to the scene graphs of the two adjacent frames are the same, a temporal edge is added between the two target regions. For example, in the scene graphs corresponding to the first frame and the second frame shown in FIG. 10, the target classes of person, oven, and pizza in the two frames of scene graph are the same, the temporal edges are added between the corresponding target regions in the two frames of scene graph, for example, the temporal edges are respectively added between persons, between ovens, and between the pizzas in the two frames of scene graph.

Compared with the spatial scene graph, the spatial-temporal scene graph adds the relationship between objects (i.e., targets) in the temporal dimension, which can better describe the spatial-temporal information of the video. In addition, the spatial-temporal scene graph can further contain the action information of the target corresponding to the temporal edge (which will be described hereinafter) to improve the accuracy of the action captioning.

In this alternative solution of the embodiment of the present disclosure, inter-frame time information is also considered, that is, when a scene graph is constructed, a spatial-temporal scene graph is obtained by combining temporal edges. In this solution, time information is combined to fully consider the correlation between inter-frame images because the temporal edges are established between the same targets in adjacent frames. Therefore, when the graph convolutional features are extracted based on the scene graph, it may better learn the continuity information of the target in different images, thereby obtain a better video caption based on making full use of the intra-frame and inter-frame information of the frames.

In an alternative embodiment of the present disclosure, the obtaining the graph convolution features of the image based on the scene graph of the image includes obtaining a target dimension of feature vector by encoding nodes and edges in the scene graph; and obtaining the graph convolution features by using a graph convolution network based on the obtained feature vector.

It should be noted that, in practical applications, if the dimensions of the local visual features, attribute features, and relationship features obtained are the same, this step may or may not be performed.

Specifically, when the nodes in the constructed scene graph represent target features or attribute features corresponding to the target region, the obtained relationship features and attribute features of the target region can be encoded into the target dimension of feature vector, and then a graph convolution network is applied to the encoded feature vectors to learn the relationship between adjacent nodes and edges in the scene graph, so as to obtain the graph convolved features of each node contained in the scene graph (i.e., the graph convolution features). The features learned based on the graph convolution network are obtained based on the graph structure (scene graph), so the graph convolved features can include target features, attributes, and relationship information.

When the nodes in the constructed scene graph only represent the target features, the graph convolved features can include the target features and relationship information. At this time, the attribute features of respective target regions are not obtained from the extracted target regional features by using the attribute prediction network.

As an example, a fully connected matrix can be used to encode all or part of nodes (such as the target nodes) in the scene graph and edges to the target dimension (a fixed dimension that is related to the feature dimension of the input vector of the subsequent decoder) of feature vector. For example, when the dimension of the relationship feature in the scene graph is 512 and the target dimension is 1024, a 512*1024 matrix can be applied to the relationship feature of the scene graph, so that the same dimension as the target dimension 1024 can be obtained.

After obtaining the target dimension of feature vector, for each node in the obtained feature vector, a graph convolution formula can be used to obtain the graph convolution features of each node, a simplest weightless graph convolution formula is shown in equation 1 below:

$$v_i^{(1)} = \sigma(Wv_i + \Sigma_{v_j \in N(v_i)} W v_j) \quad \text{[Equation 1]}$$

Where $v_i$ represents the feature vector of node i in the scene graph, i.e., the target feature vector or attribute feature vector, $N(v_i)$ represents the set of nodes adjacent to node i in the scene graph (i.e., in the same frame of image), and $v_j$ is the feature vector of node j adjacent to node i in the same frame of image (i.e., the same scene graph). The adjacent nodes of node i generally do not include node i itself. W is the learnable network weight parameter of the graph convolution network, $v_j^{(1)}$ represents the graph convolved features (graph convolution features) of node i, and σ represents a non-linear activation function.

In practical applications, since the relationship between different nodes in the scene graph is different in the importance of the image, that is, the importance of the relationship between different targets to the final captioning information of the multimedia data is different, the edges in the scene graph can be weighted edges, so as another alternative, it may use the following equation 2 to obtain the graph convolution features of each node:

$$v_i^{(1)} = \sigma(\Sigma_{v_j \in N(v_i)} W_{dir(v_i, v_j)} v_j + b_{label(v_i, v_j)}) \quad \text{[Equation 2]}$$

Where $v_j$ and $N(v_i)$ have the same meaning as in equation 1, $N(v_i)$ can include $v_i$ itself; W and b represent the learnable weights and bias parameters of the graph convolution network; $dir(v_j, v_j)$ represents the direction of the edge, where $dir(v_j, v_j)$ has two values, which are from $v_i$ to $v_j$ (that is, the direction of the edge is from node i to node j), or from $v_j$ to $v_i$; $W_{dir(v_j, v_j)}$ has two corresponding results, where each of $dir(v_j, v_j)$ corresponds to one result; $label(v_i, v_j)$ represents the relationship between $v_i$ and $v_j$, and for different relationships, it has different bias values; σ represents the non-linear activation function; and $v_j^{(1)}$ represents the graph convolution feature corresponding to node i.

As another alternative, equation 2 can also be extended to the following form, as shown in equation 3 below. In this alternative, a weight can be used for the node itself, that is, the importance of different nodes is also different, and the other two weights are used for neighboring nodes according to the affiliation relationship, that is, two weights are used for the relationship features:

$$v_i^{(1)} = \sigma(W_s v_i + \Sigma_{v_j \in N(v_i)} A_{v_i,v_j}(W_{(sub,obj)} v_j + W_{(in,out)} e^r_{[(v_i,v_j),(v_j,v_i)]}))$$

$$A_{v_i,v_j} = \text{softmax}(v_i^T W_a v_j) \quad \text{[Equation 3]}$$

Where the meanings of $v_j^{(1)}$, $\sigma$, $v_i$, $v_j$, $N(v_i)$ have the same meaning as corresponding parameters in the foregoing, and are not repeated here; $W_s$, $W_{(sub,obj)}$, $W_{(in,out)}$, $W_a$ are learnable parameter weight matrices. Specifically, $W_s$ is the parameter weight matrix of $v_i$, and $W_{(sub,obj)}$ is the parameter weight matrix of the adjacent node feature (i.e., $v_j$), where (sub, obj) represents the affiliation of the relationship, and it has two values, respectively representing that $v_i$ is the subject or object of the relationship. For example, in the scene graph as shown in FIG. 7a, in the relationship between "person" and "dog", "person" is the subject and "dog" is the object. If $v_j$ is the subject and $v_i$ is the object, $W_{obj}$ is used (for example, for "dog" in FIG. 7a, "person" is the subject), otherwise $W_{sub}$ is used; $W_{(in,out)}$ represents the parameter weight matrix of the relationship, where (in, out) represents the direction of the edge, and it has two values, respectively representing whether the edge is output from node i or input into node i. For the edge between "person" and "dog" shown in FIG. 7a, for the node of "person", the edge is output from the node, and for the node of "dog", the edge is input into this node. If $v_i$ is the subject and $v_j$ is the object, Win is used, otherwise $W_{out}$ is used; $e^r$ represents the relationship feature vector between the two corresponding nodes, and it may have different values according to the direction of the edges, of course, it can also have the same value. $e^r_{\{(vi, vj),(vj,vi)\}}$ represents the feature vector of the relationship between node i and node j, and according to the different directions of edges, i.e., the different subject-object relationship, the feature vector may be the same or different. For above example, in the relationship between "person" and "dog", it is a "holding" for "person", but it is "held" for "dog". $A_{vi,vj}$ represents the attention layer, specifically the attention parameter matrix, and $W_a$ represents the weight of the attention layer.

In another alternative manner, for a video, if the constructed scene graph is a spatial-temporal scene graph, for each frame of image, in addition to the intra-frame information, the inter-frame information may be further considered. That is, the graph convolution features of the frame image are obtained based on a scene graph of the frame image and a scene graph of an adjacent frame image of the frame image. Specifically, all or part of the nodes and edges in the spatial-temporal scene graph can be encoded to obtain a target dimension of feature vector, and then the obtained feature vector is trained by using a graph convolution network to obtain graph convolution features.

Alternatively, the graph convolution features can be obtained by the following equation 4:

$$v_i^{(1)} = \sigma(W_s v_i + \Sigma_{v_j \in N(v_i)} A_{v_i,v_j}(W_{(sub,obj)} v_j + W_{(in,out)} e^r_{\{(v_i,v_j),(v_j,v_i)\}}) + \Sigma_{v_j \in N_b(v_i)} A_{v_i,v_j}(W_{(pre,aft)} v_j)) \quad \text{[Equation 4]}$$

Where the same parameters in equation 4 as in equation 3 have the same meaning. $N_b(v_i)$ represents the set of nodes which have the same classification as the node i in the adjacent frame image of the current frame image, i.e., the set of the same targets in adjacent frames; as shown in the example shown in FIG. 10, for the "person" node in the second frame of the image, if the node is $v_i$, then the set of the "person" nodes in the first frame and/or the third frame shown in the figure is $N_b(v_i)$. $W_{(pre,aft)}$ represents the sequence relationship between the current frame to which node i belongs and the frame to which node j belongs in $N_b(v_i)$, which is the parameter weight matrix of the same target in adjacent frames. $W_{(pre,aft)}$ has two values, respectively representing whether the current frame is previous the adjacent frame or after the adjacent frame, that is, with respect to the adjacent frame, the frame where node i is located is the previous frame or the next frame in time sequence. If $v_j$ is the previous frame, $W_{(pre)}$ is used, otherwise $W_{(aft)}$ is used.

In an alternative embodiment of the present disclosure, when constructing a spatial-temporal scene graph, the method may further include determining the action features of the target corresponding to the temporal edge.

At this time, for each frame of image, it can construct a spatial-temporal scene graph based on the local visual features, attribute features (alternative), relationship features corresponding to target regions of the frame image, as well as action features of target corresponding to the temporal edge.

In other words, it may also add the action features of each target node corresponding to the temporal edge in the scene graph. Alternatively, it may use an object tracking method to identify the same target between adjacent frames. For this same target, it may use a pre-trained action classifier (action detector) to identify the action classification of the target in the image (also referred to as an action relationship), and use the feature vector of the action classification as the action feature of the target.

As shown in the spatial-temporal scene graph shown in FIG. 11, the same targets included in each frame include "person", "pizza" and "oven", where the action corresponding to "person" is "opening", that is, in the spatial-temporal scene graph, the value of the temporal edge of the same target in adjacent frames is "opening"; the action corresponding to "pizza" is "held", and the action corresponding to "oven" is "opened". It can be seen that, compared with the scene graph in FIG. 10, the scene graph can further include action information corresponding to the same target included in adjacent frames. When generating captioning information based on the scene graph, more image detailed information can be used, thereby to further improve the accuracy of the generated captioning information.

Corresponding to this alternative solution, it may also the following equation 5 to calculate the graph convolution features of each node in the scene graph:

$$v_i^{(1)} = \sigma(W_s v_i + \Sigma_{v_j \in N(v_i)} A_{v_i,v_j}(W_{(sub,obj)} v_j + W_{(in,out)} e^r_{\{(v_i,v_j),(v_j,v_i)\}}) + \Sigma_{v_j \in N_b(v_i)} A_{v_i,v_j}(W_{(pre,aft)} v_j) + W_T e^a_{(v_i,v_j)})) \quad \text{[Equation 5]}$$

The explanation of the same parameters as in the above equation 4 can refer to that in the foregoing. $W_T$ represents the parameter weight matrix of the action relationship (i.e., action classification) of the same target in adjacent frames, and $e^a_{(vi,vj)}$ represents action classification (specifically, it can be the feature vector of the action classification), that is, the action features of the same target in adjacent frames. As shown in the example shown in FIG. 11, for the same target "person" in adjacent frames, its act ion relationship is "opening"; for the scene graph of the first frame of the image, the action classification corresponding to the node "oven" in this scene graph (i.e., node i) and the node "oven" in the scene graph of the second frame (i.e., node j in the adjacent frame) is the feature vector of the action "opened"; $W_T$ is also a learnable weight matrix, and for different action classifications, it has different weight values. $A_{vi,vj}$ is an attention parameter matrix, which can assign different weights to different targets. As shown in the example shown in FIG. 7b, when updating the features of the "dog" node, the "person" node has closer relationship with the "dog" node than the "skateboard" node, so the "person" node is given a higher weight.

The above equation 5 may be more intuitive understood, that is, for the feature $v_i$ of different objects (i.e., target nodes), such as the node "person" shown in FIG. 11, after applying the graph convolution network, the updated features (i.e., the graph convolution features) include the feature $v_i$ of the target itself, and the features of some related objects (such as ovens, pizzas) of the target, and features of the target node in adjacent frames.

The scheme obtaining graph convolution features provided by the embodiment of the present disclosure differs from the existing graph convolution feature extraction scheme in that: (1) when updating node features, the attention (i.e., the attention weight $A_{vi,vj}$) is added, that is, when updating features, its neighboring nodes can be given different weights. As in the above example, when updating the features of the "dog" node, the "person" node has closer relationship with the "dog" node than the "skateboard" node, so the "person" node is given a higher weight; (2) for two adjacent objects, the features can be updated by using different weight parameter matrices according to the difference between the subject and the object, and the difference in time. For example, in the relationship between the "person" node and the "skateboard" node, "person" is the subject and "skateboard" is the object. When updating the "person" node, the weight parameter matrix is $W_{sub}$, and when updating the "skateboard" node, the weight parameter matrix is $W_{obj}$.

In practical applications, the node representing attribute feature and the node representing the target feature of the same target in the scene graph can be combined, that is, the node in the scene graph can be a node representing both the target feature and the attribute feature. Through the above alternative methods of this application, the graph convolution features of each node in the scene graph of each image can be obtained through the graph convolution network. The convolution features of the image are the convolution features of all the nodes included in the scene graph of the image. In addition, the node representing attribute feature and the node representing the target feature of the same target in the scene graph can be combined, that is, the nodes in the scene graph can be both target nodes and attribute nodes. At this time, graph convolution features of each target node and each attribute node may be obtained. When the graph convolution features of the nodes are obtained through the above alternative methods, if one or more parameters in the above expression do not exist for a certain node, a pre-configured value may be used, such as a zero vector or other pre-configured feature vectors.

In an alternative embodiment of the present disclosure, if the characteristic information of the multimedia data comprises at least two of the local visual feature, the semantic feature, the spatial-temporal visual feature, and the global feature, the generating the text caption of the multimedia data based on the extracted characteristic information includes: determine weight of each characteristic information; weighting each characteristic information based on the weight of each characteristic information; and generating the text caption of the multimedia data based on the weighted characteristic information.

In practical applications, for different types of multimedia data (such as different videos and different images), the importance of the characteristic information of each classification is likely to be different, so the characteristic information of different classifications may have different weights, so that different features play different roles, thereby the solution of the embodiment of the present disclosure is adaptive to the generation of captioning information of different videos; that is, for different videos, multiple characteristic information can each play different roles.

Alternatively, when determining the weight of each type of characteristic information, a feature selection network may be used. By training the feature selection network, the network can select specific characteristic information for generating captioning information of the multimedia data for different multimedia data, that is, for a given multimedia data, it is possible to determine respective weights for different characteristic information through the feature selection network.

As an example, FIG. 12 illustrates a schematic diagram of a feature selection network. As shown in FIG. 12, each characteristic information in this example is a graph convolution feature $V_{GCN}$, a spatial-temporal visual feature $1\%$, and a semantic feature $V_{SF}$. In the example, the specific implementation of the feature selection network may be expressed by the following equation 6:

$$a_t = \text{softmax}(W_a^T \tanh(W_{3d}V_{3d} + W_{GCN}V_{GCN} + W_{SF}V_{SF} + W_e E_{1:t-1}))$$ [Equation 6]

Where at represents a set of weight values output by the feature selection network at time t, that is, the weight of each characteristic information at time t, and $E_{1:t-1}$ represents the embedding of words from time 1 to time t−1, that is, when the tth word of the video captioning information is decoded, the feature vectors of the first t−1 words have already been decoded, $W_{3d}$, $W_{GCN}$, $W_{SF}$, and $W_e$ are the parameter weight matrices of the network. Each of features are transformed into the same dimensions by using the parameter weight matrices and added; after passing through a non-linear layer tanh, it is transformed a 3*1 vector by using the $W_a^T$ parameter weight matrix, and then finally normalized with softmax. Each dimension represents the weight of different features, of which the sum is equal to 1. The intuitive meaning of this formula is to perform an attention operation on each of features to obtain the attention weight of each feature.

In this example shown in FIG. 12, the weights of the spatial-temporal visual feature, graph convolution feature, and semantic feature are 0.3, 0.2, and 0.5, respectively.

It can be understood that the above time 1, time t−1, and time t are all relative time concepts. They are the relative decoding time that the decoder decodes and obtains the 1th word, t−1th word and tth word in the video captioning information when the decoder decodes and outputs the video captioning information. The weight of each characteristic information at each time other than time 1 may be obtained based on each characteristic information and the words decoded before the current time.

The solution provided by the embodiments of the present disclosure uses a variety of different features to express video information. In addition to the spatial-temporal scene graph feature (i.e., the graph convolution feature), it can also use spatial-temporal visual features and semantic features, that is, three types of features can be used. Where the graph convolution feature concerns more on the relationship and attributes between targets, and the spatial-temporal visual feature concerns more on temporal information, the semantic feature concerns more on the overall semantic information contained in the video. A feature selection network (e.g., a feature selection gate) can select different features based on different videos. The output of the feature selection gate is a set of weight values at, which respectively represent the weights of different features. For example, some videos are longer and time information is more important, so the weight of the spatial-temporal visual feature is higher. Some videos are shorter and have more objects, so the relationship between objects and the attributes of objects are more important, thereby the weight of the graph convolution feature is higher.

After obtaining the weight of each characteristic information, in the subsequent processing based on each characteristic information, as an alternative method, each characteristic information may be weighted by using respective weight, and the weighted feature is used for subsequent processing. It may be weighted integration of each characteristic information based on respective weight to obtain an integrated feature and the integrated feature is be used for subsequent processing. In the example shown in FIG. 12, the integrated features (i.e., 0.3*spatial-temporal visual features+0.2*graph convolution features+0.5*semantic features) may be used for subsequent processing, or it may separately process these features having weights to obtain the weighted feature, i.e., 0.3*spatial-temporal visual features, 0.2*graph convolution features, and 0.5*semantic features. By adaptively assigning different weights to different features, different types of features can play different importance when generating text caption according to the features of the multimedia data itself.

In an alternative embodiment of the present disclosure, the generating the text caption of the multimedia data based on the extracted characteristic information may include: encoding the obtained characteristic information by using self-attention-based encoder; inputting the encoded characteristic information to a decoder to generate the text caption of the multimedia data; wherein when the multimedia data is an image, the self-attention-based encoder is a self-attention-based intra-frame encoder; when the multimedia data is a video, the self-attention-based encoder comprises a self-attention-based intra-frame encoder and/or a self-attention-based inter-frame encoder.

In other words, the self-attention-based intra-frame encoder can be used to respectively encode the obtained characteristic information (if the weighting is to be performed, it may be a weighted feature; if the weighted integration is to be performed, it may be a weighted integration feature), to obtain deeper and more advanced characteristic information, and input the encoded features to the decoder to generate corresponding text caption; for a video, it may also use self-attention-based inter-frame encoder to encode the obtained video features, and input the encoded features to the decoder to generate text caption of the video. The decoder may be a self-attention-based decoder. For example, for an image, it may be an attention-based intra-frame decoder to better learn the intra-frame information during decoding. For a video, it may be a self-attention-based intra-frame decoder and/or a self-attention-based inter-frame decoder to better learn intra-frame information and/or inter-frame information during decoding, thereby to obtain more accuracy text caption of video.

Taking the text caption of the video being obtained based on graph convolutional features (understandably, it can also be spatial-temporal visual features and/or semantic features, and graph convolutional features) as an example, for each selected frame, a vector about the graph convolutional feature can be obtained. These feature vectors are input to the self-attention-based decoder to learn to obtain inter-frame information between frames.

When generating a text caption of the video based on the graph convolution features, the decoder outputs the words that may be output at each moment and its output probability according to the decoder input and the graph convolution features. As an example, the self-attention-based decoder may be implemented by a transformer decoder.

In the process of generating a text caption of the video, it is assumed that at the first moment, the inputs of decoder are a global feature and a start token, and the outputs of the self-attention-based decoder are a set of probability values, where each value represents the probability of a word, the word with the maximum probability is selected as the output at the first moment. The input at the second moment is the global feature+the start token+the output at the first moment, and the word with the maximum probability is still selected as the output. The input at the third moment is the global feature+the start token+the output at the first moment and the output at the second moment. This loop continues until the word with the maximum probability at a certain moment is a stop token, then the loop is ended, thereby obtaining a sentence sequence, that is, the output of the self-attention-based decoder is the final sentence sequence about the video caption.

For example, the vocabulary is a, b, c, d, e. The transformer decoder may output words from the vocabulary that may be output at the first moment, the output probability of word a (e.g., 60%) and the output probability of word b (e.g., 40%), c, d, e (0%). At the second moment, the output probability of word c (e.g., 60%), the output probability of word d (e.g., 20%) and the output probability of word e (e.g., 20%), a, b (0%) and so on. In this case, according to an exemplary embodiment of the present disclosure, a video captioning sentence may be generated by a greedy decoding algorithm, that is, a video captioning sentence is generated by combining, in time sequence, words with the maximum output probability that may be output at each moment. However, the present disclosure is not limited thereto, and other decoding methods may be used to generate video captioning sentences.

According to the exemplary embodiment of the present disclosure, the video captioning sentence may be obtained by combining the words with the maximum output probability that may be output at each moment in time sequence until the probability of output stop token is maximum. The role of the self-attention-based decoder is to learn inter-frame information. The self-attention-based decoder has a structure based on the self-attention mechanism, including a multi-head attention layer, a layer normalization layer, and a feed forward network layer. Compared with decoders with RNN structure, the self-attention-based decoder has advantages of faster training speed, fewer parameters, and easy learning of long-distance dependency.

As an example, FIG. 13*a* illustrates a schematic structural diagram of a self-attention-based codec model provided by an embodiment of the present disclosure. As shown in FIG. 13*a*, the self-attention-based codec model of the present disclosure is divided into two parts: a self-attention-based encoder and a self-attention-based decoder. Alternatively, the self-attention-based codec may be implemented by a transformer codec. The characteristic information of the video in this example is still described by using the graph convolution feature as an example. As shown in FIG. 13*a*, the self-attention-based encoder in this example includes a multi-head attention layer, a feed forward network, and a layer normalization layer. The self-attention-based decoder may include a masked multi-head attention layer, a multi-head attention layer, a layer normalization layer, and a feed forward network layer.

The encoder with a structure based on the self-attention mechanism shown in FIG. 13a may be a multi-block structure, and the structure of each block may be the same or different. The multi-block structure may be cascaded in sequence, that is, the output of the current block is the input of the next block. As an alternative solution, for example, the encoder may include 6 blocks with the same structure (one is shown in FIG. 13a), and each block may mainly include two parts of the multi-head attention layer and the feed forward network fully connected per location, the feed forward network can be implemented by two linear prediction layers. The two linear prediction layers include ReLU activation operations. The multi-head attention layer and the feed forward network in each block can correspond to layer normalization layers respectively. Specifically, as shown in FIG. 13a, each block can include a multi-head attention layer, a layer normalization layer, a feed forward network layer, and a layer normalization layer in turn. Each block can be stacked to obtain an encoder. The input of encoder is a graph convolution feature.

When using the self-attention-based encoder to encode graph convolution features, encoder embedding can be performed on the graph convolution features. The purpose is to change the dimension of characteristic information to be suitable for subsequent encoders to process. The characteristic information output after embedding is input into the encoder for being encoded.

The following uses the processing of the first block in the encoder as an example for the illustrative description. The graph convolution feature is first processed by the multi-head attention layer, and the output result is integrated with the output of the encoder Embedding (such as addition processing), and then layer normalization processing is performed on the integration result. The normalized result is processed through the feed forward network, and then is integrated with the output of the previous layer normalization layer (such as addition processing), and then layer normalization is performed again to get the output result of the first block. The output result of the first block is used as the input of the second block, and the encoding process is performed in turn to obtain the output result of the encoder (that is, the output of the encoder in FIG. 13).

The decoder structure of the self-attention mechanism shown in FIG. 13a can also be a multi-block structure. The structure of each block can be the same or different. The structures of multiple blocks can be cascaded in sequence. For example, the decoder may include 6 blocks with the same structure, and each block may mainly include three parts of masked multi-head attention, multi-head self-attention corresponding to features, and feed forward network. The multi-head attention and feed forward network in each block can correspond to layer normalization layers respectively. Specifically, the structure of each block may include a masked multi-head attention layer, a layer normalization layer, a multi-head attention, a layer normalization layer, a feed forward network layer and a layer normalization layer in turn, and each block can be stacked to get the decoder. The decoder inputs in the figure are global characteristic information and word vectors. The feature vector of the target region extracted by the feature extraction network from each frame can be referred to as local features or regional features. Therefore, regional features of multiple target regions can be obtained for this frame. The regional features are averaged to obtain the global features corresponding to the frame, or the global features can be obtained by other methods (such as weighting). In addition, it may also obtain the start token and the word vector that has been predicted during the iterative prediction process (if it is the first prediction of the iterative prediction, only the start token is obtained, and all word vectors can be input when training the model). For the above decoder input (that is, global features and start token, and word vectors that have been predicted during the iterative prediction process), decoder Embedding processing can be performed, so as to change the dimension of characteristic information to be suitable for subsequent decoder processing. The global characteristic information, start token, and word vector output after Embedding processing can be input to the decoder for decoding processing.

The following uses the processing of the first block as an example to for illustrative description. The global characteristic information, the start token, and the word vector output after being subjected to the Embedding processing are processed by a masked multi-head attention layer, and the processed result of which is integrated with the output of the decoder Embedding (e.g., addition processing), and then is subjected to layer normalization processing. The normalized result and the result output by the encoder are together processed by the multi-head attention layer (if the encoder contains an inter-frame encoder, the output of the encoder is the result output by the inter-frame encoder; if the encoder has only an intra-frame encoder, the output from the encoder can be the result obtained by integrating the results output from the intra-frame encoders, for example, the result of concatenating results output from the intra-frame encoders), and then is integrated with the output of the previous layer normalization layer (e.g., addition processing), and then is subjected to layer normalization processing. The normalized result is processed through the feed forward network, and then is integrated with the output of the previous layer normalization layer, and then is subjected to layer normalization, the processed result is the output of the first block. The output result of the first block is used as the input of the second block, and the decoding process is performed in turn, thereby to obtain the output result of the decoder.

The output of the decoder is linearly transformed by the linear layer and then processed by the softmax layer, so as to output the word vectors that may be output at the current moment (that is, the prediction of this iteration) and corresponding output probabilities, such as words a and b as well as the output probabilities of word a and word b. The decoder, the linear layer and the softmax layer repeat the above iterative prediction process until the probability of the output stop character is maximum, and the captioning information corresponding to the video can be obtained according to the word vector obtained at each iteration.

It can be understood that the above examples use the graph convolution feature as an example for the illustrative description. In actual applications, in addition to the graph convolution features, it can also include the spatial-temporal visual features and/semantic features of the video. In this case, the above encoding process may be encoding of each characteristic information respectively, and the decoder may decode the features obtained by integrating the encoded features. At this time, the above feature selection network may be used to determine the weights of the encoded features, and the encoded features are integrated based on the weights as the output of the encoder, and the decoder obtains the text caption of the video based on the integrated feature. It is also possible to input the encoded features based on the weights to different cross attention layers of the decoder for processing respectively, and the decoder obtains the text caption of the video.

In an alternative embodiment of the present disclosure, the generation of the text caption from the multimedia data based on the extracted characteristic information includes: inputting the extracted characteristic information into a plurality of decoders, respectively; and generating the text caption of the multimedia data based on decoding results of the decoders.

In order to provide the decoding capability and improve the representation capability of the captioning information, in the solution of the embodiment of the present disclosure, when the encoded results are processed, a decoder-bank including a plurality of decoders may be used to separately decode the encoded results to enhance the decoding ability of the decoder, and obtain the final text caption information based on the decoding results of respective decoders. For example, the final output can be obtained by averaging the decoding results of respective decoders. The decoder bank may include more than two decoders, and the types of decoders included in the decoder bank are not limited in the embodiment of the present disclosure. For example, the decoder bank may include an LSTM-based decoder and a gated recurrent unit-based decoder, a self-attention-based decoder, and so on, the outputs of respective decoders are averaged to get the final output result.

Through testing, it is found that when the number of decoders in the decoder bank increases from 2, the effect becomes better and better, but after the number is more than 4, the improvement in decoding performance is stable, while the increasing number of decoders would also increase the complexity of the system, so in practical applications, the number of decoders needs to be selected according to the compromise between performance and complexity. Alternatively, it may generally select two or three decoders. For example, if it is used in an on-device system, it may select two decoders, and if it is used in the cloud end, it may select three or more decoders.

As for the selection of each decoder in the decoder bank, it may pre-trains many decoder banks. The decoders included in different decoder banks can be different. The number of decoders in the decoder bank can be different. In practical application, it may select the decoder bank that has the best effect on the verification set or test set among multiple decoder banks. When selecting the decoder bank, it may consider two aspects of decoding efficiency and decoding performance of the decoder bank.

When multiple decoders are used for respectively decoding, during training the decoder bank, in order to make the output results of the decoders close to the ground-truth, it is necessary to add a consistency loss to the output results of the decoders for constraint, so as to prevent the performance of different decoders in the decoder bank from being significantly different, thereby avoid the performance of the decoder bank being less than that of a single decoder. It is assumed that the decoder bank has two decoders, and the outputs of which are two probability distributions p1 and p2, respectively. The consistency loss is defined as following equation 7:

$$\text{loss} = D_{KL}(p_1 \| p_2) \quad \text{[Equation 7]}$$

Where, $D_{KL}$ represents K-L divergence.

In each of the alternative solutions in the embodiments of the present disclosure, during performing encoding or decoding, an attention-based neural network can be used, because the attention-based neural network can simultaneously draw global dependency between different inputs and target locations, so long-term dependencies can be better learned, and this type of neural network allows more efficient parallel computing during processing data. In addition, in self-attention-based encoders or decoders, especially for self-attention-based decoders, multiple cross-attention layers can be stacked. Since self-attention-based neural networks can learn the association information between the elements of the same feature vector well, and cross-attention (the core thereof is multi-head attention) can learn the association information between different feature vectors well. Therefore, by adding the cross-attention layer in the self-attention-based decoder, it may enable the decoder not only learn the associated features between elements of the feature vector itself well, but also the associated features between different feature vectors well, so that it can better process many different types of features to obtain better captioning information.

As an example, FIG. 13b shows a schematic structural diagram of a self-attention-based decoder provided in an embodiment of the present disclosure. In this example, the encoder part may include a spatial-temporal visual encoder (spatial-temporal feature extraction network) and a semantic encoder (semantic predict ion network). Through these two encoders, the output can include the encoder output of spatial-temporal visual features and semantic features. When the decoder in FIG. 13b is used for decoding, the output of the semantic encoder is input to the semantic cross-attention layer, and the output of the temporal-spatial visual feature encoder is input to the temporal-spatial visual cross-attention layer. The masked self-attention layer can ensure that the information at the next moment will not be received at the previous moment during training, and mask the input at the next moment. The input of the masked self-attention layer can correspond to the decoder input shown in the FIG. 13a, including the start token, for example, it may be the feature vector processed by the decoder embedding layer.

In an alternative embodiment of the present disclosure, the generation of the text caption of the multimedia data based on the extracted characteristic information includes: obtaining length information of the text caption to be generated; and generating the text caption of the video based on the length information and the extracted characteristic information.

In order to solve the problem that it cannot generate different lengths of video caption or image caption for users in the prior art, in the solution provided in this application, it may generate corresponding length of text caption by acquiring the length information of the text caption to be generated, so as to meet the needs of different application scenarios. The length information can be a relative length information, such as "long" (e.g., the generated captioning information is more than 20 words), "medium" (e.g., the generated captioning information is between 10-20 words), "short" (e.g., the generated captioning information is less than 10 words) and so on. The length information can be obtained from the user. For example, it may send a prompt for asking the user to generate a long captioning information or a short captioning information, the user can give corresponding instructions according to the prompt. The length information can also be obtained by analyzing the video. When the video is a real-time captured video, it may determine the current application scenario by analyzing the video, and different length information can be determined for different application scenarios.

For this solution, during training the decoder, unlike the prior art, the start token of the decoder may be a start token containing length information. For each training sample, the start identifier may include a start token indicating a longer captioning needed to be generated or a shorter captioning needed to be generated, and different start tokens corresponding to different sample captioning label information. When the decoder is trained based on the training sample, the decoder can learn the mapping relationship between the start tokens corresponding to the different length information and the corresponding length of captioning information, so that when decoding is performed based on the trained decoder, the start token corresponding to the length information can be used as the start token of decoding based on the obtained length information, thereby it can generate a video caption or image caption that meets the length requirement.

That is, in the solution of the embodiment of the present disclosure, during training, "BOS" (Begin of Sentence) in the existing method is replaced with length information, such as "short", "medium" or "long" to control the length of the output captioning information. In actual training, different length identifiers can be used for different length information. Specifically, when the training outputs a short captioning information, the start token is input as "short", a medium captioning information corresponds to a "medium" start token, and a long captioning information corresponds to a "long" start token. As such, the lengths of sentence may respectively correspond to the "short", "medium", and "long" during training. During online use, according to the different needs of the user, it may input "short", "medium" or "long" to get different lengths of captioning information.

Based on the methods in the alternative embodiments of this disclosure, it is possible to analyze each frame in the video or intra-frame information of the image in detail (such as the objects, attributes, and relationships of the images, as well as the semantic information of the video or image, the spatial-temporal visual features, etc.), and make full use of image information to generate more accurate text caption. It can be seen from the foregoing description that, based on the method of generating video captioning information provided in the embodiments of the present disclosure, in practical applications, a variety of different specific implementations can be selected according to actual application requirements.

In addition, in the solution provided in the embodiment of the present disclosure, during extracting the characteristic information of the multimedia data, in addition to using the feature extraction network to extract the features of each region of the image, it may further add encoders (i.e., relationship predict ion networks) that learn the relationships between the features of regions. The encoder may be implemented by a self-attention-based encoder (e.g., a transformer encoder), thereby augmenting the performance of obtaining video or image captioning information by improving the performance of feature encoding. In addition, during obtaining captioning information in the embodiment of the present disclosure, it may not use a conventional RNN structure of decoder, but it may use a self-attention-based decoder (e.g., a transformer decoder). Compared with a conventional RNN, the self-attention-based decoder has the advantages of fast training speed, few parameters, and easy to learn long-distance dependency.

The following uses videos as an example to describe the method for generating the captioning information of the multimedia data provided by the embodiments of the present disclosure in combination with several alternative embodiments.

Example One

FIG. 14 illustrates a schematic flowchart of a method for generating video captioning information provided by an alternative embodiment of the present disclosure. As shown in FIG. 14, the method for generating the video captioning information may include the following steps.

Step S301: it may select frames from the video.

Step S302: a scene graph is separately constructed for each of the frames.

Step S303: a graph convolution network is used to obtain graph convolution features of each frame based on the constructed scene graph.

Step S304: a text caption about the video is generated based on the obtained graph convolution features.

Alternatively, after obtaining the graph convolution features of each frame, a text caption of the video can be obtained based on the graph convolution features. For example, the obtained graph convolution features can be input into a decoder, and the text caption about a given video can be obtained by decoding the obtained graph convolution features. As an alternative method, a self-attention-based decoder may be used to generate a text caption of a video according to the graph convolution features of each of frames, however, the disclosure is not limited thereto.

Example Two

FIG. 15 illustrates a schematic flowchart of an alternative method for generating video captioning information given in this example. As shown in FIG. 15, this alternative implementation may include the following steps.

Step S1201: it may select frames from a given video, such as 501 in FIG. 17a and 1001 in FIG. 17b.

Step S1202: a feature extraction network is used to obtain several target regions and features thereof (e.g., regional features or local features) from each of the selected frames, such as 502 in FIG. 17a and 1002 in FIG. 17b. For each image frame, it may use Faster R-CNN algorithm to extract target regions and the features of the target regions in each frame.

Step S1203: a relationship prediction network is applied to the extracted regional features of respective target regions to obtain the relationship features between the target regions, as shown in the example of FIG. 8.

Step S1204: a scene graph for each image frame is constructed based on the obtained relationship features between the respective target regions, such as 503 in FIG. 17a.

Step S1205: a graph convolution network is used to obtain the graph convolution features based on nodes and edges in the scene graph of each frame, as shown in 504 in FIG. 17a.

Step S1206: a text caption of video is generated based on the graph convolution features. Alternatively, a self-attention-based decoder may be used to learn inter-frame information of selected frames according to the obtained graph convolution features to generate a text caption of a given video. For example, for each selected frame, a vector about the graph convolution feature can be obtained, and these feature vectors are input to the self-attention-based decoder to learn to obtain inter-frame information between frames, as shown in 505 in FIG. 17a. The vector of the graph convolution features of each frame can be input to the inter-frame transformer decoder, and the text caption of the video is obtained based on the output of the decoder, that is, "a person is putting pizza in the oven".

Example Three

FIG. 16 illustrates a schematic flowchart of an alternative method for generating video captioning information given in this example. By comparing FIG. 15 and FIG. 16, it can be seen that the first three steps of this example are the same as that of the above Example two, which will not be repeated here. The example differs from Example one in that step S1304 is added in this example, that is, the attribute prediction network is applied to the extracted features of respective target regions to obtain the attribute features of respective target regions. For example, the relationship prediction network can be trained based on the Visual Genome dataset, and then the attribute features of respective target regions can be obtained by using the trained attribute prediction network, as shown in the example of FIG. 9.

Accordingly, in step S1305, when constructing the scene graph of each frame, it may be specifically constructed based on the obtained attribute features of respective target regions and the relationship features between respective target regions, and then in step S1306, the graph convolution features of each frame are obtained according to the scene graph constructed based on the attribute feature and the relationship feature.

It should be noted that the order of the above steps S1303 and S1304 can be reversed or the above steps S1303 and S1304 can be performed simultaneously.

After obtaining the graph convolution features of each frame, a text caption of the video can be generated according to the obtained graph convolution features through step S1307. A self-attention-based decoder can be used to learn inter-frame information of selected frames to generate a text caption of a given video.

For example, as shown in 505 in FIG. 17a, an attention-based decoder (e.g., an inter-transformer decoder shown in the figure) may be used to learn inter-frame information to generate a text caption of video according to graph convolution features.

As another example, as shown in 1005, 1006, and 1007 in FIG. 17b, the obtained graph convolution features may be separately encoded, and the encoded features may be processed to obtain the target dimension of feature vector. The cross connecting line between the constructing scene graph and the graph convolution features in FIG. 17b indicates that the used scene graph can be a spatial-temporal scene graph, that is, the inter-frame information can be considered when constructing the scene graph, and of course, the spatial scene graph can also be used. Specifically, a self-attention-based intra-encoder (e.g., the intra-frame transformer encoder shown in FIG. 17b) can be used to separately perform the encoding operation on the graph convolution features of each frame. The function of the self-attention-based intra-encoder is to learn the infra-frame information, that is, the self-attention mechanism can be used to further learn the association information between the objects in the frame. Alternatively, the structure of the self-attention-based intra-frame encoder is based on the self-attention mechanism. The structure includes a multi-head attention layer, a layer normalization layer, and a feed forward network layer. Next, the output from the self-attention-based intra-frame encoder is processed to obtain a target dimension of feature vector for each frame.

For example, it is assumed that the dimension of the sequence output from the self-attention-based intra-encoder is T*C, where T represents the number of nodes in the scene graph, C is the feature dimension of the feature vector corresponding to each node, and the self-attention-based intra-frame encoder uses the self-attention mechanism to learn the relationship of the output sequence and other information and outputs the learned sequence. Here, the length of output sequence is the same as the length of input sequence, which is T*C. The output is averaged to obtain a feature vector with a dimension of 1*C. As such, it may obtain a 1*C feature vector for each frame.

An encoded feature vector can be obtained for each selected frame. These encoded feature vectors are input to a self-attention-based inter-frame encoder (e.g., the inter-transformer encoder shown in FIG. 17b) and then encoded again to obtain the target dimension of feature vector.

Thereafter, based on the encoded features, a self-attention-based decoder (e.g., the inter-frame transformer decoder shown in FIG. 17b) is used to learn the inter-frame information to generate a text caption of a given video. The encoded features are input to a self-attention-based inter-frame decoder to learn to obtain inter-frame information between frames, and a text caption of a given video is generated by learning the input features.

As another example, it may only use the self-attention-based intra-frame encoder to separately encode the graph convolution features of each of the obtained frames, and then input the encoded features to the decoder to generate a text caption of the video. Alternatively, it may only use the self-attention-based inter-frame encoder to encode the graph convolution features of each of the obtained frames, and then input the encoded features to a decoder to generate the text caption of the video. That is, it may only perform operation 1005 in FIG. 17b or operation 1006 in FIG. 17b, or it may perform operation 1005 in FIG. 17b and operation 1006 in FIG. 17b together.

After performing a series of processing on a given video, a text caption of the given video can be implemented. As shown in FIG. 17b, a text caption of "a man is putting pizza in the oven" can be generated from the selected frames.

Example Four

FIG. 18 illustrates a schematic flowchart of an alternative method for generating video captioning information given in this example. As shown in FIG. 18, by comparing FIG. 18 and FIG. 16, it can be seen that this example differs from the Example three in step S1505. When constructing the scene graph of each frame, the time information is also considered in this example. Specifically, it may construct the spatial scene graph for each image based on the obtained attribute features of respective target regions and the relationship features between respective target regions, time information is added between the scene graphs for frames to obtain a spatial-temporal scene graph, as the example shown in FIG. 10.

It should be noted that this example can also be implemented on the basis of Example one, that is, step S1504 can be omitted and the attribute features of the target region are not considered.

After obtaining the spatial-temporal scene graph of each frame, in step S1506, a graph convolution network is used to obtain the graph convolution features of each frame based on the nodes and edges in the spatial-temporal scene graph of each frame. After that, in step S1507, a text caption of the given video is generated according to the obtained graph convolution features. For example, a self-attention-based encoder may be used to encode the graph convolution features. According to the encoded graph convolution features, a self-attention-based decoder is used to learn inter-frame information to generate a text caption of the video.

Example Five

FIG. 19 illustrates a schematic flowchart of an alternative method for generating video captioning information given in this example. By comparing FIG. 19 and FIG. 16, it can be seen that this example differs from the above example three in the followings.

Step S1602: for each of the selected frames, a feature extraction network is used to obtain several target regions and the features of respective target regions (i.e., regional features or local features), and the spatial-temporal visual features of the video.

Compared with the steps of extracting regional features in the above examples, the features extracted by this step in this example may also include the spatial-temporal visual features of the video. Alternatively, as shown in FIG. 20, the spatial-temporal visual features can be obtained through the spatial-temporal feature extraction network.

Step S1603: based on the selected frames, the semantic features of the video are extracted through the semantic feature extraction network. As shown in FIG. 20, semantic features can be obtained through a semantic prediction network based on frames.

Steps S1604 to S1607 correspond to the steps of obtaining relationship features and attribute features, constructing scene graph (spatial scene graph or spatial-temporal scene graph), and extracting graph convolution features in the previous examples, which are not repeated here.

Step S1608: a text caption of the video is generated according to the graph convolution features of each frame, the above spatial-temporal visual features, and semantic features. Specifically, a plurality of decoders (decoder bank shown in FIG. 20) can be used to learn inter-frame information to generate text caption of video according to the spatial-temporal visual features, semantic features, and graph convolution features.

Each decoder can be a self-attention-based decoder or RNN-based decoder. Specifically, the spatial-temporal visual features, semantic features, and graph convolution features can be input to the decoder bank to learn to obtain inter-frame information between frames, and then the results of respective decoders are averaged to obtain the final decoding result. The text caption about a given video is generated by learning input features.

The method for generating video captioning information provided in the present disclosure solves the problem that the low accuracy of existing video captioning algorithms due to ignoring the intra-frame information, and proposes an improved video captioning scheme. When the method provided in this application is implemented, it may obtain features based on a graph convolutional network, and obtain a text caption of the video based on the decoding output of the self-attention structure. Specifically, after obtaining the graph convolution features, the graph convolution features can be directly input to a self-attention-based decoder to decode and output a text caption about a given video, and it may further perform the encoding operation on the obtained graph convolution features, and then input the encoded features to a self-attention-based codec for inter-frame encoding and decoding, thereby outputting a text caption of a given video.

It should be noted that the accuracy of the captioning information generated by the present disclosure can be further improved by using the self-attention-based intra-encoder and the self-attention-based inter-frame encoder. Alternatively, it may use an self-attention-based intra-encoder to separately encode the obtained graph convolution features of each frame, and integrate and input the encoded features to a decoder to generate the text caption of the video; or it may use an self-attention-based inter-frame encoder to encode the obtained graph convolution features of each frame and input the encoded features to the decoder to generate the text caption of the video. That is, it can selectively use the intra-frame encoders and the inter-frame encoders. The solutions provided by the embodiments of the present disclosure can make full use of intra-frame information and/or inter-frame information, thereby generating a more accurate text caption for a given video.

The image is taken as an example below to describe some alternative implementation of generating the image captioning information.

Example Six

FIG. 21 illustrates a schematic flowchart of a method for generating image captioning information according to an embodiment of the present disclosure. As shown in the figure, the method includes the flowing steps.

Step S10: characteristic information corresponding to the image is extracted.

Step S20: the captioning information corresponding to the image is obtained based on the extracted characteristic information.

The image may be acquired from a local storage or a local database as required or received from an external data source (such as, the Internet, a server, a database, etc.) through an input device or a transmission medium.

Specifically, characteristic information corresponding to an image may be extracted through a feature extract ion network. As an alternative method, the local features of respective target regions can be extracted by the trained Faster R-CNN, for example, the feature vectors obtained after averaging and pooling the feature graph of Pool5 (i.e., region of interest (RoI)) layer may be selected as features.

After obtaining the characteristic information of the image, the captioning information corresponding to the image may be obtained through decoders according to the extracted characteristic information. The specific structure of the decoder is not limited in the embodiment of the present disclosure. For example, the decoder may be implemented by a self-attention-based decoder (e.g., a transformer decoder). Specifically, the decoder may output words that may be output at each moment and their output probabilities (which may be normalized probability) based on the extracted characteristic information and the input word vector (which may include the start token and the word vector that has been predicted during the iterative prediction process). As an alternative solution, the self-attention-based decoder may include a masked multi-head attention layer, a multi-head attention layer, a layer normalization layer, and a feed forward network layer.

For example, the vocabulary is a, b, c, d, e. The decoder may output words from the vocabulary that may be output at the first moment, the output probability of word a (e.g., 60%) and the output probability of word b (e.g., 40%), and c, d and e (0%). At the second moment, the output probability of word c (e.g., 60%), the output probability of word d (e.g., 20%) and the output probability of word e (e.g., 20%), a, b (0%) so on. In this case, according to an exemplary embodiment of the present disclosure, an image captioning sentence may be generated by a greedy decoding algorithm, that is, an image captioning sentence is generated by combining, in time sequence, words with a maximum output probability that may be output at each moment. Alternatively, according to another exemplary embodiment of the present disclosure, an image captioning sentence may be generated by a Monte Carlo sampling method, that is, an image captioning sentence is generated by performing Monte Carlo sampling based on an output probability of a word that may be output at each moment.

Correspondingly, when generating the captioning information of the image, the image captioning sentence may be obtained by combining the words with the maximum output probability that may be output at each moment in time sequence until the output probability of the stop character is maximum.

Alternatively, the above step S10 may further include obtaining global features corresponding to the image.

Correspondingly, in the above step S20, the obtaining text caption of the image may be obtaining the text caption of the image based on the obtained local features and global features.

In order to obtain a more accurate image caption, after acquiring the local features of respective target regions of the image, it may further obtain the global features of the image based on the local features, so as to obtain more accurate image captioning information based on the local and global characteristic information.

Alternatively, the obtaining global features corresponding to the image may include: obtaining global features of the image based on local features of the image, or extracting the global features through a feature extract ion network based on the image.

Specifically, the local characteristic information corresponding to respective target candidate regions of the image can be extracted through the feature extraction network, and the global characteristic information corresponding to the image can be obtained based on the local characteristic information. Correspondingly, the decoder can be used to obtain the captioning information corresponding to the image according to the local characteristic information and the global characteristic information. As an alternative method, the global characteristic information may be obtained by averaging the local characteristic information corresponding to respective target candidate regions of the image. As another alternative method, the global characteristic information may be obtained by applying a feature extraction network (e.g., CNN) to the image, for example, it is obtained by extracting the feature maps of respective layers (i.e., respective channels) of the image through Res-Net and averaging and pooling them.

In an alternative embodiment of the present disclosure, the local features may include local image features and/or local attribute features, and the global features include global image features and/or global attribute features; correspondingly, the global image features corresponding to an image may be obtained based on the local image features; and/or, the global attribute features corresponding to the image may be obtained based on local attribute features.

That is, the obtained local characteristic information may include local text attribute information in addition to the local image characteristic information. Therefore, when extracting local features through a feature extraction network, the feature extraction network may further include an attribute prediction network. The attribute prediction network can be a multi-label classification network. Alternatively, the attribute prediction network can be obtained using a weakly-supervised training method such as noisy-OR. In practical applications, attributes can be finely divided according to nouns, verbs, adjectives, relatively rare words, and topics. Each attribute is obtained based on a unique attribute prediction network (e.g., Multiple Instance Learning (MIL)). Finally, various attribute features can be concatenated to obtain the final text attribute features.

Alternatively, when the obtained local characteristic information includes local image characteristic information and local text attribute information, the obtained global characteristic information may also include global image characteristic information and global text attribute information. Similarly, the global image characteristic information and global text attribute information can be obtained based on the corresponding local characteristic information, that is, the global image characteristic information corresponding to the image can be obtained based on the local image characteristic information, and the global text attribute information corresponding to the image can be obtained based on the local text attribute information. The global image characteristic information and the global text attribute information may also be extracted based on the image through a neural network. Of course, for the local characteristic information and the global characteristic information, one of them may include image characteristic information and text attribute information, and another may include image characteristic information or text attribute information, which may be configured according to application requirements.

In an alternative embodiment of the present disclosure, the obtaining a text caption of an image according to the local feature and the global feature includes: encoding separately each local feature to obtain the encoded local features based on all the extracted local features; and obtaining the text caption of the image based on the encoded local features and global features.

That is, after obtaining the local features of the image, the encoder can be used to encode the local characteristic information according to all the extracted local characteristic information to obtain the encoded local characteristic information. The encoder can be used to learn the relationship between the local features of respective target candidate regions based on all the extracted local characteristic information.

As an alternative solution, the encoder may be implemented by a self-attention-based encoder, and the encoder may encode each local characteristic information based on all the extracted local characteristic information to obtain encoded local characteristic information. Correspondingly, when the decoder obtains the captioning information corresponding to the image according to the local characteristic information and the global characteristic information, the decoder can output words that may be output at each moment and their output probabilities (which may be normalized probability) based on the encoded local characteristic information and global characteristic information, and the input word vector (which may include the start token and the word vector that has been predicted during the iterative prediction process). The image captioning sentence may be obtained by combining the words with the maximum output probability that may be output at each moment in time sequence until the output probability of the stop character is maximum As an alternative solution, the above self-attention-based encoder may include a multi-head attention layer, a layer normalization layer, and a feed forward network layer that are cascaded in sequence.

As an example, FIG. 22 illustrates a schematic structural diagram of a codec provided in an embodiment of the present disclosure. As shown in the figure, in order to obtain the input information of the encoder, for the image to be processed (the image shown in the lower right corner of the figure), local features of respective target regions of the image can be extracted through a feature extraction network (e.g., Faster R-CNN shown in the figure). Specifically, the feature extraction network can divide the input image into multiple target candidate regions ((i.e., target region), and obtain a feature vector (i.e., local feature) from each target candidate region, thereby obtaining multiple feature vectors, such as $\{v_j\}$ shown in FIG. 22, each vector in $\{v_j\}$ represents one local characteristic information of one target candidate region (the region corresponding to the rectangular block shown in the lower left of the figure).

Regional feature embedding may be performed on the local characteristic information extracted by the feature extraction network, so as to change the dimension of the characteristic information to be suitable for subsequent encoders processing. The local characteristic information output after the embedding processing is input to the encoder for encoding.

Alternatively, the encoder shown in FIG. 22 may have one or more block structures. When the encoder is a multi-block structure, the structure of each block may be the same or different. As an example, it is assumed that the encoder may include 6 blocks with the same structure, and the 6 blocks are cascaded in sequence. Each block may mainly include two parts of the multi-head attention layer and the feed forward network fully connected per location. Alternatively, the feed forward network can be implemented by two linear prediction layers. The two linear prediction layers may include ReLU activation operations. The multi-head attention layer and the feed forward network in each block can correspond to layer normalization layers respectively. As shown in FIG. 22, each block in this example can include a multi-head attention layer, a layer normalization layer, a feed forward network layer, and a layer normalization layer in sequence. Each block can be stacked to obtain an encoder.

The following takes the processing of the first block as an example for description. The local characteristic information is first processed by the multi-head attention layer, of which the output result is integrated with the output of the regional feature embedding (e.g., addition processing) and then is subjected to layer normalization processing. The normalized result is processed through the feed forward network, and then is integrated with the output of the previous layer normalization layer (e.g., addition processing), and then is subjected to layer normalization processing to obtain the output of the first block. The output result of the first block is used as the input of the second block, and the encoding process is performed in turn, thereby to obtain the output result of the encoder (that is, the encoder output in FIG. 25).

Alternatively, as shown in FIG. 22, the global characteristic information can be further obtained based on the local characteristic information extracted by the feature extraction network. For example, the local characteristic information can be averaged to obtain the global characteristic information, such as feature vector $\bar{v}$ shown in FIG. 22. In addition, it may also obtain the start token and the word vector that has been predicted during the iterative prediction process (if it is the first prediction of the iterative prediction, only the start token is obtained), and the start token and the predicted word vector are shown as w in FIG. 22. When training the model, all word vectors corresponding to the samples can be input.

For the global characteristic information $\bar{v}$ and the start token and the word vector w predicted in the iterative prediction process, decoder embedding can be performed, so as to change the dimension of characteristic information to be suitable for subsequent decoders processing. The global characteristic information, start token and word vector output after embedding, may be input to the decoder for decoding.

Alternatively, the decoder in FIG. 22 may have one or more blocks, and the structure of each block may be the same. For example, the decoder may include 6 blocks with the same structure. As an alternative structure, each block may mainly include a masked multi-head attention layer, a multi-head self-attention layer corresponding to the feature, and a feed forward network. The multi-head attention layer and the feed forward network in each block can correspond to layer normalization layers respectively. The structure of each block can include a masked multi-head attention layer, a layer normalization layer, a multi-head attention layer, a layer normalization layer, a feed forward network layer, a layer normalization layer in turn. Each block can be stacked to get the decoder.

The following takes the processing of the first block as an example for description. The global characteristic information $\bar{v}$, the start token, and the word vector w are first processed by a masked multi-head attention layer, of which the processing result is integrated with the output of encoder embedding (e.g., addition processing) and then is subjected to layer normalization processing. The normalized result and the result output by the encoder are together processed through the multi-head attention layer, and then is integrated with the output of the previous layer normalization layer (e.g., addition processing), and then is subjected to layer normalization processing. The normalized result is processed through the feed forward network, and then is integrated with the output of the previous layer normalization layer, and then is subjected to layer normalization processing, finally the processing result is the output result of the first block. The output result of the first block is used as the input of the second block, and the decoding process is performed in turn, thereby to obtain the output result of the decoder.

The output result of the decoder is processed by the linear layer and then processed by the softmax layer, so as to output word vectors that may be output at the current moment (i.e., this iterative prediction) and the corresponding output probabilities, such as words a and b and the output probability of word a and the output probability of word b. The decoder, linear layer, and softmax layer repeat the above iterative prediction process until the probability of output stop character is maximum. The captioning information corresponding to the input image can be obtained according to the word vector obtained at each iteration.

In the case where the local feature includes local image feature and local text attribute information, the used encoder may include an image feature encoder and an attribute feature encoder, and the two parts of encoders are respectively used for encoding the local image characteristic information and the local text attribute information. Specifically, the image feature encoder can encode each local image characteristic information according to all the extracted local image characteristic information to obtain the encoded local image characteristic information, and the attribute feature encoder can encode the local text attribute information to obtain the encoded local text attribute information according to all the extracted local text attribute information. Accordingly, at this time, the decoder can be used to obtain the captioning information corresponding to the image according to the encoded local image characteristic information, the encoded local text attribute information, the global image characteristic information, and the global text attribute information.

As another example, FIG. 23 illustrates a schematic structural diagram of a codec provided in an embodiment of the present disclosure. As can be seen from FIG. 22 and FIG. 23, the structure of the decoder of FIG. 23 may be similar as that of the decoder of FIG. 22. The encoder in this example may include an image feature encoder and an attribute feature encoder, and the structure of the two parts may be the same or different.

As shown in FIG. 23, for the image to be processed (the image shown in the lower left corner of the figure), local image feature vectors of multiple target candidate regions can be extracted through a feature extraction network (e.g., Faster R-CNN shown in the figure), such as $\{v_j\}$ shown in FIG. 23, each vector in $\{v_j\}$ represents local image feature vector of one target candidate region (the region corresponding to the rectangular block marked in the image processed by Faster R-CNN shown in the FIG. 23). It may also obtain multiple local text attribute vectors, such as $\{a_j\}$ shown in FIG. 23, each vector in $\{a_j\}$ represents the local text attribute vector of one target candidate region (the region corresponding to the rectangular block marked in the lower left of image).

The regional image feature Embedding can be performed on the extracted local image characteristic information. The local image characteristic information output after being performed Embedding is input to the image feature encoder for encoding. The regional attribute feature Embedding can be performed on the extracted local text attribute information. The local text attribute information output after being performed Embedding is input into the attribute feature encoder for encoding.

In this example, the structures of the image feature encoder and the attribute feature encoder shown in FIG. 23 are described by taking the structure of the encoder shown in FIG. 22 as an example. For example, they can each contain 6 blocks with the same structure. The structure of each block is shown in FIG. 23, and each block can be stacked to get an encoder. The processing flow of each block can refer to the description of the block structure of the encoder in FIG. 22 described above. When the image feature encoder and the attribute feature encoder perform feature encoding, the only difference is that the input of the image feature encoder is the feature obtained after the regional image feature Embedding being performed on the local image characteristic information, and the input of the attribute feature encoder is the feature obtained after the region attribute feature Embedding being performed on the local text attribute. After encoding processing, the output results of the encoders are obtained (i.e., the output of the image feature encoder and the output of the attribute feature encoder in FIG. 23).

Further, the local image characteristic information can be averaged to obtain global image characteristic information, such as the feature vector $\bar{v}$ in FIG. 23, and the local text attribute information can be averaged to obtain global text attribute information, such as the feature vector $\bar{a}$ in FIG. 23. In addition, it may further obtain the start token and the word vector that has been predicted during the iterative prediction process (if it is the first iterative prediction, only the start token is obtained). The start token and the predicted word vector is shown as w in FIG. 23, and when training the model, all word vectors of the sample can be input.

The encoder Embedding can be performed on the global image characteristic information $\bar{v}$, the global text attribute information $\bar{a}$, the start token, and the word vector w predicted in the iterative prediction process, so as to change the dimension of the characteristic information to be suitable for subsequent decoders processing. The global image characteristic information, the global text attribute information, the start token, and the word vector output after being subjected to Embedding can be input to the decoder for decoding.

As an alternative structure, the decoder structure shown in FIG. 23 may have one or more blocks. When the decoder is a multi-block structure, the structure of each block may be the same or different. For example, it may include 6 blocks with the same structure, and the structure of each block may include a masked multi-head attention layer, a multi-head self-attention layer corresponding to image feature, a multi-head self-attention layer corresponding to attribute feature, and a feed forward network. The multi-head attention and feed forward network in each block may correspond to layer normalization layers respectively. Specifically, as shown in FIG. 23, the structure of each block may include a masked multi-head attention layer, a layer normalization layer, a multi-head attention layer, a layer normalization layer, a multi-head attention layer, a layer normalization layer, a feed forward network layer, and a layer normalization layer in turn. Each block can be stacked to obtain a decoder.

The following takes the processing of the first block as an example for description: the global image characteristic information $\bar{v}$, the global text attribute information $\bar{a}$, the start token, and the word vector w predicted in the iterative prediction process are first processed by a masked multi-head attention layer, of which the processing result is integrated with the output of decoder embedding (e.g., addition processing) and then is subjected to layer normalization processing. The normalized result and the result output by the image feature encoder are together processed through the multi-head attention layer, and then is integrated with the output of the previous layer normalization layer (e.g., addition processing), and then is subjected to layer normalization processing. The normalized result and the result output by the attribute feature encoder are together processed through the multi-head attention layer, and then is integrated with the output of the previous layer normalization layer (e.g., addition processing), and then is subjected to layer normalization processing. The normalized result is processed through the feed forward network, and then is integrated with the output of the previous layer normalization layer, and is subjected to layer normalization processing. The processing result is the output result of the first block. The output result of the first block is used as the input of the second block, and the decoding process is performed in turn, thereby to obtain the output result of the decoder.

The output result of the decoder is processed by the linear layer and then processed by the softmax layer, so as to output word vectors that may be output at the current moment (i.e., this iterative prediction) and the corresponding output probabilities, such as words a and b and the output probability of word a and the output probability of word b. The decoder, the linear layer, and the softmax layer repeat the above iterative prediction process until the output probability of the stop character is maximum. The captioning information corresponding to the above input image can be obtained according to the word vector obtained at each iteration.

It can be known from the description of the method for generating image captioning information in the foregoing alternative embodiments that the generation method may be specifically implemented by an image captioning model, that is, an image may be input into the image captioning model, and a text caption of the image may be obtained based on the model output. The specific neural network structure of the image captioning model is not limited in the embodiment of the present disclosure. For example, the codec network structure including a self-attention-based encoder and a self-attention-based decoder shown in FIG. 22 or FIG. 23 may be used, but not limited to it.

It can be understood that the solutions in the foregoing examples are merely examples of some alternative manners of the present disclosure, and are not used to limit the solutions of the present disclosure. In addition, the above examples are suitable for generating the captioning information of the image and also for generating the captioning information of the video. The generation of the captioning information of the image differs from the generation of the captioning information of the video in that: when generating the captioning information of the image, since there is only one image, it does need to consider the inter-frame information, that is, the information between adjacent images, such as the temporal edges and inter-frame encoders described above.

It can be known from the foregoing description of the method for generating the captioning information of the multimedia data provided in each alternative embodiment of the present disclosure that the generation of the captioning information of the multimedia data may be specifically implemented by using a multimedia data captioning model. For videos, the multimedia data captioning model is a video captioning model, and for images, the multimedia data captioning model is an image captioning model. The video captioning model and the image captioning model may be different models or the same model. That is, it may be a model that is not only suitable for generating image captioning, but also suitable for generating video caption. Alternatively, the video captioning model may be a model based on RNN, or a model based on other network structures, such as a model based on Transformer. In actual applications, the specific structure of the model may be set according to actual needs, which are not limited in the embodiments of the present disclosure.

For a video of which video captioning information needs to be obtained, the video or frames selected from the video may be input into a video captioning model, and a text caption of the video may be obtained based on the input of the video captioning model. The specific model structure of the video captioning model is not limited in the embodiment of the present disclosure. The original video captioning model may be trained by using video samples, and the trained video captioning model is used to generate video captioning information.

Specifically, in an alternative embodiment of the present disclosure, the text caption of the multimedia data is obtained by using a multimedia data captioning model, and the multimedia data captioning model is obtained by training in the following manner: obtaining training samples, wherein the training samples comprise a first sample multimedia data with captioning labels; training an original captioning model based on the first sample multimedia data until the model loss function converges; and taking the trained captioning model as the multimedia data captioning model.

It can be understood that, for the video captioning model, the sample multimedia data is the sample video, and the captioning label is the video captioning label; for the image captioning model, the sample multimedia data is the sample image, and the captioning label is the sample image captioning label. The specific form of the model loss function may be configured according to actual needs. For example, the model loss function commonly used in training a video captioning model or an image captioning model may be selected. During training, the value of the model loss function represents the difference between the captioning information of multimedia data predicted by the model and the captioning label information, or indicates whether the predicted captioning information meets other preset end conditions. Through continuous training, the multimedia information predicted by the model may be close to the captioning label information, or meet other preset conditions.

In order to improve the accuracy of the generated captioning information of the multimedia data, FIG. 24 illustrates a method for training a multimedia data captioning model provided in an alternative embodiment of the present disclosure. As shown in the figure, the training sample in the training method also includes a second sample of multimedia data without captioning labels. The model loss function includes a first loss function and a second loss function. When training the original captioning model based on the first sample multimedia data, the method may include the following steps S201 to S203.

Step S201: a preset multimedia data captioning model is trained based on the first sample multimedia data to obtain a value of a first loss function, and the captioning model is trained based on the second sample multimedia data to obtain a value of a second loss function.

Specifically, in the embodiment of the present disclosure, the first sample multimedia data having captioning labels and the second sample multimedia data without captioning labels can be used to together train a preset video captioning model.

The sources of the first sample multimedia data and the second sample multimedia data are not limited in the embodiment of the present disclosure. Taking a video as an example, the original video caption corresponding to the first sample video data may be manually labeled by a technician, such as the video shown in FIG. 25, and the technician may label the video caption of "a child is cleaning the ground" for the video. The second sample video data may be any obtained video without a video caption, for example, a video obtained from a video website, or a video taken by a user, and so on. The specific forms of the first loss function and the second loss function are not limited in the embodiments of the present disclosure, which may be configured according to actual application requirements.

Step S202: a value of the model loss function of the captioning model is obtained based on the value of the first loss function and the value of the second loss function.

Alternatively, for different loss functions, each function may also have its own weight, so that the importance of different loss functions in the training process are different. For example, because the first multimedia data has the original captioning label, and the second sample multimedia data does not have the original captioning label, the captioning label information of the first sample multimedia data (i.e., the original captioning label) is very accurate, and the weight of the first loss function may be greater than that of the second loss function. When different loss functions have their own weights, the final loss function of the multimedia data captioning model can be determined based on the corresponding weights of respective loss functions. For example, the final loss function may be a weighted summation of respective loss functions.

That is, the step of obtaining the value of the model loss function (also referred to as the final loss function) based on the value of the first loss function and the value of the second loss function may include the following steps.

It may obtain a value of the corresponding target first loss function based on the preset weight of the first loss function and obtain a value of the corresponding target second loss function based on the preset weight of the second loss function.

The sum of the value of the target first loss function and the value of the target second loss function is taken as the value of the final loss function.

Specifically, the value of the final loss function can be calculated by the following equation 8:

$$\min_\theta J = J_{label}(\theta) + \in J_{unlabel}(\theta) \quad \text{[Equation 8]}$$

Where $\in$ is a hyperparameter. In this example, $J_{label}(\theta)$ is the first loss function and $J_{unlabel}(\theta)$ is the second loss function. The weight of the first loss function can be set to 1, and the weight of the second loss function is $\in$. As such, the product of the first loss function and the corresponding weight is the target first loss function, and the product of the second loss function and the corresponding weight is the target second loss function. The sum of the target first loss function and the target second loss function is the final loss function.

Step S203: the captioning model is trained based on the value of the final loss function until the final loss function converges, to obtain a trained multimedia data captioning model.

Specifically, after obtaining the final loss function of the video captioning model, the model parameters of the video captioning model are updated based on the final loss function until the final loss function converges based on the minimum value, so as to obtain a trained video captioning model. The final loss function of the video captioning model is determined by the first loss function and the second loss function. The final loss function converging based on the minimum value may be this function converging based on the minimum value, or the first loss function and the second loss function simultaneously converging based on the minimum value.

In the embodiment of the present disclosure, when a first sample multimedia data having captioning label is received, a preset multimedia data captioning model is trained based on the first sample multimedia data and captioning label to obtain a value of a first loss function. When a second sample multimedia data without captioning label is received, the captioning model is trained based on the second sample multimedia data to obtain a value of the second loss function, and then the value of the final loss function of the multimedia data captioning model is obtained based on the first loss function and the second loss function, and the multimedia data captioning model is trained based on the final loss function unti1 the final loss function converges based on the minimum value, so as to obtain a trained multimedia data captioning model.

Through the above manner, in addition to training the multimedia data captioning model using sample video data having captioning labels, this alternative embodiment of the present disclosure can also simultaneously use the sample multimedia data without captioning labels to train the video captioning model. It may significantly reduce the labor and time costs required to label captioning information on the sample multimedia data, especially when the amount of sample multimedia data is large. Furthermore, because the amount of sample multimedia data is increased, the accuracy and precision of the multimedia data captioning model is also improved. In addition, the algorithm in the embodiment of the present disclosure is applicable to different models, such as the above RNN-based model or the Transformer-based model. This method is a general training method.

In an alternative embodiment of the present disclosure, in step S201, the obtaining the value of the first loss function based on the first sample multimedia data may include: inputting the first sample multimedia data into a video captioning model to obtain predicted target captioning information; and obtaining the value of the first loss function based on the target captioning information and the corresponding captioning label.

The value of the first loss function represents difference between the target captioning information obtained based on the model output and the corresponding labeled captioning information.

As an example, FIG. 26 illustrates a schematic diagram of a method for training a multimedia data captioning model provided in an embodiment of the present disclosure. This example is described by taking a video as an example. The labeled data shown in the figure corresponds to the video data in the first sample video data, and the unlabeled data shown in the figure corresponds to the video data in the second sample video data. The training method is described below with reference to FIG. 26.

As shown in FIG. 26, specifically, the labeled video data V can be input into the video captioning model M, and the video data is analyzed and processed by the video captioning model to generate a corresponding target video caption, and then the value of the first loss function is calculated based on the original video caption (corresponding to the label y in FIG. 26) in the first sample video data and the target video caption. In this example, the first loss function may be a cross entropy loss function, and the cross entropy loss function is shown in equation 9:

$$J_{label}(\theta) = -\Sigma_{t=1}^{T} \log(p_\theta(y_t|y_{1:t-1}, V)) \quad \text{[Equation 9]}$$

Where $J_{label}(\theta)$ represents the cross entropy loss, $\theta$ represents the model parameters of the video captioning model, t represents the current moment, T represents the maximum moment, $y_t$ represents the ground-truth corresponding to the current moment, and $y_{1:t-1}$ represents the ground-truth corresponding from time 1 to time t−1, V represents the video, and $p_\theta$ represents the probability that the output word is ground-truth. Specifically, $p_\theta(y_t|y_{1:t-1}, V)$ represents the probability that the word predicted by the model at the current moment is the corresponding labeled word. The meaning of the loss function is that when the input of the current time is the correct word at each time before the current time, the probability that the output of the current time is also the correct word is maximized.

For example, the video shown in FIG. 25 is analyzed and processed by the video captioning model. It is assumed that the current time t=2, the word $y_0$ output at the initial time t=0 is "a", and the word $y_1$ output at the time t=1 is "child", then when it is at current time t=2 and the word $y_1$ "child" output at time t=1 is correct word, the probability that $y_2$ outputs "is" is maximized.

It is assumed that the video caption obtained by analyzing and processing the video shown in FIG. 25 through the video captioning model is "a child is sweeping the ground", then the video captioning model is trained based on "a child is sweeping the ground" and the original video caption "a child is cleaning the ground".

In practical applications, the embodiment of the present disclosure may set a lexicon in advance, and the word output at each moment is determined from the lexicon. The word $y_0$ output at the initial time t=0 can be determined based on the start token of the video. For example, for the video shown in FIG. 25, the word $y_0$ "a" output at time t=0 is determined based on the start token of the video. Of course, in actual applications, other methods may also be used to determine the first word of the video caption, which is not limited in the embodiment of the present disclosure.

In an alternative embodiment of the present disclosure, the training the captioning model based on the second sample multimedia data to obtain the value of the second loss function includes: performing data augmentation on the second sample multimedia data at least once to obtain a third sample multimedia data; inputting the second sample multimedia data into the captioning model to obtain at least one multimedia captioning; determining a score of each multimedia captioning based on the second sample multimedia data and the third sample multimedia data; and obtaining the value of the second loss function based on the scores of the multimedia captioning.

That is, when the model is trained based on the second sample multimedia data without captioning label, the sample multimedia data may be augmented to obtain the third sample multimedia data; based on the third sample multimedia data and the second sample video data, a score of each captioning information obtained through the model based on the second sample multimedia data is determined, and a value of a second loss function is obtained based on respective scores.

Alternatively, for example, the second sample multimedia data may be input into the captioning model to obtain the first captioning information and the second captioning information. Based on the second sample multimedia data and the third sample multimedia data, the first score of the first captioning information and the second score of the second captioning information are determined, and the value of the second loss function is obtained based on the first score and the second score.

In the solution of the embodiment of the present disclosure, when the multimedia data captioning model is trained by using sample multimedia data without captioning label, the second sample multimedia data is subjected to data augmentation K (K) times to obtain a third sample multimedia data. The captioning model is trained based on the second sample multimedia data and the third sample multimedia data. Since the second sample multimedia data and the third sample multimedia data are the same or similar, the captioning information of the second sample multimedia data and the captioning information of the third sample multimedia data should also be the same or similar, so that the value of the second loss function can be calculated based on the scheme, and the captioning model is trained based on this function, thereby further improving the accuracy and precision of the captioning model.

In an alternative embodiment of the present disclosure, the inputting to the second sample multimedia data into a multimedia data captioning model to obtain corresponding first captioning information and second captioning information may specifically include: inputting the second sample multimedia data into the captioning model, and determining the first captioning information from the output result of the captioning model through the greedy algorithm; and/or inputting the second sample multimedia data into the captioning model, and determining the video captioning information from the output result of the captioning model based on the probability sampling.

Where the greedy algorithm (also referred to as the greedy search) refers to always making the best choice when solving a problem. That is to say, instead of considering the overall optimal solution, the local optimal solution is made in a certain sense.

Alternatively, taking a video as an example, the above first captioning information is the first video caption, and the second captioning information is the second video caption. The formula for obtaining the first video caption $c_g$ through the greedy algorithm may be as shown in equation 10:

$$c_g = \{c_g(1), c_g(2), \ldots, c_g(T)\} \quad \text{[Equation 10]}$$

Where, $c_g(t)$ (t=1, 2, ..., T) represents the word output at the current time t; alternatively, $c_g(t)=(\text{argmax}_{y \in Y}(p_\theta(c_{g,1:t-1},V)))$, where V represents the second sample video data, $c_{g,i:t-1}$ represents the sequence of words output from the initial time to time t−1, that is, the words that have been output before the current time. At this time, $c_g(t)$ represents that the word with the maximum probability at the current time t is selected as the word output at the current time, and the output probabilities of respective candidate words at the current time is determined based on the words output at respective times before the current time and videoV, and the final output word at current time is the word with the maximum probability among the candidate words.

After the words output at each time are obtained, the words output at each time are ordered according to the output order to obtain the first video caption $c_g$.

For the second video captioning information, probability sampling refers that each unit in the survey population sample has the same probability of being selected, also referred to as Monte-Carlo sampling or probability sampling. Probability sampling is a sampling that the sample is sampled based on probability theory and random principles, which makes every unit in the population is sampled with a known non-zero probability. The probability that the unit in population will be sampled may be specified through sample design and achieved through some randomization operation, although random samples are generally not completely consistent with the population.

Alternatively, a formula for obtaining the second video caption $c_s$ based on probability sampling may be shown in equation 11:

$$c_s = \{c_s(1), c_s(2), \ldots, c_s(T)\} \quad \text{[Equation 11]}$$

Where, $c_s(t)$ (t=1, 2, ..., T) represents the word output at the current time t; alternatively, $c_s(t)=(\text{multinomial}_{y \in Y}(p_\theta(c_{s,1:t-1},V)))$, where $c_{s,1:t-1}$ represents the sequence of words output from the initial time to time t−1, that is, the words that have been output before the current time, V represents the second sample video data. At this time, $c_s(t)$ is to sample according to the output probability of each word at the current time and use the result of the sampling as the output, and the output probability of respective candidate words corresponding to the current time is determined based on the words output at respective times before the current time and video V, and the final output word at current time is Monte-Carlo sampled from respective output probabilities.

Taking the example in FIG. 26 as an example for description, for the second sample video data, that is, the un labeled data shown in FIG. 26, data augmentation can be performed K times to obtain a third sample video data (such as the augmented video data V' in FIG. 26). The manner for data augmentation may be to randomly remove frames in the video, or to perform transformation such as rotating and cropping on each frame in the video. It may also be other manners for data augmentation. In practical applications, the manners for performing data augmentation on video data are all applicable to the embodiments of the present disclosure, and the embodiments of the present disclosure do not limit this. The second sample video data is input into the video captioning model M to obtain the corresponding first video caption $c_g$ and the second video caption $c_s$. For example, the first video caption $c_g$ may be obtained by the above formula (2), and the second video caption $c_s$ may be obtained by the above formula (3).

Specifically, for example, by using a video captioning model to analyze and process videos with the same content as shown in FIG. 25 but without the original captioning information, the words (output results) corresponding to the five times can be obtained as follows: "a (corresponding to $c_g(1)$)", "child (corresponding to $c_g(2)$)", "is (corresponding to $c_g(3)$)", "cleaning (corresponding to $c_g(4)$)", "sweeping (corresponding to $c_g(4)$)", "organizing (corresponding to $c_g(4)$)", "ground (corresponding to $c_g(5)$)", where the output probabilities of the three candidate words at the time of $c_g(4)$ are respectively: 0.5 (cleaning), 0.2 (sweeping), 0.3 (organizing), then without considering the output probabilities of other words, through the greedy algorithm, the "cleaning" with the maximum output probability is taken as the output word at time $c_g(4)$, so the final $c_g$ generated based on the greedy algorithm is "A child is cleaning the ground."

For another example, following the above example, three candidate words determined at $c_g(4)$ time are "sweeping", "organizing", and "cleaning". The output probability of "sweeping" is 0.2, the output probability of "organizing" is 0.3, and the output probability of "cleaning" is 0.5, then without considering the output probabilities of other words, three video captions can be generated, which respectively are "a child is sweeping the ground" with an output probability of 0.2, "a child is organizing the ground" with an output probability of 0.3, "a child is cleaning the ground" with an output probability of 0.5, so the final $c_s$ generated based on probability sampling can be any one of three video captions.

That is to say, for the above situation, the second sample video data is input into the video captioning model, and the output result is obtained. Assuming that the video caption is generated for 10 times for the output result based on the greedy algorithm, then the obtained video caption may all be "a child is cleaning the ground" for 10 times; assuming that the video caption is generated for 10 times for the output result based on probability sampling, then it is possible to obtain video caption of "a child is sweeping the ground" for twice, and video caption of "a child is organizing the ground" for three times and video caption of "a child is cleaning the ground" for five times.

In an alternative embodiment of the present disclosure, the obtaining of the first score of the first captioning information and the second score of the second captioning information based on the second sample multimedia data and the third sample multimedia data may specifically include the followings.

The first captioning information is input into the captioning model with the second sample multimedia data and the third sample multimedia data, respectively, so as to obtain the first output probability distribution of the second sample multimedia data and the second output probability distribution of the third sample multimedia data, and the first score of the first captioning information is obtained based on the first output probability distribution and the second output probability distribution.

The second captioning information is input into the captioning model with the second sample multimedia data and the third sample multimedia data, respectively, so as to obtain the third output probability distribution of the second sample multimedia data and the fourth output probability distribution of the third sample multimedia data, and the second score of the second captioning information is obtained based on the third output probability distribution and the fourth output probability distribution.

Specifically, taking a video as an example, for the first video caption, the first video caption is taken as the ground-truth and is input into the video captioning model together with the second sample video data, so as to obtain the first output probability distribution of each moment of the first video caption. At the same time, the first video caption is taken as the ground-truth and is input into the video captioning model together with the third sample video data, so as to obtain the second output probability distribution of each moment of the first video caption, and then it may calculate the KL divergence of the first output probability distribution and the second output probability distribution, and obtain the first score $r_g$ based on the KL divergences.

As an alternative solution, the KL divergences can be multiplied by the time domain weights, and then be multiplied with negative 1 to obtain the first score $r_g$ of the first video caption, as specifically shown in equation 12:

$$r_g = \Sigma_{t=1}^{T}[-W_t / D_{KL}(p_\theta(c_{g,1:t-1}, V) \| p_\theta(c_{g,1:t-1}, V'))] \quad \text{[Equation 12]}$$

Where $W_t = T/t$ is the time domain weight, it gives higher weight to the first words in the first video caption and lower weight to the last words in the first video caption, so as to reduce the influence of error accumulation. Since the augmented video V' may include K pieces of data, it may obtain K $r_g$. At this time, the final first score $r'_g$ can be obtained based on the K $r_g$. For example, the K $r_g$ can be averaged to obtain the first score $r'_g$. It can also be obtained by other methods, such as weighted average, and different weights are given to videos V' obtained by using different augmentation methods.

Similarly, for the second video caption, the second video caption is taken as the ground-truth and is input into the video captioning model together with the second sample video data, so as to obtain the third output probability distribution of each moment of the second video caption. At the same time, the second video caption is taken as the ground-truth and is input into the video captioning model together with the third sample video data, so as to obtain the fourth output probability distribution of each moment of the second video caption, and then it may calculate the KL divergences of the third output probability distribution and the fourth output probability distribution, and the KL divergences can be multiplied by the time domain weights, and then be multiplied with negative 1 to obtain the second score $r_s$ of the second video caption, as specifically shown in equation 13:

$$r_s = \Sigma_{t=1}^{T}[-W_t / D_{KL}(p_\theta(c_{s,1:t-1}, V) \| p_\theta(c_{s,1:t-1}, V'))] \quad \text{[Equation 13]}$$

Since V' includes K pieces of data, the first score $r'_s$ can be obtained by averaging the K $r_s$.

After $r'_g$ and $r'_s$ are obtained, the second loss function of the video captioning model can be calculated through both $r'_g$ and $r'_s$.

In the example shown in FIG. 26, after the first video caption $c_g$ is obtained, the $c_g$ and the second sample video data V are input into the video captioning model M, so as to obtain the third output probability distribution of each moment of the second video caption based on the model output; for each augmented video V' (one V' is shown in FIG. 21), the $c_g$ and the video V' may be input into the video captioning model M, so as to obtain the fourth output probability distribution of each moment of the second video caption corresponding to each $V^1$, and it may calculate $r_g$ corresponding to the third output probability distribution and each fourth output probability distribution through the above equation 12, and it may obtain $r'_g$ (one KL divergence corresponding to $c_g$ in the figure) by averaging or other methods. Using the same calculation principle, it may obtain $r'_s$ (one KL divergence corresponding to $c_s$ in the figure) through equation 13.

In an alternative embodiment of the present disclosure, the step of obtaining the value of the second loss function based on the first score and the second score may include: using the difference between the first score and the second score as the reward value; obtaining the second loss function of the captioning model based on the reward value and the second captioning information.

Specifically, the second loss function may be a policy gradient loss function, and the policy gradient loss function is shown in equation 14:

$$J_{unlabel}(\theta) = \nabla_\theta L(\theta) \approx \Sigma_{t=1}^{T} -(r'_s - r'_g) \nabla_\theta \log p_\theta(c_s) \quad \text{[Equation 14]}$$

Where $(r'_s - r'_g)$ is the reward value, that is, the difference between the first score and the second score; $\nabla_\theta$ is the gradient for calculating $\theta$. After the second loss function is obtained, the policy gradient is used to train the captioning model. It can be known from the above description that if the words obtained by sampling are more correct, the KL divergences of the third output probability distribution and the fourth output probability distribution will be smaller, and the reward will be larger, so that the probability of outputting the word is larger after the model is updated. Conversely, if the words obtained by sampling are relatively poor, the KL divergences of the third output probability distribution and the fourth output probability distribution will be larger, the reward will be smaller, so that the probability of outputting the word is smaller after the model is updated.

Still taking the video as an example, as the example shown in FIG. 26, it may obtain the reward value (the reward shown in the figure) based on the difference between $r'_g$ (KL divergence corresponding to $c_g$ in the figure) and $r'_s$ (KL divergence corresponding to $c_s$ in the figure), and the value of the pol icy gradient loss may be calculated through the above equation 14 based on the reward value, so that the value of the final loss function is obtained based on the value of the first loss function (i.e., the value of the cross entropy loss shown in FIG. 26) and the value of the second loss function (i.e., the value of the pol icy gradient loss shown in FIG. 26).

In addition, it can be known from the foregoing description that it may only generate one type of captioning information based on the second sample multimedia data. At this time, it may obtain the value of the second loss function only based on the captioning information. Taking the above equation 14 as an example, it is also feasible to remove $r'_g$ in equation 14, so equation 14 is rewritten as following equation 15:

$$J_{unlabel}(\theta) = \nabla_\theta L(\theta) \approx \Sigma_{t=1}^{T} -(r'_s) \nabla_\theta \log p_\theta(c_s) \quad \text{[Equation 15]}$$

That is, it may obtain the corresponding score (e.g., the second score in the above example) only based on the second captioning information, and the value of the second loss function may be obtained based on the second captioning information and the score.

At present, in the commonly used datasets of video captioning or image captioning, the captioning labels of videos or images are generally less. For example, there are usually only five captioning labels for a training sample image. It is often difficult to completely express the information in the image with only five captioning labels. In order to increase the diversity of training sample captioning annotations, a method for obtaining multimedia data captioning is provided in the embodiments of the present disclosure. Based on the method, the captioning labels of the sample multimedia data can be subjected to data augmentation to obtain augmented captioning information for increasing the number of captions of the sample data, so that it may perform training to obtain a better multimedia data captioning model based on the sample data with augmented captioning information.

Accordingly, in an alternative embodiment of the present disclosure, the captioning label of the first sample multimedia data may include at least one original captioning label of the first sample multimedia data, and augmented captioning labels corresponding to respective original captioning labels.

FIG. 27 is a schematic flowchart of a method for obtaining captioning of multimedia data provided in an embodiment of the present disclosure. As shown in the figure, the method may include the following steps.

Step S2501: at least one original captioning label corresponding to the multimedia data is obtained.

For the above first sample multimedia data, that is, original captioning labels of the first sample multimedia data are obtained.

The multimedia data may be sample data in a training image dataset or a training video dataset acquired from a local storage or a local database as required, or training sample in a training image dataset or a training video dataset received from an external data source through an input device or a transmission medium. Taking an image as an example, the training image may include a predetermined N number of image captioning labels, where N may be a positive integer not less than 1. For example, the images in this solution can be training images in training image datasets (for example, dataset MS-COCO) commonly used in the field of image captioning. The images in commonly used training image datasets usually have 5 image captioning labels. The 5 image captioning labels for the same training image are different from each other but have similar semantics.

Step S2502: augmented captioning information corresponding to each original captioning label are generated respectively based on each original captioning label corresponding to the multimedia data.

Specifically, the generator may respectively generate augmented captioning information corresponding to respective original captioning labels according to respective original captioning labels corresponding to the multimedia data. The generator may be used to generate captioning sentences with similar semantics that different from the original captioning labels. That is, when a sentence labeled with the original captioning is input into the generator, the generator may generate captioning sentences with similar semantics that different from the sentence labeled with the original captioning based on the sentence labeled with the original captioning.

The process of generating a sentence by a generator is a time sequence process. As an alternative method, a greedy decoding method may be used to generate a sentence. That is, at the first moment, the input word vector is the start token, and the output is the first word with the maximum predicted output probability; at the second moment, the input is the start token and the output at the first moment, and the output is the second word with the maximum predicted output probability, and so on until the output word is the stop token.

The specific network structure of the generator is not limited in the embodiment of the present disclosure. As an alternative solution, the generator may be implemented by using a self-attention-based encoder and a self-attention-based decoder.

As two examples, FIG. 28a and FIG. 28b illustrate schematic diagrams of a network structure of a generator provided in an embodiment of the present disclosure. The generator may include a self-attention-based encoder (e.g., a transformer encoder) and a self-attention-based decoder (e.g., a transformer decoder), as shown in FIG. 28a and FIG. 28b. The encoder in the generator may include a multi-head attention layer, a layer normalization layer, and a feed forward network layer, which is used to encode the input original captioning labels. The decoder in the generator may include a masked multi-head attention layer, a multi-head attention layer, a layer normalization layer, and a feed forward network layer, which is used to decode the encoded image captioning label or video captioning label to obtain augmented image captioning information or augmented video captioning information. For a detailed description of the structure of each part of the encoder and the decoder shown in FIG. 28a and FIG. 28b, refer to the corresponding description of the encoder and decoder shown in FIG. 13, FIG. 22, or FIG. 23 in the foregoing.

It should be noted that the network structure of the generator in the embodiment of the present disclosure may include, but is not limited to, the structures shown in the above examples, and any other available encoder and decoder may be used to implement the generator.

In order to ensure the accuracy of the augmented image captioning information generated by the generator, the generator also needs to be trained. As an alternative, the generator can be obtained by training in the following manners.

A training dataset is obtained, where the training dataset includes multiple training sample data, and each training sample data includes N original captioning labels, where N is a positive integer not less than 1.

The generator is trained based on the original captioning labels of multiple training sample data in the training dataset, where the generator is used to generate captioning information with similar semantics that different from original captioning labels.

In addition, in order to improve the effect of the generator, as an alternative solution, when training the generator, a discriminator may be introduced, and the generator is trained in an adversarial training manner. Specifically, the steps for training the generator may include the followings.

The generator and the discriminator are trained alternately until the similarity value of the captioning information generated by the generator for respective original captioning labels of each training sample data meets a preset condition, where the discriminator may be specifically used to discriminate the probability that captioning information generated by the generator is true original captioning label.

The specific network structure of the discriminator may be configured according to actual needs. It can be understood that the discriminator also needs to be trained. When the trained discriminator discriminates that probability that the captioning sentence generated by the generator is a true original captioning label is high (e.g., exceeding a predetermined threshold), it means that the captioning sentence generated by the generator is close to the captioning of the real sample (i.e., the true original captioning label), which may "fool" a trained discriminator. In this case, such a captioning sentence may be used as augmented captioning information to be applied in the training process to increase sample diversity.

Specifically, during training, the generator and the discriminator may be alternately trained until the similarity value of the captioning information generated by the generator for respective original captioning labels of each training sample data meets a preset condition, where the specific calculation method of the similarity value is not limited in the embodiment of the present disclosure.

As an alternative solution, the similarity value may be a CIDEr value. CIDEr is a commonly used evaluation metric for evaluating the performance of captioning. The higher the value of CIDEr, the more similar the generated captioning sentence is to the true original captioning label. The CIDEr metric can treat each sentence as a "document" and express it as a tf-idf vector; the cosine similarity between the reference (i.e., truth) captioning sentence and the generated captioning sentence is calculated and used as a score to generate a CIDEr value. Therefore, according to an exemplary embodiment of the present disclosure, the CIDEr value of the generated captioning sentence (image captioning sentence or video captioning sentence) may be calculated based on the similarity between the captioning sentence and N original captioning labels of training sample data to which the original captioning labels for generating the captioning sentence. For example, taking the image as an example, when the CIDEr value of the image captioning sentence generated by the generator for respective original captioning labels of each training image meets a preset condition, it means that the generator has been able to generate the image captioning sentence which is very similar to the true image captioning label, that is, the training of the generator and discriminator is completed.

The preset condition may include that the similarity value of the captioning information generated for respective original captioning labels of each training sample data reaches a predetermined threshold, or the average similarity value of the image caption generated for respective original captioning labels of each training sample data reaches a predetermined threshold. The preset condition may be a system default or may be set by a user according to needs or experience. In addition, it may determine whether the training of the generator and the discriminator is completed according to the needs or experience of the user. For example, when the generator and discriminator are trained to a certain degree, the user may use a batch of training sample data to test the generator and observe whether the output of the generator is satisfactory. When the output of the generator is satisfactory, it may complete the training of generators and discriminators.

In an alternative embodiment of the present disclosure, the steps of alternately training the generator and the discriminator may include training the discriminator with fixed generator parameters; and training the generator with the fixed trained discriminator parameters.

That is, when the generator and the discriminator are alternately trained, the discriminator may be trained first with the fixed generator parameters, and then the generator is trained with the fixed trained discriminator parameters. For different training sample datasets, the above training process may be repeatedly performed. For example, taking the image as an example, for the first training image set, the discriminator and the generator are trained once based on the original parameters of the generator and the discriminator (i.e., the network structure parameters). Subsequently, for the second training image set, the discriminator and generator are trained once again based on the parameters of the discriminator and generator trained for the first training image set. Then, for the third training image set, the discriminator and generator are trained once again based on the parameters of the discriminator and generator trained for the second training image set, and so on, until the similarity value of the image captioning information generated by the generator for respective image captioning labels of each training image meets a preset condition, or the output result of the generator is satisfactory after tested by the user.

In an alternative embodiment of the present disclosure, the discriminator may be trained by the following operations.

The following operations (the number of original captioning labels of the sample data in this operation mode is greater than 1, that is, N is greater than 1) is performed for respective original captioning labels of each training sample data.

The original captioning label is respectively paired with other N−1 original captioning labels of the training sample data to generate N−1 of first pairs; the original captioning label is input to a generator, so as to generate captioning information by the generator, and the generated captioning information is paired with the original captioning label to generate a second pair. Based on the N−1 of the first pairs and the second pair, the discriminator may be trained by using a cross entropy loss function, where the output of the discriminator is the probability that each pair is two true original captioning labels.

That is, one original captioning label (referred to as the baseline label) is respectively paired with other N−1 original captioning labels to obtain N−1 reference pairs (i.e., sample pairs). Based on the baseline label, the generator may generate N−1 captioning information, The baseline label is respectively paired with N−1 generated captioning information to obtain a prediction pair, and a value of the loss function is calculated based on respective corresponding sample pairs and prediction pair; and the network parameters of the discriminator are adjusted based on the value of the loss function until the preset conditions are met. For example, for an image, the output of the discriminator is that the probability of each prediction pair being two truth image captioning labels (i.e., reference pairs) is greater than a set threshold.

In an alternative embodiment of the present disclosure (which may be referred to as scheme one), in a case where the parameters of the trained discriminator are fixed, the step of training the generator may include performing the following operations for respective original captioning labels for each training sample data.

The original captioning label is input into the generator to generate captioning information through the greedy decoding method; and for the generated captioning information, the following operations are performed.

The similarity value corresponding to the generated captioning information is calculated based on the generated captioning information and the N original captioning labels of the corresponding training image; the generated captioning information is paired with the original captioning labels to generate a second pair, and the probability value that the second pair are the two original image captioning labels is obtained by using a trained discriminator, the calculated similarity value and the obtained probability value are weighted and summed to obtain a reward; and the parameters of the generator are adjusted according to the obtained reward.

In another alternative embodiment of the present disclosure (which may be referred to as scheme two), in a case where the parameters of the trained discriminator are fixed, the step of training the generator may include performing the following operations for respective original captioning labels for each training sample data.

The original captioning label is input into the generator to generate first captioning information through the greedy decoding method.

The original captioning label is input into the generator to generate the second captioning information through the Monte Carlo sampling method.

For the generated first captioning information, the following operations are performed.

The first similarity value corresponding to the generated first captioning information is calculated based on the generated first captioning information and the N original captioning labels of the corresponding training image; the generated first captioning information is paired with the original captioning labels to generate a second pair, and the first probability value that the second pair are the two truth original captioning labels is obtained by using a trained discriminator, the calculated first similarity value and the obtained first probability value are weighted and summed to obtain a first reward.

For the generated second captioning information, the following operations are performed.

The second similarity value corresponding to the generated second captioning information is calculated based on the generated second captioning information and the N original captioning labels of the corresponding training image; the generated second captioning information is paired with the original captioning labels to generate a second pair, and the second probability value that the second pair are the two truth original captioning labels is obtained by using a trained discriminator, the calculated second similarity value and the obtained second probability value are weighted and summed to obtain a second reward.

The parameters of the generator are adjusted according to a final reward that is the difference between the first reward and the second reward.

In practical applications, because of the discrete nature of the text data, it is difficult to pass the gradient of the discriminator back to the generator. In order to solve this problem, as an alternative method, a policy gradient method can be adopted. The reward is calculated based on the captioning sentence generated by the generator. The higher the reward, the better the currently generated captioning sentence, and the more the parameters of the generator are adjusted in this direction. In the traditional method, the reward only includes the output of the discriminator, but the reward of the above alternative embodiment provided by this application may include two parts, namely the output of the discriminator and the similarity value (e.g., the CIDEr value), and both of them are weighted and summed as the final reward. By using more diversity of data to determine the reward for adjusting the parameters of the generator, it can effectively make the generator learn more information, and can generate augmented captioning information which is more similar but different from the original captioning labels, so as to obtain better augmented image captioning information based on the trained generator, and provide more and better data foundation for training multimedia data captioning models based on sample data containing the augmented captioning information.

In order to better understand and explain the training scheme of the generator provided in the embodiment of the present disclosure, the above training scheme will be further described in detail with reference to FIG. 28a and FIG. 28b, respectively. In this example, multimedia data is an image. It can be understood that the principle of this example is also applicable to video.

As an alternative example, for the above scheme one, as shown in FIG. 28a, when training the generator, the following operations can be performed for respective image captioning labels of each training image. The image captioning label (such as X1: T shown in the figure) is input to the generator, so as to generate image captioning information based on greedy decoding method; for the generated image captioning information (e.g., Y1: T), the following operations are performed. The similarity value corresponding to the generated image captioning information is calculated based on the generated image captioning information and the N image captioning labels of the corresponding training image; the generated image captioning information is paired with the image captioning labels to generate a second pair (e.g., X1: T, Y1: T), and the probability value that the second pair are the two truth image captioning labels is obtained by using a trained discriminator, the calculated similarity value and the obtained probability value are weighted and summed to obtain a reward; and the parameters of the generator are adjusted according to the obtained reward.

Specifically, as shown in FIG. 28a, the CIDEr value calculated for the image captioning sentence $y^b$ generated by the generator based on the greedy decoding method and the probability value obtained by the discriminator for the image captioning sentence $y^b$ generated by the generator based on the greedy decoding method are weighted and summed to obtain the rewardr($y^b$). The formula for weighted summation is as following equation 16:

$$r = \tau D_\varphi + (1-\tau)C \quad \text{[Equation 16]}$$

Where r (corresponding to r($y^b$) in FIG. 26a) is a reward, $\tau$ is a weight coefficient, $D_\varphi$ is a probability value output by the discriminator, and C is a CIDEr value (corresponding to the CIDEr score in FIG. 26a).

In the example shown in FIG. 28a, the structure of the discriminator may be a CNN-based structure, for example, it may include a convolution layer, a maximum pooling layer or the like. Specifically, for each pair of image captioning label and corresponding generated image captioning information, that is, for each second pair, the pair can be processed by embedding to obtain a corresponding feature vector. The convolution layer using a variety of different convolution processing parameters is used to perform convolution processing on the feature vector, and respective convolution results are pooled through the maximum pooling layer, and the pooling results are concatenated, and the probability value corresponding to respective second pairs are obtained based on the concatenated vector prediction.

In addition, according to the other alternative scheme, i.e., the above scheme two, in order to further improve the effect, the generator can also be trained using a self-critical mechanism, that is, the reward difference between the image captioning sentence obtained by Monte Carlo sampling and the image captioning sentence obtained by greedy decoding is used as the final reward, and the parameters of the generator are adjusted according to the obtained final reward.

In the example shown in FIG. 28b, the CIDEr value calculated for the image captioning sentence $y^b$ generated by the generator based on the greedy decoding and the probability value obtained by the discriminator for the image captioning sentence $y^b$ generated by the generator based on the greedy decoding are weighted and summed to obtain the rewardr($y^b$). The CIDEr value calculated for the image captioning sentence $y^s$ generated by the generator based on the Monte Carlo sampling and the probability value obtained by the discriminator for the image captioning sentence $y^s$ generated by the generator based on the Monte Carlo sampling are weighted and summed to obtain the rewardr ($y^s$). r($y^s$)-r($y^b$) is used as the final reward for adjusting the parameters of the generator. Where the particular scheme that the CIDEr value calculated for the image captioning sentence $y^s$ generated based on the Monte Carlo sampling and the probability value for the image captioning sentence $y^s$ generated based on the Monte Carlo sampling are weighted and summed to obtain the rewardr($y^s$), refers to the description of obtaining r($y^b$) in FIG. 28a above, which has similar principle, and is not repeated here.

In an alternative embodiment of the present disclosure, in order to avoid duplicate information in the generated augmented captioning information, the method may further include the followings.

When there is a repeated augmented captioning information, the original captioning label corresponding to the repeated augmented captioning information is re-input into the generator, and based on the beam search method, the generator is used to regenerate the augmented captioning information by adjusting the size of the beam value.

Taking the image as an example, after the training of the generator and the discriminator is completed, the trained generator can be used to generate augmented image captioning information corresponding to respective image captioning labels according to respective image captioning labels corresponding to the image. These augmented image captioning are different from the truth image captioning labels, but these augmented image captioning may be repeated with each other.

In order to solve the problem that there may have repeat in the augmented captioning information, as an alternative method, a beam search method may be adopted to regenerate the augmented captioning information. The generator generates augmented captioning information based on the maximum probability, that is, the word with the maximum prediction probability is output at each moment (equivalent to the beam value of 1), and the beam search method may adjust the generation results of the generator by changing the beam value (such as 2, 3, etc.). For example, when there are two identical augmented captions, the truth caption (i.e., the original captioning label) corresponding to one of the augmented captioning information may be input into the generator, the beam value is set to 2, and the generator is used to generate different augmented captioning information. For example, the generator may output two words having the top two probabilities at the first moment, which are assumed to be {a} and {b} respectively; at the next moment, output two words having the maximum probability based on the two words {a} and {b} at the first moment, respectively, which are assumed to be {a, c}, {a, d}, {b, e}, {b, f}; then the two with the maximum probability are selected from these four sequences, which are assumed to be {a, c}, {b, e}; and so on at the following moments. As another example, when there are three identical augmented captioning information, the original captioning label corresponding to one of the augmented captioning information may be input into the generator, the beam value is set to 2, and the generator is used to generate different augmented captioning information. In addition, it may also input the truth caption corresponding to one of the augmented captioning information into the generator and set the beam value to 3, and the generator is used to further generate different augmented captioning information, and so on. As such, different beam sizes can be used to generate augmented captioning sentences, and change the generated results, so as to solve the repeat problem.

After obtaining the augmented captioning information by using the method for obtaining augmented captioning information provided in the embodiment of the present disclosure, the original captioning labels of the multimedia data and the corresponding augmented captioning information can be used as captioning label information of the multimedia data. The multimedia data samples containing more label information are used to train the initial multimedia data captioning model to obtain a better captioning model. Specifically, taking an image as an example, the image captioning model can be obtained by training in the following ways.

Training samples are obtained, each sample image in the training samples has corresponding label information, the label information includes at least one image captioning label of the sample image, and augmented image captioning information corresponding to each image captioning label.

The original image captioning model is trained based on respective sample images until a preset training end condition is satisfied, so as to obtain a trained image captioning model.

For each sample image, the augmented image captioning information corresponding to the sample image is obtained by using the method for obtaining an image captioning provided in any alternative embodiment of the present disclosure. The specific network structure of the image captioning model is not limited in the embodiment of the present disclosure. For example, it may be an image captioning model based on an encoder and a decoder. For example, it may be a network image captioning model based on the codec shown in FIG. 22 or FIG. 23.

As an example, FIG. 29 illustrates a schematic flowchart of a method for training an image captioning model provided in an embodiment of the present disclosure. In this example, the image captioning model is an image captioning model based on an encoder and a decoder. As shown in the figure, the method may include the following steps.

Step S2701: for each training image (i.e., a sample image) in the training image dataset, a first training is performed on the encoder and the decoder by using a cross entropy loss function.

Alternatively, the training image in this step may be a training image in the training image dataset, and the training image may include a predetermined N image captioning labels, where N may be a positive integer greater than or equal to 1. For example, the training image may be a training image with 5 image captioning labels in the training image dataset commonly used in the field of image captioning (e.g., dataset MS-COCO).

Specifically, the captioning information corresponding to the training image may be obtained by referring to or based on various alternative methods in FIG. 24 based on the training image, and the augmented image captioning information corresponding to the training image may be obtained by referring to the method shown in FIG. 27. Based on the obtained captioning information, image captioning labels of the training images, and augmented image captioning information, the encoder and decoder are trained by using a cross entropy loss function. For example, they can be trained by the following equation 17 of the cross entropy loss function.

$$J_{xe}(\theta) = -\sum_{t=1}^{T} \log(p_\theta(y_t \mid y_{1:t-1}, I)) \quad \text{[Equation 17]}$$

Where $J_{xe}(\theta)$ represents the loss, $\theta$ represents the parameters of the transformer encoder 302 and the transformer decoder 303, t represents the current moment, T represents the maximum moment, $y_t$ represents the word output at the current moment, and $y_{1:t-1}$ represents the ground-truth word at the previous moment, I represents the current image, and $p_\theta$ represents the probability that the output word is truth. Here, the first image captioning sentence is a combination of words with the maximum output probability at each moment, so $y_t$ at each moment can be obtained from the first image captioning sentence. In addition, the ground-truth word of each moment can be obtained from each of the image captioning label and the augmented image captioning of the training image.

Step S2702: when the training of the encoder and the decoder based on the first training is completed, for each training image in the training image dataset, a second training is performed on the encoder and decoder obtained through the first training by using a policy gradient and/or a self-critical mechanism.

Specifically, the policy gradient is used because the optimization target of the cross entropy loss is different from the metric (e.g., the CIDEr value) used to evaluate the captioning. To solve this problem, the policy gradient is used to directly optimize the CIDEr value. The formula is as following equation 18:

$$J(\theta) = -E_{y^s \sim p_\theta}[r(y^s)] \quad \text{[Equation 18]}$$

Where $J(\theta)$ is the loss, $\theta$ represents the parameters of the encoder and decoder, E represents the expectation, $y^s$ is the sampled image captioning sentence, and $r(y^s)$ is the CIDEr value, which is the reward, and $y^s \sim p_\theta$ represents the set of image captioning sentences sampled by the existing network parameters.

The self-critical mechanism refers that the reward is set to the difference between the CIDEr value of the image captioning sentence obtained by Monte Carlo sampling and the CIDEr value of the image captioning sentence obtained by greedy decoding, that is, the effect of greedy decoding being used to constrain the reward will be better. The formula is as following equation 19:

$$\nabla_\theta L(\theta) \approx -(r(y^s) - r(\hat{y}))\nabla_\theta \log p_\theta(y^s) \quad \text{[Equation 19]}$$

Where $\hat{y}$ is an image captioning sentence obtained by the greedy decoding, $y^s$ is an image captioning sentence obtained by the Monte Carlo sampling, r is a calculated CIDEr value, $\nabla_\theta L(\theta)$ is a gradient of loss, and $p_\theta(y^s)$ is the corresponding probability when sampling $y^s$.

Alternatively, when performing the above second training, a first image captioning sentence may be obtained by using the greedy decoding with reference to the method in FIG. 24 or based on the method shown in FIG. 24; a second image captioning sentence may be obtained by using the Monte Carlo sampling with reference to the method in FIG. 24 or based on the method shown in FIG. 24, and a second training is performed on the first trained encoder and decoder by using a policy gradient and a self-critical mechanism. Specifically, the CIDEr value of the first image captioning sentence may be calculated based on the similarity between the first image captioning sentence and N image captioning labels of the corresponding training image, and the CIDEr value of the second image captioning sentence may be calculated based on the similarity between the second image captioning sentence and N image captioning labels of the corresponding training image. It may calculate the difference between the CIDEr value of the first image captioning sentence and the CIDEr value of the second image captioning sentence to obtain a reward, and adjust the parameters of the first trained encoder and decoder parameters according to the obtained reward.

It can be understood that the training method of the image captioning model provided in the embodiment of the present disclosure is only an alternative training method. As long as the augmented image captioning obtained based on the scheme for obtaining augmented image captioning provided in the embodiment of the present disclosure is also used as the label information of the sample image, it may increase the amount and diversity of the label data of the sample image. The image captioning model is trained based on the training data containing the sample image, which can effectively improve the performance of the model. In addition, it is clear to those skilled in the art that the above solution applicable to images is also applicable to video, and the principle is the same.

In addition, in order to improve the expressiveness of the captioning labels of the training samples. In an alternative embodiment of the present disclosure, it may perform captioning data augmentation by using a generative adversarial network, and apply samples for captioning data augmentation to the training of the captioning model, thereby increasing the diversity of samples and further improving effects of the video captioning model or image captioning model of the present disclosure.

The following describes the method for generating the captioning information of the multimedia data provided by the present disclosure in combination with two schematic diagrams.

Taking a video as an example, FIG. 30 illustrates a schematic flowchart of a method for generating video captioning information of the present disclosure. As shown in the figure, for a given video, frames of the video can be selected through a frame selection step. The regional encoder shown in the figure is a regional encoder for extracting the local visual features of respective target regions in each frame of the selected frames. Alternatively, the regional encoder may include a regional feature extract ion network, a relationship detector (i.e., a relationship prediction network), an attribute detector (i.e., an attribute prediction network), and an action detector (i.e., an action classifier).

In order to obtain a trained video captioning model, before the model of the codec structure shown in this example is used for video captioning, it can be trained in a semi-supervised learning (or semi-supervised training) manner, as shown in FIG. 30. It can be trained by using labeled videos (i.e., videos with captioning labels) and un labeled videos (i.e., videos without captioning labels). During training each video, several frames of videos may be used. The unlabeled video can be augmented by data augmentation processing to obtain the augmented video. At least one video captions can be obtained for the unlabeled video. The scores of respective video captions can be obtained based on the augmented video to obtain the value of the second loss function. While for a labeled video, the value of the first loss function can be obtained based on the target captioning information and corresponding label information of the video output by the model, so that the value of the total loss function of the model is obtained based on the value of the first loss function and the value of the second loss function, and the training of the model is guided based on this value until the total loss function of the model converges to the minimum.

In addition, for the part that obtains augmented captioning information shown in the figure, in order to obtain a greater amount of diversity label information when training the model, this part is used. It may generate augmented captioning information corresponding to the captioning label through the generator based on the original captioning label (i.e., the truth captioning information) of the labeled video. Both the original captioning label and the augmentation captioning label are used as the captioning label information of the sample video data during training, thereby increasing the amount and diversity of captioning label information. A larger amount of label information and captioning information predicted by the decoder of the model are used to guide model training, which can further improve the stability of the model and the accuracy of the generated captioning information.

As shown in FIG. 30, in this example, when performing video processing based on a trained video captioning model, the regional encoder may extract local visual features, relationship features, attribute features and so on of respective target regions in each of frames of the video, and may construct a scene graph for each frame based on the extracted features. The scene graph in this example may be a spatial-temporal scene graph incorporating temporal information, and the corresponding updated features (that is, the graph convolution features) can be obtained through a graph convolutional network. Correspondingly, for the decoder part of the model, this example may use a self-attention-based intra-decoder and a self-attention-based inter-decoder. When the captioning information is generated by performing encoding, it may also generate a text caption of the video that better meets the requirements of the user by acquiring information about the captioning information that the user expects to generate. For example, during the user driving, it may collect real-time video in front of the user's line of sight and analyze the video, so as to give the user a corresponding reminder by analyzing the generated captioning information of the video or play the captioning information to the user when the user needs to be prompted, such as when there is a potential danger ahead.

As another example, FIG. 31 illustrates a schematic flowchart of a method for generating video captioning information of the present disclosure. The 3D visual feature encoder (i.e., spatial-temporal feature extraction network), regional encoder, and semantic encoder (i.e., the semantic prediction network) shown in the figure respectively are encoders for extracting local visual features (local features shown in the figure), spatial-temporal visual features, and semantic features of respective target regions in each frame of video. Based on the local visual features, a spatial-temporal scene graph of each frame of the images can be constructed. Then, the graph convolution features (the updated local features shown in the figure) can be obtained through the graph convolution network. In this example, the 3D visual feature encoder can also be used to extract the spatial-temporal visual features of the video, and the semantic encoder can be used to extract the semantic features of the video. For the obtained spatial-temporal visual features, semantic features and graph convolution features, the feature selection network performs feature selection on various features, that is, determines the weight of each feature. It can also perform weighted integration of features based on the weight of each feature to obtain the integrated feature. The decoder bank (decoder bank composed of several decoders as shown in the figure) performs decoding according to the integrated features and the length information of the desired captioning information, and the final captioning information (the output captioning information shown in the figure) can be finally obtained according to the results of respective decoders. For example, it may average the decoding results of respective decoders, and obtain the final captioning information based on the averaged results. Alternatively, the decoder bank may include a self-attention-based intra-decoder, and the length information of the desired captioning information may be input to the decoder, so that the decoder controls the length of the final generated captioning information.

Similarly, in order to obtain a trained video captioning model, before the model of the codec structure shown in this example is used for video captioning, it may be trained in a semi-supervised learning (i.e., semi-supervised training) manner, where an adversarial training is used for training. For details about the training process, please refer to the foregoing description of model training and the description of the corresponding part in FIG. 30, which will not be repeated here.

In addition, it can be known from the foregoing description that, in practical applications, after obtaining each characteristic information of the video through the encoding part shown in FIG. 30 and FIG. 31, and before decoding by the decoder, it is also possible to use the self-attention-based intra-frame encoder and the self-attention-based inter-frame encoder to encode the extracted characteristic information, and then inputs the encoded features to the decoder.

Based on the same principle as the method for generating captioning information of multimedia data provided in the embodiment of the present disclosure, the present disclosure also provides an apparatus for generating captioning information of multimedia data. As shown in FIG. 32, the apparatus 100 for generating captioning information may include a characteristic information extraction module 110 and a captioning information generation module 120.

The characteristic information extraction module 110 is configured to extract characteristic information of multimedia data to be processed, wherein the multimedia data includes a video or an image.

The captioning information generating module 120 is configured to generate a text caption of the multimedia data based on the extracted characteristic information.

Alternatively, the captioning information generating module 120 is specifically configured to execute at least one of the following: extracting local visual features of targets contained in respective target regions of each image in the multimedia data; extracting semantic features of the multimedia data; extracting spatial-temporal visual features of the multimedia data when the multimedia data is a video; extracting global visual features of the multimedia data; extracting attribute features of the targets contained in respective target regions of each image in the multimedia data; and extracting global attribute features of each image in the multimedia data.

Alternatively, the characteristic information includes local visual features of targets included in respective target regions in each image of the multimedia data, and the captioning information generating module 120 is specifically configured to: obtain relationship features between the targets based on the local visual features of each target in the image; construct a scene graph of the image based on the local visual features and the relationship features; obtain graph convolution features of the image based on the scene graph of the image; and generate the text caption of the multimedia data based on the graph convolution features of each image of the multimedia data.

Alternatively, the scene graph includes a plurality of nodes and a plurality of edges, wherein one node represents a local visual feature of one target, and each of the plurality of edges represents the relationship feature between two connected nodes.

Alternatively, the above characteristic information includes the attribute features of the targets contained in respective target regions of each image in the multimedia data; when the captioning information generating module 120 constructs a scene graph of the image, it is specifically configured to construct the scene graph of the image based on the local visual features of each target, the relationship features between the targets, and the attribute features of each target, wherein one node in the scene graph represents the local visual features or attribute features of one target corresponding to the target region.

Alternatively, if the multimedia data is the video, the images of the multimedia data are a plurality of frames selected from the video, and if the target regions of two adjacent frames comprise the same targets, the scene graphs of the two adjacent frames have temporal edges between the nodes corresponding to the same target.

Alternatively, when the captioning information generating module 120 obtains graph convolution features of the image according to the scene graph of the image, it is used to: obtain a target dimension of feature vectors by encoding nodes and edges in the scene graph; and obtain the graph convolution features by using a graph convolution network based on the obtained feature vectors.

Alternatively, if the characteristic information of the multimedia data includes at least two of the local visual feature, the semantic feature, the spatial-temporal visual feature, and the global feature, the captioning information generating module 120 may be used to: determine weights of each characteristic information; weight each characteristic information based on the weights of each characteristic information; and generate the text caption of the multimedia data based on the weighted characteristic information.

Alternatively, the captioning information generating module 120 may be configured to: encode the obtained characteristic information by using self-attention-based encoder; input the encoded characteristic information to a decoder to generate the text caption of the multimedia data; wherein if the multimedia data is an image, the self-attention-based encoder is a self-attention-based intra-frame encoder; if the multimedia data is a video, the self-attention-based encoder includes a self-attention-based intra-frame encoder and/or a self-attention-based inter-frame encoder.

Alternatively, the captioning information generating module 120 may be configured to: input the extracted characteristic information into a plurality of decoders, respectively; and generate the text caption of the multimedia data based on decoding results of the decoders.

Alternatively, the captioning information generating module 120 may be configured to obtain length information of the text caption to be generated; and generate the text caption of the video based on the length information and the extracted characteristic information.

Alternatively, the captioning information generating module 120 may specifically use a multimedia data captioning model to obtain a text caption of the multimedia data, and the multimedia data captioning model is obtained by a model training apparatus performing training, where the model training apparatus may include: a sample acquisition module, which is configured to obtain training samples, wherein the training samples comprise a first sample multimedia data with captioning labels; and a model training module, which is configured to train an original captioning model based on the first sample multimedia data until the model loss function converges; and take the trained captioning model as the multimedia data captioning model.

Alternatively, the training sample further includes a second sample multimedia data without the captioning labels, and the model loss function comprises a first loss function and a second loss function; the model training module may be used to: train a preset captioning model based on the first sample multimedia data to obtain a value of the first loss function, and train the captioning model based on the second sample multimedia data to obtain a value of the second loss function; obtain a value of the final loss function based on the value of the first loss function and the value of the second loss function; and train the captioning model based on the value of the final loss function until the final loss function converges.

Alternatively, when the model training module trains the captioning model based on the second sample multimedia data and obtains the value of the second loss function, it may be specifically used to: perform data augmentation on the second sample multimedia data at least once to obtain a third sample multimedia data; input the second sample multimedia data into the captioning model to obtain at least one multimedia captioning; determine a score of each multimedia captioning based on the second sample multimedia data and the third sample multimedia data; and obtain the value of the second loss function based on the scores of the multimedia captioning.

Alternatively, the captioning label of the first sample multimedia data includes at least one original captioning label of the first sample multimedia data and augmentation captioning label corresponding to each original captioning label; wherein the augmentation captioning label is obtained through the following manners: based on each original captioning label of the first sample multimedia data, generating an augmentation image captioning label corresponding to each of original captioning labels, respectively.

Based on the same principles as the methods and apparatus provided in the embodiments of the present disclosure, the embodiments of the present disclosure further provide an electronic device. The electronic device includes a memory and a processor. The memory stores a computer program, and when the processor executes the computer program, the processor may perform the method shown in any alternative embodiment of the present disclosure.

An embodiment of the present disclosure further provides a computer-readable storage medium. The storage medium stores a computer program. When the computer program is executed by a processor, it may perform the method shown in any alternative embodiment of the present disclosure.

As an example, FIG. 33 illustrates a schematic structural diagram of an electronic device applicable to the embodiment of the present disclosure. As shown in FIG. 33, the electronic device 4000 shown in FIG. 33 includes a processor 4001 and a memory 4003. The processor 4001 and the memory 4003 are connected, for example, through a bus 4002. Alternatively, the electronic device 4000 may further include a transceiver 4004. It should be noted that, in practical applications, the number of the transceiver 4004 is not limited to one, and the structure of the electronic device 4000 does not limit the embodiments of the present disclosure.

The processor 4001 may be a central processing unit (CPU), a general-purpose processor, a digital signal processor (DSP), an application specific integrated circuit (ASIC), or a field programmable gate array (FPGA) or other programmable logic devices, transistor logic devices, hardware components or any combination thereof. It may implement or execute various exemplary logical blocks, modules, and circuits described in connection with the present disclosure. The processor 4001 may also be a combination that realizes a computing function, for example, a combination including one or more microprocessors, a combination of a DSP and a microprocessor, and the like.

The bus 4002 may include a path for transmitting information between the aforementioned components. The bus 4002 may be a peripheral component interconnect (PCI) bus, or an extended industry standard architecture (EISA) bus. The bus 4002 can be divided into an address bus, a data bus, a control bus, and the like. For ease of representation, it is indicated by only one thick line in FIG. 33, but it does not mean that there is only one bus or one type of bus.

The memory 4003 may be a read only memory (ROM) or other types of static storage devices that can store static information and instructions, a random access memory (RAM), or other types of dynamic storage device that can store information and instructions, which can also be electrically erasable programmable read only memory (EEPROM), compact disc read only memory (CD-ROM) or other optical disk storage, optical disk storage (including compression optical discs, laser discs, optical discs, digital versatile discs, Blu-ray discs, etc.), magnetic disk storage media or other magnetic storage devices, or any other medium that can be used to carry or store the desired program code in the form of instructions or data structures and accessible by a computer, but not limited to this.

The memory 4003 is configured to store application program code for executing the solution of the present disclosure, and the processor 4001 controls execution. The processor 4001 is configured to execute application program code stored in the memory 4003 to implement the content shown in any one of the foregoing method embodiments.

It can be understood that the methods and models provided in the alternative embodiments of this application (such as video captioning models, image captioning models, etc.) can be run on any terminal that needs to generate video captioning information and image captioning information (which may be a user terminal, or server, etc.). Alternatively, the terminal may have the following advantages.

(1) On the hardware system, the device has a central processing unit, memory, input components, and output components, that is, the device is often a microcomputer device with communication functions. In addition, it may have multiple input manners, such as keyboard, mouse, touch screen, microphone, and camera, etc., and which may be adjusted as needed. At the same time, the devices often have multiple output manners, such as receivers and display screens, which can also be adjusted as needed.

(2) On the software system, the device must have an operating system, such as Windows Mobile, Symbian, Palm, Android, iOS, etc. At the same time, these operating systems are becoming more and more open, and personalized applications based on these open operating system platforms are emerging in an endless stream, such as address books, calendars, notepads, calculators, and various games and so on, which greatly meet the needs of personalized users.

(3) In terms of communication capabilities, the device has flexible access manners and high-bandwidth communication performance, and it may automatically adjust the selected communication manner according to the selected service and environment, thereby facilitating user use. The device can support Global System for Mobile Communication (GSM), Wideband Code Division Multiple Access (WCDMA), Code Division Multiple Access (CDMA2000), and Time Division-Synchronous Code Division Multiple Access (Time Division-TDSCDMA), Wi-Fi and Worldwide Interoperability for Microwave Access (WiMAX), etc., so as to adapt to a variety of standard network, which support not only voice services, but also multiple wireless data services.

*463(4) In terms of functions, the device pays more attention to humanization, personalization and multi-function. With the development of computer technology, the device has moved from a "device-centric" mode to a "person-centric" mode, integrating embedded computing, control technology, artificial intelligence technology, and biometric authentication technology, which fully reflects the person-centered purpose. Due to the development of software technology, the configuration of the device can be adjusted according to individual needs for being more personalized. At the same time, the device itself integrates many software and hardware, and its functions are becoming more and more powerful.

Also, an apparatus or a method for generating captioning information of multimedia data according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, when there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they can be performed in other orders. Moreover, at least a part of the steps in the flowchart of the drawing may include multiple sub-steps or multiple stages. These sub-steps or stages are not necessarily performed at the same time, and may be performed at different times. The execution order is not necessarily performed in sequence, and may be performed in turn or alternately with other steps or at least a part of the sub-steps or stages of other steps.

The above description is only part of the implementation of the present disclosure. It should be noted that, for those of ordinary skill in the art, without departing from the principles of the present disclosure, several improvements and modification can be made. These improvements and modifications also should be regarded as falling within the protection scope of this application.

The invention claimed is:

1. A method for generating captioning information of multimedia data, comprising:
  extracting characteristic information of multimedia data to be processed, wherein the multimedia data comprises a video or an image; and
  generating a text caption of the multimedia data based on the extracted characteristic information, wherein the generating the text caption of the multimedia data based on the extracted characteristic information comprises:
    determining a first application scenario for the multimedia data by analyzing the multimedia data;
    obtaining length information of the text caption to be generated for the first application scenario, wherein the length information indicates at least one length of a plurality of lengths that respectively correspond to a plurality of application scenarios including the first application scenario; and
    generating the text caption based on the length information and the extracted characteristic information.

2. The method of claim 1, wherein the extracting characteristic information of the multimedia data to be processed comprises at least one of the following:
  extracting local visual features of targets contained in respective target regions of each image in the multimedia data;
  extracting semantic features of the multimedia data;
  extracting spatial-temporal visual features of the multimedia data when the multimedia data is a video;
  extracting global visual features of the multimedia data;
  extracting attribute features of the targets contained in the respective target regions of each image in the multimedia data; and
  extracting global attribute features of each image in the multimedia data.

3. The method of claim 2, wherein the characteristic information comprises the local visual features of the targets contained in respective target regions in each image of the multimedia data, and the generating the text caption of the multimedia data based on the extracted characteristic information, comprising:
  obtaining relationship features between the targets based on the local visual features of each target in the image;
  constructing a scene graph of the image based on the local visual features and the relationship features;
  obtaining graph convolution features of the image based on the scene graph of the image; and generating the text caption of the multimedia data based on the graph convolution features of each image of the multimedia data.

4. The method of claim 3, wherein the scene graph comprises a plurality of nodes and a plurality of edges, wherein one node represents a local visual feature of one target, and each of the plurality of edges represents the relationship feature between two connected nodes.

5. The method of claim 3, wherein the characteristic information comprises the attribute features of the targets contained in respective target regions of each image in the multimedia data;
the constructing of the scene graph of the image based on the local visual features and the relationship features comprises:
constructing the scene graph of the image based on the local visual features of each target, the relationship features between the targets, and the attribute features of each target, wherein one node in the scene graph represents the local visual features or attribute features of one target.

6. The method of claim 3, wherein, when the multimedia data is the video, the images of the multimedia data are a plurality of frames selected from the video, and when the target regions of two adjacent frames comprise the same targets, the scene graphs of the two adjacent frames have temporal edges between the nodes corresponding to the same target.

7. The method of claim 3, wherein the obtaining the graph convolution features of the image based on the scene graph of the image comprises:
obtaining a target dimension of feature vector by encoding nodes and edges in the scene graph; and
obtaining the graph convolution features by using a graph convolution network based on the obtained feature vector.

8. The method of claim 2, wherein when the characteristic information of the multimedia data comprises at least two of the local visual feature, the semantic feature, the spatial-temporal visual feature, and the global feature, the generating the text caption of the multimedia data based on the extracted characteristic information comprises:
determining weights of each characteristic information;
weighting each characteristic information based on the weights of each characteristic information; and
generating the text caption of the multimedia data based on the weighted characteristic information.

9. The method of claim 2, wherein the generating the text caption of the multimedia data based on the extracted characteristic information comprises:
encoding the obtained characteristic information by using self-attention-based encoder;
inputting the encoded characteristic information to a decoder to generate the text caption of the multimedia data;
wherein when the multimedia data is an image, the self-attention-based encoder is a self-attention-based intra-frame encoder; when the multimedia data is a video, the self-attention-based encoder comprises a self-attention-based intra-frame encoder and/or a self-attention-based inter-frame encoder.

10. The method of claim 1, wherein the generating the text caption of the multimedia data based on the extracted characteristic information comprises:
inputting the extracted characteristic information into a plurality of decoders, respectively; and
generating the text caption of the multimedia data based on decoding results of the decoders.

11. The method of claim 1, wherein the text caption of the multimedia data is generated through a multimedia data captioning model, wherein the multimedia data captioning model is obtained by training in the following manner:
obtaining training samples, wherein the training samples comprise a first sample multimedia data with captioning labels;
training an initial captioning model based on the first sample multimedia data until a model loss function converges; and taking the trained captioning model as the multimedia data captioning model.

12. The method of claim 11, wherein the training samples further comprise a second sample multimedia data without the captioning labels, and the model loss function comprises a first loss function and a second loss function;
the training the initial captioning model based on the first sample multimedia data until the model loss function converges comprises:
training a preset captioning model based on the first sample multimedia data to obtain a value of the first loss function, and training the captioning model based on the second sample multimedia data to obtain a value of the second loss function;
obtaining a value of the final loss function based on the value of the first loss function and the value of the second loss function; and
training the captioning model based on the value of the final loss function until the final loss function converges.

13. An apparatus for generating captioning information of multimedia data, comprising:
a memory storing one or more instructions; and
a processor configured to execute the one or more instructions stored in the memory to:
extract characteristic information of multimedia data to be processed, wherein the multimedia data comprises a video or an image;
determine a first application scenario for the multimedia data by analyzing the multimedia data;
obtain length information of the text caption to be generated for the first application scenario, wherein the length information indicates at least one length of a plurality of lengths that respectively correspond to a plurality of application scenarios including the first application scenario; and
generate a text caption of the multimedia data based on the length information and the extracted characteristic information.

14. A computer program product including a non-transitory computer-readable storage medium, wherein the storage medium stores a computer program that, when executed by a processor, performs the method of claim 1.

* * * * *